United States Patent Office 3,505,386
Patented Apr. 7, 1970

---

3,505,386
COMPOUNDS RELATED TO PROSTAGLANDINS
John C. Babcock and Philip F. Beal III, Kalamazoo, Mich., assignors to The Upjohn Company, Kalamazoo, Mich., a corporation of Delaware
No Drawing. Filed Dec. 29, 1965, Ser. No. 517,442
Int. Cl. C07c 69/74
U.S. Cl. 260—468    32 Claims

ABSTRACT OF THE DISCLOSURE

The disclosed invention is a process for producing prostaglandins and compounds related to prostaglandins. The initial reactant is 4-cyclopentene-1,3-dione. That is reacted with butadiene to form 3aα,4,7,7aα-tetrahydro-1,3-indanedione. Both keto groups of that are reduced to give two diols. The double bond in the 6-membered ring of each diol is oxygenated, and the resulting ketone is transformed to a tertiary alcohol by reaction with an alkyl metal compound. The tertiary alcohol is dehydrated, and the resulting double bond is cleaved to give a cyclopentanecarboxaldehyde. This aldehyde is reacted with a carboxyl-terminated Wittig Reagent. Reduction of double bonds and keto groups in the resulting product yields isoprostaglandins with side chains in cis configuration. Isomerization before double bond reduction leads to corresponding prostaglandins with side chains in trans configuration.

---

This invention relates to a process for making prostaglandins and compounds related to prostaglandins and having prostaglandin-like activity, and to intermediates used in the manufacture of these compounds. More particularly this invention relates to a process for the manufacture of dihydroprostaglandin $F_{1\alpha}$ and related compounds.

The term prostaglandin is used broadly to designate a material, having hypotensive and smooth muscle-stimulating activity, obtained from accessory genital glands, seminal fluid, and the like. Prostaglandins have been found to be present in the kidney of both male and female animals. A crude material, designated prostaglandin, was obtained by von Euler from extracts of such materials [Arch. Exp. Path. Pharmak. 175, 78 (1934), 181 (1936), J. Physiol. 72, 74 (1931), 81, 102 (1934), 84, 21 (1935), 88, 213 (1936), Klin. Wschr. 14, 118L (1935)]. Recently [Acta Chemica Scandinavia 14, 1693–1704 (1960)] two distinct compounds designated PGE and PGF have been isolated from crude materials such as von Euler prostaglandin. Both PGE and PGF are unsaturated, non-aromatic hydroxycarboxylic acids. PGE and PGF can be hydrogenated by the usual methods for saturating ethenoid double bonds, for example, hydrogenation in a solvent such as ethanol or acetic acid in the presence of Raney nickel, platinum or like hydrogenation catalyst to give products, dihydro PGE and dihydro PGF which also exhibit prostaglandin-like activity.

The structure of these compounds has been shown to be as follows:

PGF (also termed $PGF_{1\alpha}$) has the following structure:

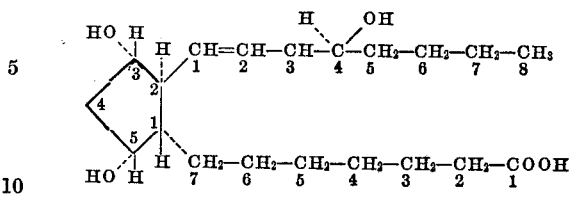

and is named systematically (using the numbering shown) as:

7[3α,5α-dihydroxy-2(3-hydroxy - 1 - octenyl) - cyclopentyl]-heptanoic acid.

Dyhydroprostaglandin $F_{1\alpha}$ has the following structure:

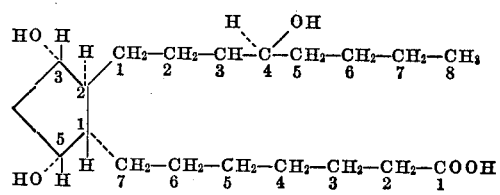

and is named systematically (using the numbering shown) as:

7[3α,5α-dihydroxy-2(3 - hydroxyoctyl) - cyclopentyl]-heptanoic acid.

The dotted line attachments shown in the above formulae indicate that these substituents are in the α-configuration, i.e., are below the plane of the cyclopentane nucleus.

The PGF series of compounds is characterized by the presence of a hydroxy group at the 5-position in the cyclopentane ring. The PGE series is characterized by the presence of a keto group in the 5-position of the cyclopentane ring.

Broadly described, the process of this invention for producing prostaglandins and prostaglandin analogs comprises the following steps. The 3,5-oxygenated cyclopentane ring of the prostaglandins is provided by 4-cyclopentene-1,3-dione. This is condensed with butadiene to provide the known 3aα,4,7,7aα-tetrahydro-1,3-indanedione (1), and the keto groups are reduced to give a mixture of 1,3-diols, 3A and 3B. The non-carboxylic side chain of the prostaglandins is obtained by oxygenating the double bond in the 6-membered ring of diols 3A and 3B and their functionally converted derivatives 4A and 4B, and treating the resulting ketone with an alkyl metal compound, dehydrating the resulting carbinol, and cleaving the unsaturated six membered ring, giving compound 9A with the neutral side chain at the 2-position of the cyclopentane ring complete and an aldehyde group at the 1-position. The acidic side chain is obtained by treating the aldehyde with a Wittig reagent and reducing the resulting unsaturated ester thus obtaining isoprostaglandins wherein the side chains have the cis-configuration. Isomerization of the unsaturated acid side chain produces the prostaglandins having the side chains in a trans arrangement.
The novel processes and intermediates of this invention are illustratively represented by the following sequence of formulae:
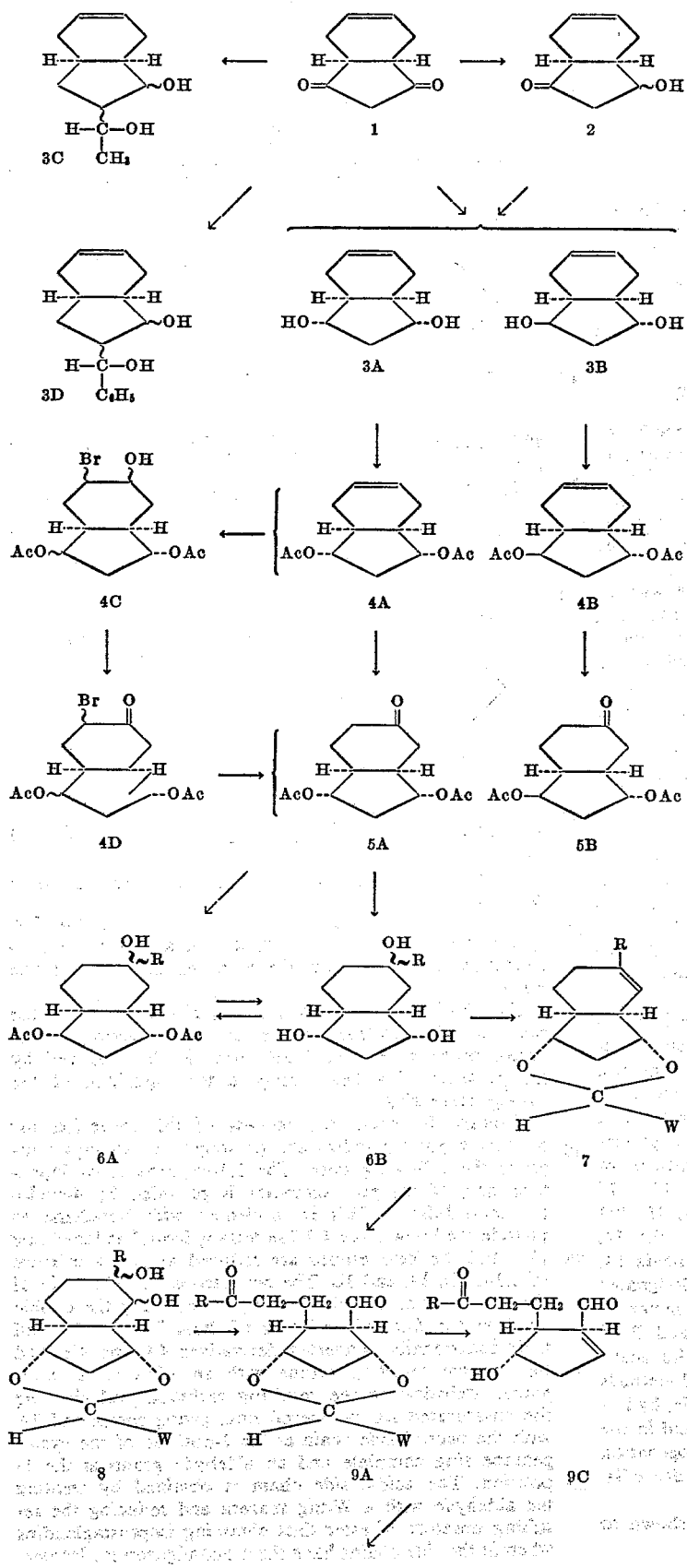

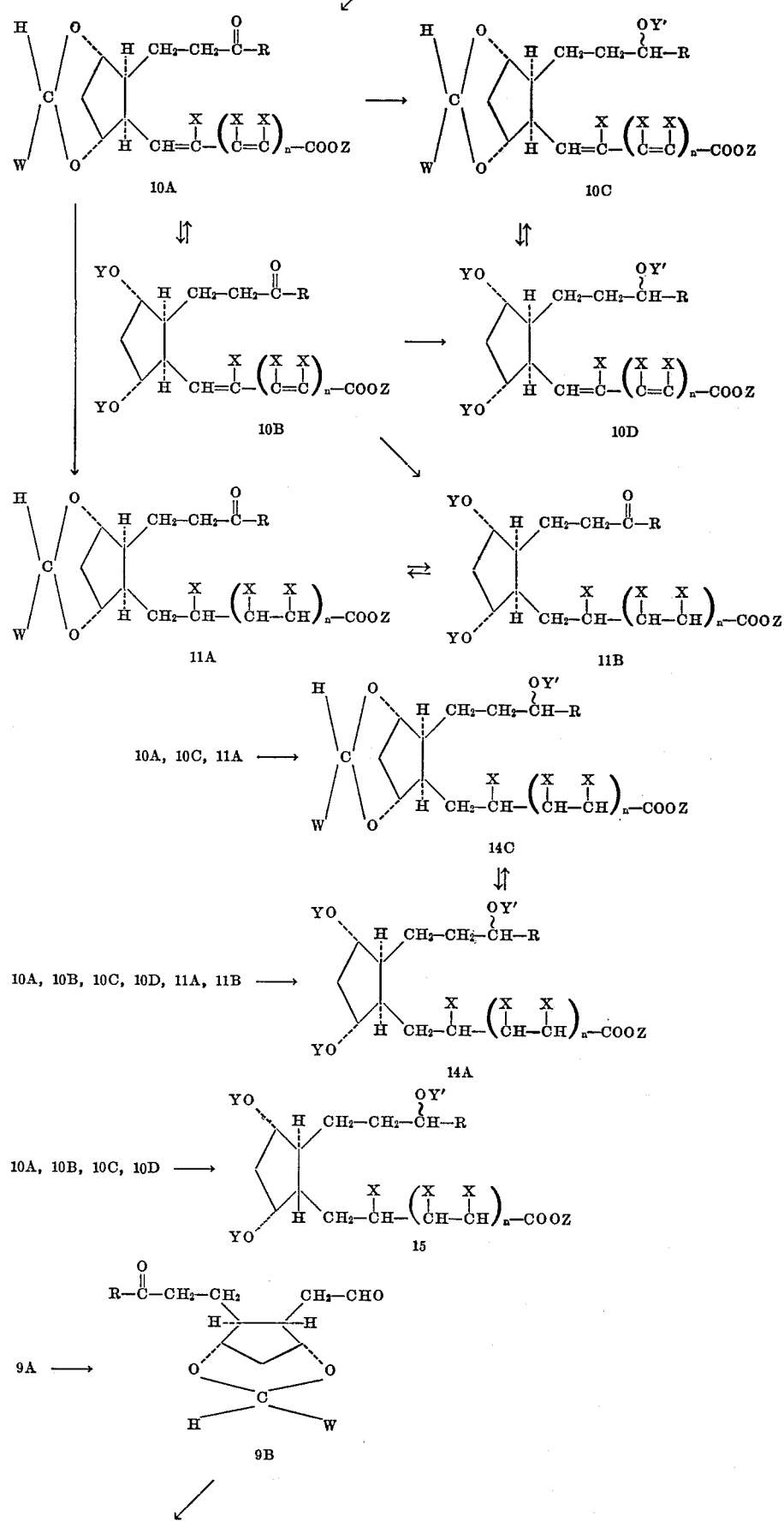

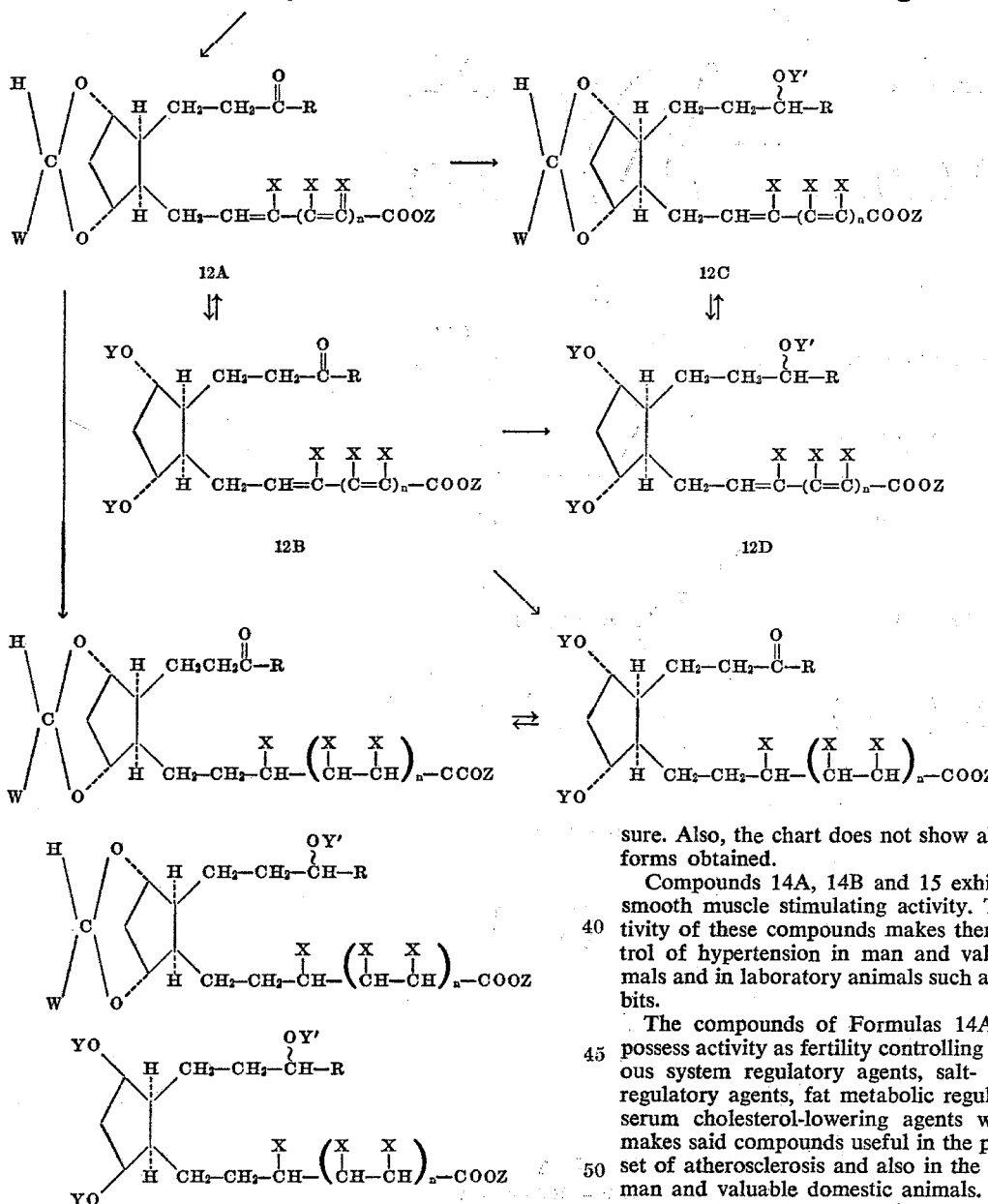

wherein Ac is the acyl radical of a hydrocarbon carboxylic acid containing from 1 to 12 carbon atoms, inclusive, R is an alkyl group, either straight or branched chain, containing from 1 to 8 carbon atoms, inclusive, Z is hydrogen or an alkyl group containing from 1 to 12 carbon atoms, inclusive, W is hydrogen, an alkyl or substituted alkyl group containing from 1 to 8 carbon atoms, inclusive, or an aryl or substituted aryl group containing from 6 to 8 carbon atoms, inclusive, Y and Y' are hydrogen or the acyl radical of a hydrocarbon carboxylic acid containing from 1 to 12 carbon atoms, inclusive, $n$ is an integer selected from the group consisting of 0, 1 and 2, and X is hydrogen or methyl with the proviso that not more than one X can be methyl in a given side chain.

In the process of this invention all the asymmetric compounds can be produced as racemic mixtures. Alternatively, the racemic mixtures can be resolved at appropriate stages by methods well known in the art, whereupon subsequent products may be obtained as the corresponding optically pure diastereoisomers. In the chart both diastereoisomeric forms as well as the racemic forms are depicted by a single representation which should, however, not be considered to limit the scope of the disclosure. Also, the chart does not show all the stereoisomeric forms obtained.

Compounds 14A, 14B and 15 exhibit hypotensive and smooth muscle stimulating activity. The hypotensive activity of these compounds makes them useful in the control of hypertension in man and valuable domestic animals and in laboratory animals such as mice, rats and rabbits.

The compounds of Formulas 14A, 14B and 15 also possess activity as fertility controlling agents, central nervous system regulatory agents, salt- and water-retention regulatory agents, fat metabolic regulatory agents and as serum cholesterol-lowering agents which latter activity makes said compounds useful in the prevention of the onset of atherosclerosis and also in the treatment thereof in man and valuable domestic animals. The activity of said compounds as fat metabolic regulatory agents makes them useful in the control of obesity in man and valuable domestic animals.

Prostaglandins produce pronounced changes in blood pressure and block the action of epinephrine on the bladder, altering fluid transport. Agents which counteract or block this action of prostaglandin are of great interest in clinical research. To assay large numbers of compounds for prostaglandin blocking activity requires a steady supply both for treatment of control animals and for coadministration to test animals with potential blockers. Until recently prostaglandins have been available only in milligram amounts after extraction from semen or seminal vesicle tissue. Recently a biosynthetic procedure has been developed for manufacture of prostaglandins from certain essential fatty acids. This procedure has greatly improved the availability of prostaglandin supplies and has permitted limited screening for prostaglandin-blocking agents. The biosynthetic process is however complex, as seminal vesicles from non-castrated rams or bulls are required, essential fatty acids are needed for substrate, and a mixture of products is often encountered, purification of which is difficult and tedious. The cost of producing prostaglandins by this method in sufficient amount to satisfy current needs is so high as to be a limiting factor in research. It is a purpose of this invention to provide prostaglandins and prostaglandin-like materials to substitute for natural prostaglandins in the prostaglandin antagonist assays. It is another purpose to provide a synthetic method for preparing prostaglandins and prostaglandin-like materials in substantial amount and in good purity to provide standard materials for use in prostaglandin antagonist assays. It is a further purpose to prepare sufficient prostaglandins and prostaglandin-like materials to permit a large scale screening of large numbers of compounds in sufficient numbers of animals to obtain statistically significant biological data in prostaglandin antagonist assays.

In carrying out the process of the present invention, $3a\alpha,4,7,7a\alpha$ - tetrahydro - 1,3 - indanedione (1) is reduced to racemic $3a\alpha,4,7,7a\alpha$ - tetrahydro - $1\alpha$(and $1\beta$) - hydroxy-3-indanone (2) which is further reduced to give $3a\alpha,4,7,7a\alpha$ - tetrahydro - $1\alpha,3\alpha$ - indanediol (3A) and racemic $3a\alpha,4,7,7a\alpha$ - tetrahydro - $1\alpha,3\beta$ - indanediol (3B). Reduction may be accomplished by methods in themselves well known in the art and may be accomplished with or without isolation of the intermediate hydroxyketone. In a preferred method reduction may be accomplished, for example, with an alkali metal such as sodium or potassium in an alcohol, lithium in liquid ammonia, or lithium aluminum hydride.

When reducing $3a\alpha,4,7,7a\alpha$ - tetrahydro - 1,3 - indanedione (1) with sodium or potassium in an alcohol a large excess of reducing agent is used and the reaction is usually carried out at the reflux temperature of the alcohol. The mixture is heated at reflux until the sodium or potassium has dissolved, which can take from less than an hour to several hours. When the reduction is carried out with sodium or potassium in ethanol, $3a\alpha,4,7,7a\alpha$-tetrahydro-$1\alpha,3\alpha$-indanediol (3A) is the main product isolated, with a lesser amount of racemic $3a\alpha,4,7,7a\alpha$-tetrahydro-$1\alpha,3\beta$-indanediol isolated. Using sodium or potassium in isopropyl or isobutyl alcohol for reduction results in the formation of racemic $3a\alpha,4,7,7a\alpha$-tetrahydro-$1\alpha$(and $1\beta$)-hydroxy-3-indanone (2).

Reduction of $3a\alpha,4,7,7a\alpha$ - tetrahydro - 1,3 - indanedione (1) with lithium in liquid ammonia results in the formation of racemic $3a\alpha,4,7,7a\alpha$ - tetrahydro - $1\alpha$(and $1\beta$)-hydroxy-3-indanone (2) as the major product even when excess lithium is used. The thus obtained racemic $3a\alpha,4,7,7a\alpha$ - tetrahydro - $1\alpha$(and $1\beta$) - hydroxy - 3 - indanone (2) is further reduced to a mixture of $3a\alpha,4,7,7a\alpha$ - tetrahydro - $1\alpha,3\alpha$ -indanediol (3A) and racemic $3a\alpha,4,7,7a\alpha$ - tetrahydro - $1\alpha,3\beta$ - indanediol (3B) by further reduction with excess lithium in liquid ammonia.

Reduction of $3a\alpha,4,7,7a\alpha$ - tetrahydro - $1\alpha$(and $1\beta$)-hydroxy-3-indanone (2) with lithium aluminum hydride gives a mixture of $3a\alpha,4,7,7a\alpha$-tetrahydro-$1\alpha,3\alpha$-indanediol (3A) and racemic $3a\alpha,4,7,7a\alpha$-tetrahydro-$1\alpha,3\beta$-indanediol (3B) in which the $1\alpha,3\alpha$-diol (3A) predominates. The reduction is carried out in a solvent, e.g., diethyl ether or tetrahydrofuran, and usually at room temperature or below. An excess of reducing agent is used. A slight excess is preferred.

The preferred process for production of $3a\alpha,4,7,7a\alpha$-tetrahydro-$1\alpha,3\alpha$-indanediol (3A) and racemic $3a\alpha,4,7,7a\alpha$ - tetrahydro - $1\alpha,3\beta$ - indanediol (3B) is to reduce $3a\alpha,4,7,7a\alpha$ - tetrahydro - 1,3 - indanedione (1) with lithium in liquid ammonia, isolate the crude $3a\alpha,4,7,7a\alpha$-tetrahydro - $1\alpha$(and $1\beta$) - hydroxy - 3 - indanone (2) and without further purification reduce the crude (2) with lithium aluminum hydride to obtain the mixed diols (3A and 3B). These can be separated and purified by chromatography, e.g., over Florisil (synthetic magnesium silicate), by crystallization, by formation of derivatives such as acylates or acetals and regeneration of the parent glycols, by selective complexing, e.g., with boric acid, or by combinations of the above methods.

Direct reduction of $3a\alpha,4,7,7a\alpha$-tetrahydro-1,3-indanedione (1) with excess lithium aluminum hydride in a solvent followed by addition of an ester to destroy the excess hydride does not ordinarily produce a good yield of the 1,3-diols. When ethyl acetate is used to destroy the excess hydride, the product of the reduction is $3a\alpha,4,7,7a\alpha$-tetrahydro-1-hydroxy-$\alpha$-methyl - 2-indane-methanol (3C) and when methyl benzoate is substituted for ethyl acetate the reduction product is $3a\alpha,4,7,7a\alpha$-tetrahydro - 1-hydroxy-$\alpha$-phenyl - 2-indanemethanol (3D). $3a\alpha,4,7,7a\alpha$-tetrahydro - 1-hydroxy-$\alpha$-methyl-2-indanemethanol (3C) and $3a\alpha,4,7,7a\alpha$-tetrahydro - 1-hydroxy-$\alpha$-phenyl - 2-indanemethanol (3D) have CNS depressant and antifungal properties and are useful as feed supplements for farm animals.

Acylation of $3a\alpha,4,7,7a\alpha$-tetrahydro - $1\alpha,3\alpha$-indanediol (3A) and racemic $3a\alpha,4,7,7a\alpha$-tetrahydro - $1\alpha,3\beta$-indanediol (3B) to produce the corresponding 1,3-diacylates is carried out by treating the diol with the anhydride or halide of a hydrocarbon carboxylic acid containing from 2 to 12 carbon atoms, inclusive, in the presence of a catalyst, for example, pyridine, p-toluene-carboxylic acid, $BF_3$, etc., or directly with a hydrocarbon carboxylic acid containing from 1 to 12 carbon atoms, inclusive, in the presence of an esterification catalyst, for example, p-toluenesulfonic acid. Easily crystallizable esters are preferred, for example, the benzoate ester.

Racemic $3a\alpha,4,7,7a\alpha$-tetrahydro - $1\alpha,3\alpha$-dihydroxy - 5 (4H)-indanone diacylate (5A) and racemic $3a\alpha,6,7,7a\alpha$-tetrahydro - $1\alpha,3\beta$-dihydroxy - (5H)-indanone diacylate (5B) are prepared from the corresponding $3a\alpha,4,7,7a\alpha$-tetrahydro-1,3-indanediol diacylates by treatment with excess diborane followed by oxidation. At least ¼ mole of diborane is used, preferably ½ mole or more. The reaction with diborane is carried out at room temperature or below, preferably at about 0° C., and in a non-hydroxylated solvent, e.g., ether, diglyme, methyl cellosolve, tetrahydrofuran, or a mixture of solvents. The reaction is quite fast but is preferably allowed to proceed for about an hour or more at 0° C., then the excess diborane is decomposed by addition of water. The reaction mixture is treated directly with an oxidizing agent, for example, chromium trioxide in aqueous acetic acid or sodium dichromate in aqueous sulfuric acid, and the product is isolated by extraction and purified by crystallization, chromatography, or a combination of the two. As starting material, a mixture of $3a\alpha,4,7,7a\alpha$-tetrahydro-$1\alpha,3\alpha$-indanediol diacylate (4A) and racemic $3a\alpha,4,7,7a\alpha$-tetrahydro - $1\alpha,3\beta$-indanediol diacylate (4B) can be used and affords a mixture of racemic $3a\alpha,6,7,7a\alpha$-tetrahydro-$1\alpha,3\alpha$-dihydroxy - 5(4H)-indanone diacylate (5A) and racemic $3a\alpha,6,7,7a\alpha$-tetrahydro - $1\beta,3\alpha$-dihydroxy-5(4H)-indanone diacylate (5B) which is separable by chromatography over Florisil (synthetic magnesium silicate), or by crystallization.

In an alternate preparation of racemic $3a\alpha,6,7,7a\alpha$-tetrahydro - $1\alpha,3\alpha$-dihydroxy - 5(4H)-indanone diacylate (5A) and racemic $3a\alpha,6,7,7a\alpha$-tetrahydro - $1\beta,3\alpha$-dihydroxy - 5(4H)-indanone diacylate (5B), the corresponding $3a\alpha,4,7,7a\alpha$-tetrahydro - $1\alpha,3\alpha$-indanediol diacylate (4A) and racemic $3a\alpha,4,7,7a\alpha$-tetrahydro - $1\alpha,3\beta$-indanediol diacylate (4B) are treated with hypobromous acid in a tertiary alcohol to obtain racemic $6(\alpha$ and $\beta)$-bromo-$3a\alpha,4,5,6,7,7a\alpha$-hexahydro - $1\alpha,3\alpha,5(\alpha$ and $\beta)$-indanetriol 1,3-diacylate (4C) and racemic $6(\alpha$ and $\beta)$-bromo-$3a\alpha,4,5,6,7,7a\alpha$-hexahydro-$1\beta,3\alpha,5(\alpha$ and $\beta)$-indanetriol 1,3-diacylate (4C) which are then oxidized in acetic acid solution with chromium trioxide to obtain racemic $6(\alpha$ and $\beta)$-bromo - $3a\alpha,6,7,7a\alpha$-tetrahydro - $1\alpha,3\alpha$-dihydroxy - 5 (4H)-indanone diacylate (4D) and racemic $6(\alpha$ and $\beta)$-bromo - $3a\alpha,6,7,7a\alpha$-tetrahydro - $1\beta,3\alpha$-dihydroxy - 5 (4H)-indanone diacylate (4D) which are isolated by extraction and then treated with zinc in acetic acid to afford compounds 5A and 5B.

When a mixture of $3a\alpha,4,7,7a\alpha$-tetrahydro - $1\alpha,3\alpha$-indanediol (3A) and racemic $3a\alpha,4,7,7a\alpha$-tetrahydro-$1\alpha,3\beta$-indanediol (3B) obtained as described above by the reduction of 3aα,4,7,7aα-tetrahydro-1,3-indanedione (1) is carried through without separation of isomers to a mixture of racemic 3aα,6,7,7aα-tetrahydro-1α,3α-dihydroxy-5(4H)-indanone diacylate (5A) and racemic 3aα,6,7,7aα-tetrahydro - 1β,3α-dihydroxy - 5(4H)-indanone diacylate (5B) the 1α,3α-form predominates and the crude mixture may be used without purification for the next step of this invention. Alternatively, the 1α,3α-diol diacylate may be obtained from the mixture in pure form by crystallization, for example, from ether or from a mixture of acetone and hexane, or by chromatography, and the pure 1α,3α-diol is then used as starting material for the next step. Racemic 3aα,6,7,7aα-tetrahydro - 1β,3α-dihydroxy-5(4H)-indanone diacylate (5B) is a valuable intermediate for the production of the PGE series of prostaglandins and prostaglandin analogs and may be used in place of racemic 3aα,6,7,7aα-tetrahydro - 1α,3α-dihydroxy -5(4H)-indanone diacylate (5A) to produce biologically-active intermediates which can be converted to prostaglandin-like end products epimeric at C–1 of the cyclopentane ring.

A mixture of racemic 3aα,4,5,6,7,7aα-hexahydro - 5α-alkyl-1α,3α,5β-indanetriol (6B) and racemic 3aα,4,5,6,7,7aα-hexahydro - 5β-alkyl - 1α,3α,5α-indanetriol (6B) is obtained by treating racemic 3aα,6,7,7aα-tetrahydro-1α,3α-dihydroxy - 5(4H)-indanone diacylate (5A) with an alkyl metal compound, preferably an alkyl magnesium halide. The alkyl group can contain from 1 to 8 carbon atoms, and be straight or branched chain. For the preparation of dihydroprostaglandin $F_{1\alpha}$ or 8-isodihydroprostagland in $F_{1\alpha}$ the alkyl group must be amyl. Ordinarily five moles or more of alkyl magnesium halide is used. However, by using only a small excess over one mole of alkyl magnesium halide scission of the 3,5-ester groups is avoided and the product is a mixture of racemic 3aα,4,5,6,7,7aα-hexahydro - 5α-alkyl - 1α,3α,5β - indanetriol 3,5-diacylate (6A) and racemic 3aα,4,5,6,7,7aα-hexahydro-5β-alkyl - 1α,3α,5α-indanetriol 1,3-diacylate (6A), which is hydrolyzed, for example, with an alkali such as sodium hydroxide in a solvent such as aqueous ethanol to the free triols. The 5α- and 5β-alkylhexahydroindanetriols can be separated by crystallization from a solvent such as ethyl acetate or a mixture of acetone and hexanes, or by chromatography. Both products, or the mixture, can be used in the next step.

Racemic 3aα,6,7,7aα-tetrahydro - 5 - alkyl-1α,3α-indanediol 1α,3α-acetal (7) is prepared in one step from racemic 3aα,4,5,6,7,7aα-hexahydro-5α - alkyl - 1α,3α,5β-indanetriol, racemic 3aα,4,5,6,7,7aα - hexahydro-5β-alkyl-1α,3α,5α-indanetriol, or a mixture of the two, by treatment with an aldehyde and an acid catalyst and removal of the water formed in the reaction. The reaction is carried out in a water-immiscible solvent, e.g., benzene or xylene, at reflux temperatures for a period of several hours. A strong acid, e.g., sulfuric acid, a Lewis acid, e.g., $BF_3$, or an aryl sulfonic acid, e.g., p-toluenesulfonic acid, is used as catalyst. Aldehydes which may be used are, for example, formaldehyde, acetaldehyde, propionaldehyde, chloral, benzaldehyde, p-bromobenzaldehyde, 2,4,6-trichlorobenzaldehyde, p - carbomethoxybenzaldehyde, p-nitrobenzaldehyde, and the like. An aldehyde giving an easily crystallizable acetal is preferred, for example, p-nitrobenzaldehyde. The acetal is recovered by washing the reaction mixture with aqueous saturated sodium bisulfide to remove the excess aldehyde, then with a mild aqueous alkali, e.g., sodium bicarbonate, to remove the acid catalyst, and finally evaporating the solvent. The thus obtained racemic 3aα,6,7,7aα-tetrahydro - 5 - alkyl-1α,3α-indanediol 1,3-acetal (7) is freed of small amounts of 3aα, 4,7,7aα - tetrahydro-5-alkyl - 1α,3α-indanediol 1,3-acetal and is purified by chromatography, e.g., over Florisil (synthetic magnesium silicate), crystallization, or a combination of chromatography and crystallization.

In an alterate method for preparing racemic 3aα,6,7,7aα - tetrahydro - 5 - alkyl-1α,3α-indanediol 1α,3α-acetal (7), compound 6A (prepared either from 5A with about an equimolar amount of Grignard reagent as described above, or from 6B by acylation as described above for the acylation of compound 3A) is treated under mild dehydrating conditions known in the art for dehydrating tertiary alcohols, e.g., reflux with toluenesulfonic acid or oxalic acid in benzene, or dehydration with $I_2$, $SOCl_2$, $POCl_3$, and the like, to afford the corresponding anhydro product, racemic 3aα,6,7,7aα - tetrahydro-5-alkyl-1α,3α-indanediol diacylate, mixed with varying amounts of 3aα, 4,7,7aα - tetrahydro-5-alkyl-1α,3α-indane diacylate, which can be separated and purified by conventional methods. Vigorous acylation conditions result in dehydration and acylation of racemic 3aα, 4,5,6,7,7aα-hexahydro-5α(and 5β)-pentyl - 1α,3α,5β(and 5α)-indanetriol (6B) to give racemic 3aα,6,7,7aα - tetrahydro - 5-pentyl-1α,3α-indanediol 1,3-diacylate in one step. The racemic 3aα,6,7,7aα-tetrahydro - 5 - alkyl-1α,3α-indanediol diacylate is then hydrolyzed with dilute alkali such as sodium hydroxide in aqueous alcohol or with dilute acid to give the corresponding free alcohol, which when treated under acetal forming conditions as described above provides racemic 3aα,6,7,7aα - tetrahydro - 5 - alkyl-1α,3α-indandiol 1α,3α-acetal (7). As a further variation, the 1,3-diacylate can be carried through the glycol formation and cleavage and the Wittig reaction to obtain compounds of Formula 10B.

Hydroxylation of racemic 3aα,6,7,7aα - tetrahydro-5-alkyl-1α,3α-indanediol 1,3-acetal (7) with osmium tetroxide results in a mixture of racemic 3aα,4,5,6,7,7aα-hexahydro - 5β - alkyl-1α,3α,4α,5α-indanetetrol 1,3acetal (8) and racemic 3aα,4,5,6,7,7aα-hexahydro - 5α - alkyl-1α,3α, 4β,5β-indanetetrol 1,3-acetal (8). In one method a small excess of osmium tetroxide is used. The reaction is carried out in a solvent, e.g., ether, tetrahydrofuran, benzene or dioxane, preferably at room temperature or below, for a period of about 10 to 20 hours. Catalytic amounts of pyridine can be added if desired. Osmium salts are then removed, e.g., by treatment with hydrogen sulfide and filtration, and the product is isolated by evaporation of the solvent. Alternatively, the hydroxylation is carried out with a catalytic amount of osmium tetroxide (1–10 percent of the weight of starting material) and an oxidizing agent, e.g., soduim metaperiodate. The oxidizing agent is used in excess. The reaction is carried out in a solvent, e.g., t-butanol, acetone, or preferably, tetrahydrofuran, at reflux temperatures for a period of about 5 to 30 hours depending upon the temperature, concentration, and amount of osmium tetroxide used. The product is isolated, for example, by adding water to the reaction mixture and extracting with a water-immiscible solvent such as methylene chloride.

Alternatively, potassium permanganate can be used as the oxidant by gradual addition as a solution in water or acetone to a buffered aqueous acetone solution of racemic 3aα,6,7,7aα - tetrahydro-5-alkyl - 1α,3α-indanediol 1α,3α-acetal (7) at or below room temperature. After addition of a slight excess of permanganate, the oxidant is decomposed with sodium bisulfite, the inorganic precipitate is removed by filtration, and the product is recovered by extraction and purified by chromatography and crystallization. Although separation of the thus-obtained mixture of racemic 3aα,4,5,6,7,7aα - hexahydro - 5β-alkyl-1α,3α-indanetetrol 1,3 - acetal (8) and racemic 3aα,4,5,6,7,7aα-hexahydro-5α-alkyl - 1α,3α,4β,5β-indanetetrol 1,3-acetal (8) is unnecessary, it can be accomplished by crystallization, chromatogrphy, e.g., over synthetic magnesium silicate or silica gel, or a combination of the two. Either isomer, or the mixture, can be used in the next step of the invention and it is advantageous to use the mixture.

Racemic 3α,5α - dihydroxy - 2β-(3-oxoalkyl)-cyclopentane - 1β - carboxyaldehyde 3,5-acetal (9A) is obtained by oxidizing racemic 3aα,4,5,6,7,7aα-hexahydro-5β-alkyl-1α,3α,4α,5α-indanetetrol 1,3-acetal (8), racemic 3aα,4,5,6,7,7aα - hexahydro - 5α-alkyl-1α,3α,4β,5β-indanetetrol 1,3-acetal (8), or a mixture of the two, with lead tetraacetate. The reaction is carried out in a solvent such as benzene or xylene, preferably at room temperature, for a period of several hours. The product is isolated by filtering the reaction mixture to remove excess lead tetraacetate and lead salts, then evaporating the filtrate. Alternatively, the glycol cleavage to produce racemic $3\alpha,5\alpha$-dihydroxy-$2\beta$-(3-oxoalkyl)cyclopentane - $1\beta$ - carboxaldehyde 3,5-acetal (9A) can be accomplished with periodic acid under conditions well known in the art.

Hydrolysis of racemic $3\alpha,5\alpha$-dihydroxy - $2\beta$ - (3-oxoalkyl)cyclopentane - $1\beta$ - carboxaldehyde 3,5-acetal (9A) with a strong acid such as sulfuric or hydrochloric acid in an aqueous organic solvent mixture ordinarily results in simultaneous dehydration to give racemic $5\beta$ - (3-oxoalkyl - $4\alpha$ - hydroxy - 1-cyclopentene-1-carboxaldehyde (9C) which possesses CNS depressant, antiviral, and insecticidal activity.

In the next step, racemic $3\alpha,5\alpha$ - dihydroxy-$2\beta$-(3-oxoalkyl)-cyclopentane - $1\beta$ - carboxaldehyde 3,5-acetal (9A) is subjected to the Wittig reaction to produce the compounds of Formula 10A. The Wittig reagents herein used can be generally represented, for example, by the following formula (other phosphorus derivatives known to afford Wittig reagents, such as the diethyl phosphonates, can also be used):

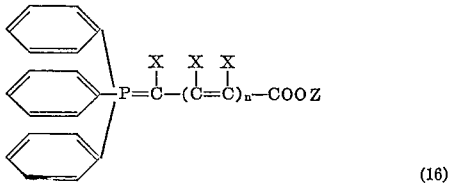

(16)

wherein X is hydrogen or methyl, with the proviso that only one methyl group can be present in a given side chain, Z is hydrogen or an alkyl group containing from 1 to 12 carbon atoms, inclusive, and $n$ is an integer selected from the group consisting of 0, 1 and 2. The Whittig reagents are prepared by reacting a halogen substituted unsaturated acid of the formula:

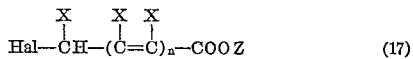

(17)

wherein X, Z and $n$ are defined as above, and Hal is bromine or chlorine, with triphenylphosphine to obtain a triphenyl phosphonium halide of the formula:

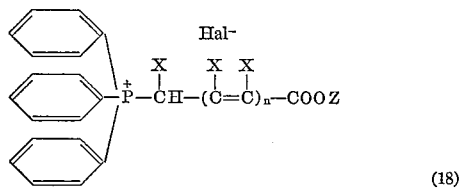

(18)

wherein X, Z and $n$ are defined as above, and treating the triphenyl phosphonium halide with a base such as sodamide, or sodium or potassium hydride, the sodium or potassium metalate of dimethylsulfoxide, phenyl lithium, sodium or potassium hydroxide, and the like. The base, by eliminating hydrogen halide from the phosphonium halide of structure 18, produces the phosphorane of structure 16. [The preparation of phosphoranes is discussed in detail by Tripett, Quart. Rev. XVII, No. 4, p. 406 (1963).] At least one mole of Whittig reagent is used per mole of aldehyde (9A), and preferably from 2 to 10 moles of Whittig reagent is used. The reaction is generally carried out in an organic solvent, such as ether, benzene, toluene, hexane, dimethylsulfoxide, tetrahydrofuran, methylene chloride, chloroform, or the like, at temperatures between 0° C. and the reflux temperature of the reaction mixture, preferably at room temperature or below. The reaction is carried out for a period of a few hours to several days depending on the temperature and concentration of the reaction mixture and the specific Whittig reagent used. After the reaction is substantially complete the product, a substituted unsaturated ester of Formula 10A, is recovered from the reaction mixture in a conventional manner, for example by evaporating the solvent from the reaction mixture or by adding water and extracting with a water-immiscible solvent. The crude product can be purified by conventional means, such as recrystallization, chromatography, e.g., over Florisil (synthetic magnesium silicate) or silica gel, or both. In compounds formed by the Wittig reaction the trans configuration is usually favored.

The thus obtained unsaturated ester of Formula 10A is hydrolyzed with an acid to remove the 3,5-acetal group thus producing the 3,5-diol of Formula 10B. The hydrolysis is carried out in a conventional manner by means of a strong acid such as sulfuric or hydrochloric acid in an aqueous organic solvent mixture, wherein the organic solvent can be, for example, acetone methanol, ethanol, dioxane, dimethylsulfoxide, and the like. The reaction mixture is allowed to stand at room temperature until the hydrolysis is complete or is heated under reflux for several hours, then the product is recovered in a conventional manner, for example, by adding water to the reaction mixture and extracting with a water-immiscible solvent or by neutralizing the acid and evaporating the reaction mixture. The product can be purified by conventional means, for example, by chromatography over silica gel or synthetic mangesium silicate, or by crystallization, or both.

The keto group in the unsaturated esters of Formula 10B is reduced, e.g., with lithium tri-tert.-butoxyaluminum hydride, sodium borohydride, or the like to produce the compounds of Formula 10D. The reaction is conducted in a solvent, e.g., methanol, ethanol, tetrahydrofuran, and the like, preferably at about room temperature for a period of several hours and with excess reducing agent. The product is recovered in a conventional manner, for example, by first destroying excess reducing agent, usually by adding dilute acid, then extracting with a water immisible solvent. The product can be purified by chromatography, e.g., over Florisil or silica gel.

Alternatively, the compounds of Formula 10D can be prepared from the corresponding compounds of Formula 10A by first reducing the keto group in the same manner as the reduction of the keto group in compound 10B, thus producing the compounds of Formula 10C, and then removing the 3,5-acetal by hydrolysis in the same manner as the hydrolysis of compounds of Formula 10A.

Reduction of the ethylenic double bonds in the compounds of Formulas 10A and 10B without concomitant reduction of the keto group is accomplished by hydrogenation using palladium or rhodium as catalyst. A solvent is used, e.g., methanol, ethanol, tetrahydrofuran, and the like. The reduction is preferably carried out at room temperature and at a pressure of about 1 or more atmospheres. The reaction is stopped when the theoretical amount of hydrogen for saturation of the ethylenic double bonds has been absorbed. The products, the corresponding compounds of Formulas 11A and 11B, are recovered by conventional means, for example, by separating the catalyst by filtration and removing the solvent by evaporation.

When the acetal substituent W of compounds of Formula 11A contains easily reducible groups such as nitro bromo, these groups can of course undergo reduction during the catalytic hydrogenation of the double bonds as described above, but this change of the group W is of no practical importance since ordinarily it is desirable to remove the acetal group immediately thereafter or during the work-up of the product. When W contains such readily reduced groups the uptake hydrogen must of course be increased, depending on the catalyst, to allow the reduction to go to completion. This same precaution applies to the catalytic hydrogenation of other acetals, for example, the compounds of Formulas 10A, 10C, 12A, 12C, and 13A.

Compounds of Formula 11B are prepared from the acetals of Formula 11A by hydrolysis in ways known in the art, as described above for the preparation of compounds of Formula 10B from the acetals of Formula 10A. In like manner hydrolysis of the acetals 14C, 12A, 12C, 13A and 14D gives the corresponding free alcohols, 14A, 12B, 12D, 13B and 14B.

The $3\alpha,5\alpha$-diols of Formulas 10B, 10D, 11B, 14A, 12B, 12D, 13B, 14B and 15 can, if desired, be converted to the corresponding acetals by treatment with an aldehyde under mild acetal-forming conditions well known in the art, as described above for the conversion of the compounds of Formula 6B to those of Formula 7.

Isodihydroprostaglandin $F_{1\alpha}$ and related prostaglandin-like compounds (compounds of Formula 14A) are obtained by reduction of the compounds of Formulas 10A, 10B, 10C, 10D, 11A and 11B, with hydrogen in the presence of a catalyst such as platinum, Raney nickel, cobalt hydrocarbonyl, and palladium (about 100–300 mg. of 30% palladium on carbon per gram of compound to be reduced) at about room temperature until hydrogen uptake ceases. The reaction is carried out in a solvent, e.g., an alcohol. The product is recovered by conventional means, for example, by separating the catalyst by filtration and evaporating the filtrate to leave a residue. When the compound reduced is an acetal (e.g., 10A, 10C, 11A) the thus obtained residue is ordinarily dissolved in a solvent such as ether and washed with dilute acid to remove the acetal group. When removal of the acetal groups is not complete, the product is permittd to stand in dilute aqueous alcoholic acid solution until hydrolysis is complete and is then extracted. In either case the solvent is then evaporated to give the prostaglandin or prostaglandin-like compounds of Formula 14A.

Reduction of compounds of Formula 10D to give compounds of Formula 14A is accomplished by hydrogenation using palladium or rhodium as a catalyst. About 50 to 200 mg. of 1 to 5 percent rhodium or palladium on a support such as alumina, carbon, calcium carbonate and the like is used per gram of compound to be reduced. The reaction is carried out in a solvent, e.g., an alcohol, preferably at room temperature. When the theoretical amount of hydrogen has been absorbed, the product is recovered from the reaction mixture in a conventional manner, for example, by filtering to remove the catalyst and evaporating the filtrate to leave the product as a residue. Reduction of compounds of Formula 11B to compounds of Formula 14A is accomplishtd by treating the starting compounds with, for example, metal hydride such as lithium tri-tert-butoxyaluminum hydride, sodium borohydride, and the like, or with hydrogen and a catalyst such as platinum or Raney nickel. In either case the product is isolated by conventional means. When a metal hydride is used the product is recovered, for example, by acidifying the reaction mixture then extracting with a water-immiscible organic solvent and evaporation of the solvent. When the starting compound is reduced by hydrogenation in the presence of a catalyst, the product is recovered, for example, by separating the catalyst by filtration, and evaporating the solvent.

The compounds of Formula 14C, the 3,5-acetals of the compounds of Formula 14A, are obtained by reduction of compounds 10A, 10C and 11A as described above with hydrogen and a catalyst such as platinum, Raney nickel, palladium and rhodium, in a solvent such as an alcohol. The product is recovered, for example, by removing the catalyst by filtration and evaporating the filtrate. Compounds of Formula 14C can also be obtained from compounds of Formula 11A by reduction with a metal hydride and subsequent isolation as described above for the reduction of 11B.

Dihydroprostaglandin $F_{1\alpha}$ and related prostaglandins (compounds of Formula 15) are obtained by reduction of compounds 10A, 10B, 10C and 10D under conditions leading to rearrangement of the unsaturated side chain at the point of attachment to the cyclopentane ring. This is accomplished, for example, by heating a mixture of the compound to be reduced and a typical hydrogen mobilizing catalyst, for example, pre-reduced 30% palladium on carbon, Raney nickel, platinum, or cobalt hydrocarbonyl in a solvent such as methanol, ethanol, isopropanol, tetrahydrofuran, and the like at reflux temperature for a period of several hours. The reaction mixture is then hydrogenated, preferably at room temperature, until uptake of hydrogen ceases. The product is recovered by conventional methods, for example, the catalyst is separated by filtration and the filtrate is evaporated leaving the product as a residue. If an acetal group is present, as in the reduction of compounnds of Formulas 10A and 10C, the product is dissolved in a solvent, e.g., ether or tetrahydrofuran, and washed with an aqueous strong acid, such as hydrochloric acid, to complete removal of the acetal group.

The prostaglandins (compounds of Formula 15) and isoprostaglandins (compounds of Formula 14A) obtained as described above, are sometimes crystalline, in which case purification is possible by conventional means such as crystallization, chromatography over Florisil (synthetic magnesium silicate) or silica gel, or a combination of methods. Often the compounds of Formulas 15 and 14A are oils, in which case conventional chromatography is the preferred means of purification. Other means such as countercurrent extraction and high vacuum distillation are also practicable.

When racemic $3\alpha,5\alpha$-dihydroxy-$2\beta$-(3-oxoalkyl)cyclopentane-$1\beta$-carboxaldehyde 3,5-acetal (9A) is treated with Wittig reagents derived from unsaturated acids of Formula 17, above, the unsaturated side chain in the resulting compound of Formula 10A has an odd number of carbon atoms. Compounds of Formula 12A, having an even number of carbon atoms in the unsaturated side chain, are obtained by treating racemic $3\alpha,5\alpha$-dihydroxy-$2\beta$-(3-oxalkyl)-$1\beta$-cyclopentane acetaldehyde or its 3,5-acetal (9B) with a Wittig reagent derived from an unsaturated acid of Formula 17. The racemic $3\alpha,5\alpha$-dihydroxy - $2\beta$ - (3 - oxoalkyl) - $1\beta$ - cyclopentane acetaldehyde 3,5-acetal (9B) is obtained by treating racemic $3\alpha$, $5\alpha$ - dihydroxy - $2\beta$ - (3 - oxoalkyl)cyclopentane - $1\beta$-carboxaldehyde 3,5-acetal (9A) with triphenylmethoxyphosphorane. The reaction is carried out in a solvent such as hexane or other solvents listed above as appropriate for Wittig reactions, using an excess of the Wittig reagent, preferably at about room temperature and for a period of several days. The product is an enol ether which is recovered by conventional means, for example, by evaporating the solvent. Hydrolysis of the enol ether with a strong acid, for example, dilute hydrochloric acid in aqueous acetone, provides racemic $3\alpha,5\alpha$-dihydroxy-$2\beta$-(3-oxoalkyl)-$1\beta$-cyclopentane acetaldehyde. When the hydrolysis is effected in aqueous acetic acid or in aqueous acetone containing a catalytic amount of p-toluene-sulfonic acid at temperatures between 0° and room temperature, the enol ether hydrolyzes more rapidly than the acetal. The reaction mixture is neutralized when thin layer chromatography indicates substantial hydrolysis of the enol ether and before appreciable hydrolysis of the acetal is encountered. The product is recovered by conventional means, such as adding water and extracting with a water-immiscible solvent, and is purified by conventional means such as chromatography or crystallization.

The preparation of compounds 12A, 12B, 12C, 12D, 13A, 13B, 14D and 14B is the same as the preparation of compounds 10A, 10B, 10C, 10D, 11A, 11B, 14C and 14A except that 9B (and the corresponding glycol lacking the acetal groups) is substituted for 9A as the starting material. The compounds of Formula 12A are hydrolyzed to give compounds of Formula 12B in the same manner as described above for the hydrolysis of compounds 10A to 10B. Reduction of compounds 12A to give 12C and 12B to give 12D, is carried out in the same manner as the reduction of compounds 10A to give 10C, and 10B to give 10D, as described above. Hydrolysis of 12C to give compound 12D is carried out as described above for the preparation of compound 10D by hydrolysis of 10C. Reduction of the unsaturated side chain of compounds 12A and 12B to obtain compounds 13A and 13B is carried out in the same manner as reduction of compound 10B to compound 11B. Finally, the isodihydroprostaglandin compounds of Formula 14B are obtained from compounds 12A, 12B, 12C, 12D, 13A and 13B in the same ways that compounds of Formula 14A are obtained from the compounds 10A, 10B, 10C, 10D, 11A and 11B, as described above.

The dehydroprostaglandins, prostaglandin analogs, and intermediates of Formulas 10A–D, 11, 12A–D, 13, 14A, 14B and 15 all possess an esterified carboxyl group. Hydrolysis of the ester group is carried out in a conventional manner, preferably with a dilute alkali such as sodium or potassium hydroxide, or sodium or potassium carbonate or bicarbonate, in an aqueous-organic solvent mixture. The product is recovered in a conventional manner, for example, by acidification of the reaction mixture and extraction with a water-immiscible solvent, use of an ion exchange resin, etc. The thus-obtained free acid, if desired, can be esterified, for example, with a diazoalkane or by other conventional methods for esterification of an organic carboxylic acid to give the corresponding alkyl esters.

Compounds 10B–D, 11, 12B–D, 13, 14A, 14B and 15 contain from 1 to 3 hydroxy groups which can be acylated by conventional means. The acylates can be hydrolyzed with alkali or acid in a conventional manner. It is obvious that almost any combination of free and esterified hydroxyl groups, with the ester group being the same or different, is obtainable by conventional means, e.g., selective esterification, selective hydrolysis, esterification at different stages of reduction, etc.

The production of prostaglandins and prostaglandin-like compounds from 3aα,4,7,7aα-tetrahydro-1,3-indanedione (1) through the intermediate 3aα,4,7,7aα-tetrahydro-1α,3α-indanediol (3A) is described above. The resulting final products are racemic compounds in which the substituents at positions 3 and 5 of the cyclopentane ring both have the α-orientation. By starting with the other isomers obtained by the process of this invention, final products isomeric at 3 and 5 are obtained. For example, when racemic 3aα,6,7,7aα - tetrahydro-1β,3α-dihydroxy-5 (4H)-indanone diacylate (5B) is substituted for racemic 3aα,6,7,7aα - tetrahydro-1α,3α-diacyloxy-5(4H)-indanone (5A) in the process of this invention, there are obtained prostaglandin-like compounds of the structure:

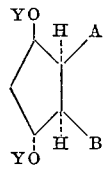

wherein Y is as defined above, A is the 3-oxygenated side chain as in compounds 10A and 10C, and B is acid (or esterified acid) side chain of compounds 10A, 11A, 12A and 13A, through the intermediate compounds racemic 3aα,4,5,6,7,7aα-hexahydro - 5α(and 5β) - alkyl-1β,3α,5β(and 5α) - indanetriol (6-isomer), racemic 3aα, 6,7,7aα - tetrahydro - 5 - amyl - 1β,3α - indanediol 1,3-diacylate, racemic 3aα,4,5,6,7,7aα - hexahydro - 5β (and 5α)-alkyl-1β,3α,4α,5α(and 4β,5β) - indanetetrol 1,3 - diacylate, racemic 3β,5α - dihydroxy-2β-(3-oxoalkyl)-cyclopentane-1β-carboxaldehyde 3,5 - diacylate, and racemic 3β,5α - dihydroxy - 2β-(3-oxoalkyl)-cyclopentane-1β-acetaldehyde 3,5-diacylate.

In the oxidation of racemic 3aα,4,7,7aα - tetrahydro-1α,3β-indanediol 1,3-diacylate (4B) to provide racemic 3aα,6,7,7aα - tetrahydro - 1β,3α - dihydroxy - 5(4H)-indanone 1,3 - diacylate (5B), the isomeric product, racemic 3aα,6,7,7aα - tetrahydro - 1α,3β - dihydroxy - 5 (4H)-indanone 1,3-diacylate is also formed and is separated and purified by chromatography, e.g., over Florisil, and crystallization. Replacing racemic 3aα,6,7,7aα - tetrahydro - 1α,3α - dihydroxy - 5(4H) - indanone 1,3 - diacylate (5A) in the process of this invention with racemic 3aα,6,7,7aα-tetrahydro-1α,3β-dihydroxy-5(4H) - indanone 1,3-diacylate and proceeding as described above there are obtained compounds of the structure:

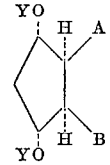

wherein A, B, and Y are as defined above.

When 3aα,4,7,7aα-tetrahydro-1,3-indanedione (1) is reduced as described above in the preparation of 3aα,4,7, 7aα-tetrahydro-1α,3α-indanediol (3A) and racemic 3aα, 4,7,7aα-tetrahydro-1α,3β - indanediol (3B), there is also obtained 3aα,4,7,7aα-tetrahydro-1β,3β-indanediol which is separated by crystallization and chromatography as described for the isomers 3A and 3B, except that this separation is more difficult and can require repeated chromatography and crystallization. When 3aα,4,7,7aα-tetrahydro-1β,3β-indanediol is carried on through the process of this invention, prostaglandin-like compounds of the formula:

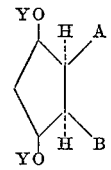

wherein Y, A, and B have the meanings given above, are obtained. The process can go through the acetal intermediates corresponding to those described for the 3α,5α-series.

The isomeric products so obtained are useful intermediates in the further synthetic transformation and in addition possess useful biological properties since they modify the properties of biologically active materials, especially ions such as K+ and Ca++ and lipids. The isomeric products differ from the natural prostaglandins in oral efficacy, duration of action, and specificity and therapeutic ratio in that those materials that alter lipolysis have little hypotensive activity, those that have useful hypotensive activity have little CNS effect and those that affect smooth muscle have relatively decreased lipolytic effects.

The racemic products and intermediates of this invention can be resolved into their optically active components by a number of methods of resolution well known in the art. Compounds 10A–D, 11A and 11B, 12A–D, 13A and 13B, 14A–D and 15 all can be obtained as free acids. These acids can be treated with an optically active base, e.g., cinchonine, quinine, or d- and l-α-phenylethylamine to produce diastereoisomeric salts which can be separated by crystallization. Alternatively, the acid may be esterified with an optically active alcohol, e.g., d- and l-menthol, estradiol 3-acetate, and the diastereoisomeric esters then resolved. The compounds containing hydroxyl groups, e.g., the compounds of Formulaes 1, 2, 3B, 3C, 3D, 6B, 9C, 10B, 10C, 10D, 11B, 14A–D, and 15 can be acrylated with the acid chloride or anhydride of an optically active acid, or the free acid in the presence of an esterification catalyst, e.g., d-damphorsulfonic acid, α-bromocamphor-sulfonic acid, and d- and l-6,6'-dinitrodiphenic acid, to give diastereoisomeric esters which are resolvable by crystallization. Other chemical methods of resolution include acetal formation using an optically active aldehyde followed by resolution of the resulting diastereoisomers. This is appropirate for any of the acetals of this invention.

Resolution of the racemic prostaglandins and prostaglandin-like compounds of this invention can also be accomplished by reverse phase and absorption chromatography on an optically active support and adsorbent and by selective transformation of one isomer with a biologically-active prostaglandin transforming system, for example, the 15-dehydrogenating system present in lung such as guinea-pig, rat, and pig lung and in microorganisms such as fungi. Such transformation can be carried out by incubation or perfusion using methods well established in the art, followed by isolation and recovery of the isomer resistant to the metabolic transformation applied.

The sequence of steps in the process of this invention can be rearranged, and equivalent reagents can be found besides those mentioned, without departing from the spirit of the invention. Some alternative routes have been included, but to describe all possibilities would expand this disclosure needlessly. Also, where discussion of different possible isomeric intermediates would not aid in describing the invention, such discussion has been omitted.

PREPARATION 1

3aα,4,7,7aα-tetrahydro-1,3-indanedione (1)

A solution of 26 g. of 4-cyclopentene-1,3-dione and 0.1 g. of pyrogallol in 60 ml. of benzene and 1.5 ml. of acetic acid was cooled in an ice bath and 40 ml. of liquid butadiene was added. The mixture was sealed in a glass pressure vessel and allowed to stand at room temperature for 12 days. The product precipitated and was removed by filtration to give 33.6 g. of 3aα,4,7,7aα-tetrahydro-1,3-indanedione having a melting point of 163–165° C. A portion was recrystallized from tetrahydrofuran giving pure 3aα,4,7,7aα-tetrahydro-1,3-indanedione having a melting point of 163–165° C., U.V. absorption $\lambda_{EtOH}^{max.}$ 244 m$\mu$, $\epsilon$=15000 infrared absorption $_{max.}$ 3034, 2680, 2520, 2500, 1642, 1582, 1525, 1232 and 1170 cm.$^{-1}$, and the analysis:

Calcd. for $C_9H_{10}O_2$ (percent): C, 71.98; H, 17.51. Found (percent): C, 71.51; H, 6.80.

PREPARATION 2

3aα,4,7,aα-tetrahydro-1,3-indanedione (1)

A mixture of 455 g. of 4-cyclopentine-1,3-dione, 26.2 ml. of glacial acetic acid, 1.75 g. of pyrogallol and 1050 ml. of benzene was placed in an autoclave and cooled to −5° C. or lower, then 700 ml. of liquid butadiene was added. The autoclave and contents was allowed to warm to room temperature while stirring for two hours, then was allowed to stand at room temperature for 12 days. The precipitated solid was removed by filtration and dried at 50° C. under diminished pressure to give 472 g. of 3aα,4,7,7aα-tetrahydro-1,3-indanedione having a melting point of 158–161° C. and a U.V. absorption $\lambda_{EtOH}^{max.}$ 244 m$\mu$, $\epsilon$=15,150

EXAMPLE 1

3aα,4,7,7aα-tetrahydro-1α,3α-indanediol (3A) and racemic 3aα,4,7,7aα - tetrahydro - 1α,3β - indanediol (3B)

A solution of 10.0 g. of 3aα,4,7,7aα-tetrahydro-1,3-indanedione in 220 ml. of absolute ethanol was heated at reflux under nitrogen while 18.0 g. of sodium in small chunks was added as rapidly as possible without foaming over. The mixture was heated at reflux for a total of 3 hours, then was cooled, diluted with 500 ml. of water and extracted with ethyl acetate. The ethyl acetate extract was concentrated by evaporation under diminished pressure to yield a neutral yellow oil comprising 3aα,4,7,7aα-tetrahydro-1α,3α-indanediol and racemic 3aα,4,7,7aα-tetrahydro-1α,3β-indanediol. The yellow oil was chromatographed over Florisil (synthetic magnesium silicates) and eluated with increasing proportions of acetone in Skellysolve B (mixed hexanes). The first two product fractions in the 15% acetone in Skellysolve B eluates were combined and gave 0.525 g. of crystals melting at 102–106° C., which on recrystallization from acetone-Skellysolve B mixture gave racemic 3aα,4,7,7aα-tetrahydro-1α,3β-indanediol having a melting point of 106–107° C., infrared absorption $\lambda_{Nujol}^{max.}$ 3300, 3060, 1650, 1215, 1152, 1100 and 1050 cm.$^{-1}$ and the following.

Analysis.—Calcd. for $C_9H_{14}O_2$ (percent): C, 70.10; H, 9.15. Found (percent): C,70.34; H,9.15.

Nuclear magnetic resonance analysis showed two CH—O absorption peaks confirming that the diol melting at 106–107° C. is a trans diol.

The remainder of the 15% acetone in Skellysolve B eluates and the 20% acetone in Skellysolve B eluates were combined and evaporated to give 2.62 g. of crystals comprising 3aα,4,7,7aα-tetrahydro-1α,3α-indanediol having a melting point of 76–80° C.; on recrystallization from acetone-Skellysolve B an analytical sample was obtained having a melting point of 79–83° C., infrared absorption maxima $\lambda_{Nujol}^{max.}$ of 3300, 3010, 1650, 1090 and 1051 cm. and the following analysis.

Analysis.—Calcd. for $C_9H_{14}O_2$ (percent): C, 70.10; H, 9.15. Found (percent): C, 70.03; H, 9.15.

Nuclear magnetic resonance analysis showed the presence of one CH—O absorption peak, confirming that the diol melting at 79–83° C. is a cis diol.

EXAMPLE 2

Racemic 3aα,4,7,7aα - tetrahydro-1α-hydroxy-3-indanone (2) and racemic 3aα,4,7,aα-tetrahydro-1β-hydroxy-3-indanone (2).

A solution of 5.0 g. of 3aα,4,7,7aα-tetrahydro-1,3-indanedione in 150 ml. of isopropyl alcohol was heated at reflux under nitrogen, then 9.0 g. of sodium in pieces was added as rapidly as possible and the mixture was heated at reflux until the sodium dissolved. The mixture was then cooled, diluted with water, and extracted 3 times with ethyl acetate. The ethyl acetate extracts were combined, washed with water, and evaporated to give 2.34 g. of an oil which was chromatographed over Florisil and eluted with acetone-Skellysolve B. On evaporation of the 10% acetone-Skellysolve B eluate there was obtained 1.546 g. of an oil comprising racemic 3aα, 4,7,7aα-tetrahydro-1α-hydroxy-3-indanone and racemic 3aα,4,7,aα-tetrahydro-1β-hydroxy-3-indanone having infrared absorption maxima $\lambda_{CH_2Cl_2}^{max.}$ at 3700, 3500, and 1735 cm.$^{-1}$. The 1735 cm.$^{-1}$ absorption indicates the presence of a carbonyl group.

EXAMPLE 3

Racemic 3aα,4,7,7aα - tetrahydro-1α-hydroxy-3-indanone (2) and racemic 3aα-4,7,7aα-tetrahydro-1β-hydroxy-3-indanone (2)

A solution of 3.0 g. of lithium in 400 ml. of liquid ammonia was prepared and a solution of 5.0 g. of 3aα,4, 7,7aα-tetrahydro-1,3-indanedione in 100 ml. of absolute ethanol was added dropwise. When about three fourths of the soltuion of indanedione in ethanol had been added the blue color of the Li/NH$_3$ disappeared, and an additional 2 g. of lithium was added, then addition of the indanedione was completed. The mixture was stirred until the blue color disappeared, then the ammonia was evaporated on a steam bath under a stream of air giving a residue which was dissolved by addition of 400 ml. of ethyl acetate and 200 ml. of water and stirring. The ethyl acetate layer was separated and the solvent removed by evaporation to give 5.1 g. of an oil comprising racemic 3α,4,7,7aα-tetrahydro-1α-hydroxy-3-indanone and racemic 3α,4,7,7aα-tetrahydro-1β-hydroxy-3-indanone having infrared absorption maxima identical with that shown by the product obtained in Example 2,

EXAMPLE 4

3aα,4,7,7aα-tetrahydro-1α,3αindanediol (3A)

A solution of 5.1 g. of 3aα,4,7,7aα-tetrahydro-1α-hydroxy-3-indanone (obtained in Example 3) was dissolved in 100 ml. of absolute ether and excess lithium aluminum hydride was added. The thus-obtained mixture was stirred at room temperature for 1.5 hours and ethyl acetate was added to destroy the excess lithium aluminum hydride, then saturated aqueous sodium sulfate was added. The mixture was filtered and the organic layer was separated and evaporated to give a residue comprising a mixture of 3aα,4,7,7aα-tetrahydro-1α,3α-indanediol and racemic 3aα,4,7,7aα-tetrahydro-1α,3β-indanediol, which on crystallization from a mixture of methylene chloride and Skellylolve B (mixed hexanes) gave 2.05 g. of 3aα,4,7,7aα-tetrahydro-1α,3α-indanediol having a melting point of 81–84° C. The mother liquors from this crystallization are evaporated and the thus-obtained residue is chromatographed following the procedure of Example 1 to obtain racemic 3aα,4,7,7aα-tetrahydro-1α,3β-indanediol.

EXAMPLE 5

3aα,4,7,7aα-tetrahydro-1α,3α-indanediol (3A)

A solution of 4.9 g. of 3α,4,7,7aα-tetrahydro-1α-hydroxy-3-indanone in 25 ml. of methanol was added to 400 ml. of liquid ammonia, then 1.5 g. of lithium metal was added rapidly. A blue color developed which disappeared after about 5 minutes, then 15 g. of ammonium chloride was added and the ammonia was evaporated under a current of air while heating on the steam bath, giving a residue which was taken up in a mixture of ethyl acetate and water. The ethyl acetate layer was separated and the water layer was extracted with a second portion of ethyl acetate. The ethyl acetate solutions were combined and evaporated to yield a crystalline residue which on crystallization from a mixture of methylene chloride and Skellysolve B gave 1.65 g. of 3aα,4,7,7aα-tetrahydro-1α,3α-indanediol having a melting point of 78–80° C. The mother liquors are evaporated to give a residue which is chromatographed following the procedure of Example 1 to obtain racemic 3aα,4,7,7aα-tetrahydro-1α,3β-indanediol.

EXAMPLE 6

3aα,4,7,7aα-tetrahydro-1α,3α-indanediol (3A) and racemic 3aα,4,7,7aα-tetrahydro-1α,3β-indanediol (3B)

A solution of 20.0 g. of 1a,α,4,7,7aα-tetrahydro-1,3-indanedione in 150 ml. of absolute ethanol was added to a solution of 10.0 g. of lithium wire in 1000 ml. of liquid ammonia and stirred until the blue color disappeared. The mixture was heated on the steam bath and the ammonia was evaporated under a stream of air leaving a residue. The thus-obtained residue was taken up in 1000 ml. of ethyl acetate and 500 ml. of water. The ethyl acetate layer was separated and washed twice with 500-ml. portions of water, then the ethyl acetate was removed by evaporation in vacuo under diminished pressure to give a colorless oil. The thus-obtained oil was dissolved in 250 ml. of absolute ether and 5.0 g. of lithium aluminum hydride was added. The mixture was stirred at room temperature for 1.5 hours, then excess lithium aluminum hydride was destroyed by addition first of ethyl acetate and then saturated aqueous sodium sulfate. The organic layer was separated by decantation and filtered. Addition of methylene chloride and Skellysolve B caused precipitation of crystals. The solvent was removed from the entire mixture by evaporation under diminished pressure giving 16.38 g. of a crystalline residue comprising 3aα,4,7,7aα-tetrahydro-1α,3α-indanediol and racemic 3aα,4,7,7aα-tetrahydro-1α,3β-indanediol.

EXAMPLE 7

3aα,4,7,7aα-tetrahydro-1-hydroxy-α-methyl-2-indanemethanol (3C)

A mixture of 2.0 g. of 3aα,4,7,7aα-tetrahydro-1,3-indanedione, 100 ml. of tetrahydrofuran, and excess lithium aluminum hydride was stirred at room temperature for 16 hours and then for an additional 30 minutes while heated under reflux. The excess hydride was decomposed by the cautious addition of first ethyl acetate and then water. The mixture was filtered and the solvent was removed by evaporation under diminished pressure to give 2.2 g. of a crystalline residue, which was chromatographed over Florisil and eluted with 10% acetone in Skellysolve B (mixed hexanes), then with 20% acetone in Skellysolve B. The 10% acetone-Skellysolve B eluates to give 1.005 g. of a residue which was twice recrystallized from a mixture of ether and Skellysolve B to give 0.67 g. of 3aα,4,7,7aα - tetrahydro - 1 - hydroxy-α-methyl-2-indanemethanol having a melting point of 99–101° C., infrared absorption maxima (Nujol) at 3390, 3330, 3020, 1655, 1112, 1100 and 1035 cm.$^{-1}$ and the following.

Analysis.—Calcd. for $C_{11}H_{18}O_2$ (percent): C, 72.49; H, 9.96, M.W. 182.25. Found (percent): C, 72.49; H, 9.79, M.W. 179.

Nuclear magnetic resonance absorption at +171 cps. ($J$=6) confirmed the presence of a $CH_3$—$CH<$ group.

EXAMPLE 8

3aα,4,7,7aα-tetrahydro-1-hydroxy-α-phenyl-2-indanemethanol (3D)

A mixture of 3.0 g. of 3aα,4,7,7aα-tetrahydro-1,3-indanedione, 125 ml. of tetrahydrofuran and 3.0 g. of lithium aluminum hydride was heated under reflux for 45 minutes. The mixture was cooled and 20 ml. of methyl benzoate was added followed by saturated aqueous sodium sulfate. The mixture was filtered and then the solvent from the filtrate was removed by evaporation under diminished pressure, leaving a residue which was recrystallized from Skellysolve B to give 1.02 g. of crystalline 3aα,4,7,7aα - tetrahydro - 1 - hydroxy-α-phenyl-2-indanemethanol which after recrystallization from chloroform had a melting point of 156–159° C., infrared absorption maxima (Nujol) at 3480, 3360, 3020, 1648, 1602, 1584, 1489, 1185, 1103, 1085 and 1070 cm.$^{-1}$ and the following analysis.

Analysis.—Calcd. for $C_{16}H_{20}O_2$ (percent): C, 78.65; H, 8.25. Found (percent): C, 78.02; H, 8.16.

A nuclear magnetic resonance peak at 450 cps. confirmed the presence of a φ-group.

EXAMPLE 9

3aα,4,7,7aα-tetrahydro-1α,3α-indanediol dibenzoate (4A) and racemic 3aα,4,7,7aα-tetrahydro - 1α,3β - indanediol dibenzoate (4B)

A solution of 7.5 g. of a mixture of 3aα,4,7,7aα-tetrahydro-1α,3α-indanediol and racemic 3aα,4,7,7aα-tetrahydro-1α,3β-indanediol in 100 ml. of pyridine was cooled in an ice bath and 16 ml. of benzoyl chloride was added with stirring. The mixture was allowed to stir about 18 hours while the temperature rose gradually to room temperature. The mixture was then poured into ice and water and neutralized with saturated aqueous sodium bicarbonate. The resulting mixture was extracted with methylene chloride and the methylene chloride extract was separated and washed first with dilute hydrochloric acid then with saturated aqueous sodium bicarbonate. The methylene chloride solution was evaporated to give a residue comprising 3aα,4,7,7aα-tetrahydro-1α,3α-indanediol dibenzoate and racemic 3aα,4,7,7aα-tetrahydro-1α,3β-indanediol dibenzoate which was dissolved in Skellysolve B and chromatographed over Florisil. On elution with 1% acetone in Skellysolve B the first three product-containing fractions gave partially crystalline residues. These were triturated with methanol, then recrystallized from methanol to give 1.73 g. of racemic 3aα,4,7,7aα-tetrahydro-1α,3β-indanediol dibenzoate having a melting point of 88–89° C., infrared absorption maxima in Nujol at 1710, 1600, 1585, 1115, 1070, 1050, and 710 cm.$^{-1}$, and the following analysis.

*Analysis.*—Calcd. for $C_{25}H_{22}O_4$ (percent): C, 76.22; H, 6.12. Found (percent): C, 76.17; H, 6.27.

Nuclear magnetic resonance analysis showed that this compound was the trans dibenzoate.

The mother liquors from the above trituration-recrystallization of the trans dibenzoate were combined with the remaining product containing fractions from the above chromatogram and the solvents were removed by evaporation, giving a residue which was chromatographed over Florisil and eluted in 20 fractions with a gradient of 0 to 1% acetone in Skellysolve B. Fractions 10–15 were combined to give 5.911 g. of residue which on trituration with methanol in a Dry-Ice bath gave 1.76 g. of racemic 3aα,4,7,7aα-tetrahydro-1α,3β-indanediol dibenzoate having a melting point of 80–86° C. Fractions 16–20 were combined to give 1.76 g. of residue comprising 3aα,4,7,7aα-tetrahydro-1α,3α-indanediol dibenzoate. Fraction 18 was shown by nuclear magnetic resonance analysis to be pure cis dibenzoate.

EXAMPLE 10

3aα,4,7,7aα-tetrahydro-1α,3α-indanediol dibenzoate (4A) and racemic 3aα,4,7,7aα-tetrahydro - 1α,3β - indanediol dibenzoate (4B)

A solution of 44.4 g. of a mixture of 3aα,4,7,7aα-tetrahydroindane-1α,3α-diol and racemic 3aα,4,7,7aα-tetrahydroindane-1α,3β-diol in 600 ml. of pyridine was cooled in an ice bath and 120 ml. of benzoyl chloride was added dropwise with stirring. The ice bath was removed and the mixture was stirred at room temperature for 5½ hours. The mixture was then diluted with 2000 ml. of methylene chloride and washed with 1500 ml. of a mixture of 1 vol. of concentrated hydrochloric acid to 1 volume of water. The aqueous wash was rewashed with about 500 ml. of methylene chloride. The methylene chloride solutions were combined and washed with saturated aqueous sodium bicarbonate and then with water. The thus-obtained methylene chloride solution was poured onto a 700 g. Florisil column and eluted with 5000 ml. of methylene chloride. The methylene chloride eluates were concentrated to a sirupy residue by evaporation under diminished pressure. The above residue was dissolved in 500 ml. of methanol and filtered through a sintered glass funnel. The mixture was cooled by evaporation under a stream of air and seeded with racemic 3aα,4,7,7aα-tetrahydro-1α,3β-indanediol dibenzoate. The trans dibenzoate separated by crystallization and was removed by filtration. The filtrate was again cooled under a stream of air and seeded, and the above procedure was repeated until no more crystals were obtained. By this process 49.5 g. of racemic 3aα,4,7,7aα-tetrahydroindane-1α,3β-diol dibenzoate having a melting point of 78–82° C. was obtained. The methanol was then removed from the filtrate by evaporation under diminished pressure to yield a 64.5 g. sirup comprising 3aα,4,7,7aα-tetrahydroindane-1α,3α-diol dibenzoate.

EXAMPLE 11

3aα,4,7,7aα-tetrahydro - 1α,3α - indanediol diacetate and racemic 3aα,4,7,7aα-tetrahydro-1α,3β-indanediol diacetate A solution of 10 g. of a mixture of 3aα,4,7,7aα-tetrahydro-1α,3α-indanediol and racemic 3aα,4,7,7aα-tetrahydro-1α,3β-indanediol in 100 ml. of pyridine and 50 ml. of acetic anhydride is allowed to stand at room temperature for about 18 hours. The mixture is then poured into 1000 ml. of ice and water, stirred, and extracted with three 200-ml. of methylene chloride. The methylene chloride extracts are combined, washed with dilute aqueous hydrochloric acid and then with saturated aqueous sodium bicarbonate, and the solvent is removed by evaporation under diminished pressure to yield a residue comprising 3aα,4,7,7aα-tetrahydro-1α,3α-indanediol diacetate and racemic 3aα,4,7,7aα-tetrahydro-1α,3β-indanediol diacetate which can be separated by crystallization, chromatography or a combination of chromatography and crystallization.

Treating at a temperature between 0° C. and 30° C. a 3aα,4,7,7aα-tetrahydro-1α,3α-(or 3β)-indanediol with an acylating agent such as an organic carboxylic acid anhydride or halide preferably in pyridine solution yields the corresponding 1,3- diesters of the starting material. Representative esters thus obtained include the 1,3-dipropionate, dibutyrate, dihexanoate, octanoate, dilaurate, di(phenylacetate), di(phenylpropionate), di(p-nitrobenzoate) and the like of 3aα,4,7,7aα-tetrahydro-1α,3α-indanediol and racemic 3aα,4,7,7aα-tetrahydro-1α,3β-indanediol.

EXAMPLE 12

Racemic 3aα,6,7,7aα-tetrahydro-1β,3α-dihydroxy-5(4H)-indanone dibenzoate (5B)

A solution of 1.8 g. of racemic 3aα,4,7,7aα-tetrahydro-1α,3β-indanediol dibenzoate in 25 ml. of absolute ether was cooled in an ice bath and 2 ml. of a 1.9 molar solution of diborane in tetrahydrofuran was added. The mixture was stirred for one hour, then the excess diborane was decomposed by addition of water. A mixture of 1.6 ml. of concentrated sulfuric acid, 2.0 g. of sodium dichromate and 9.0 ml. of water was added cautiously with stirring and the mixture was allowed to stir for 40 hours. The ethereal layer was separated and the aqueous layer was re-extracted with methylene chloride. The ether and methylene chloride extracts were combined and washed with water and then saturated aqueous sodium bicarbonate. The solvent was removed by evaporation to yield a crystalline residue which was dissolved in Skellysolve B and chromatographed over Florisil. Elution with 10% acetone in 3aα,6,7,7aα-tetrahydro-1β,3α - dihydroxy-5 (4H)-indanone dibenzoate which was recrystallized from acetone-Skellysolve B to yield 1.03 g. of an analytical sample having a melting point of 144-146° C.

*Analysis.*—Calcd. for $C_{23}H_{22}O_5$ (percent): C, 73.00; H, 5.86. Found (percent): C, 72.70; H. 6.26.

Following the procedure of Example 12 but substituting racemic 3aα,4,7,7aα-tetrahydro-1α,3β-indanediol diacetate for racemic 3aα,4,7,7aα-tetrahydro-1α,3β-indanediol dibenzoate as starting material is productive of racemic 3aα,6,7,7aα-tetrahydro-1β,3α-dihydroxy - 5(4H)-indanone diacetate. Substituting other racemic 3aα,4,7, 7aα-tetrahydro-1α,3β-indanediol diacylates, for example those named following Example 11 for the starting material in Example 12 is productive of the corresponding diacylates.

EXAMPLE 13

Racemic 3aα,6,7,7aα-tetrahydro-1α,3α-dihydroxy - 5(4H)-indanone dibenzoate (5A)

A solution of 7.29 g. of crude 3aα,4,7,7aα-tetrahydro-1α,3α-indanediol dibenzoate (shown by vapor phase chromotography to be 75% 1α,3α-diol dibenzoate and 25% 1α,3β-diol dibenzoate) in 75 ml. of absolute ether was cooled in an ice bath and 8 ml. of a 1.9 molar solution of diborane in tetrahydrofuran was added. The mixture was stirred for an hour and then the excess hybride was decomposed by addition of water. A mixture of 6.4 ml. of concentrated sulfuric acid, 8.0 g. of sodium dichromate and 30 ml. of water was added cautiously and the resulting mixture was stirred for about 18 hours at room temperature. The ether layer was separated and the aqueous layer was extracted with ether and methylene chloride. The ether layer and extracts were combined, washed with saturated aqueous sodium bicarbonate and then with water, and evaporated to give a residue which was chromotographed over Florisil and eluted with 5% and 10% acetone in Skellysolve B. The 5% acetone eluates were evaporated to give 0.31 g. of racemic 3aα,6,7,-7aα-tetrahydro-1β,3α-dihydroxy-5(4H) indanone dibenzoate having a melting point of 137–142° C.

The 10% acetone eluates of the above chromatogram were combined and evaporated to give 3.164 g. of a residue which on crystallization from ether gave 2.05 g. of racemic 3aα,6,7,7aα-tetrahydro-1α,3α-dihydroxy - 5(4H)-indanone dibenzoate having a melting point of 108–112° C., infrared absorption maxima at 3060, 3050, 1710, 1605, 1505, 1470, 1280, 1113 and 705 cm.$^{-1}$

EXAMPLE 14

Racemic 3aα,6,7,7aα-tetrahydro-1α-3α-dihydroxy - 5(4H)-indanone dibenzoate (5A)

(A) (Racemic 3aα,4,7,7aα-tetrahydro-1α-hydroxy - 3-indanone (2).—A solution of 20 g. of 3aα,4,7,7aα-tearahydro-1,3-indanedione in 150 ml. of absolute ether was added to a solution of 10 g. of lithium in 1000 ml. of liquid ammonia. The blue colored mixture was stirred until the color disappeared, then the ammonia was evaporated under a stream of air while heating on a steam bath and 1000 ml. of ethyl acetate was added, followed by 500 ml. of water. The ethyl acetate layer was separated and washed twice with 500 ml. portions of water, then the ethyl acetate was removed by evaporation leaving a residue comprising racemic 3aα,4,7,7aα-tetrahydro-1α-hydroxy-3-indanone.

(B) 3aα,4,7,7aα-tetrahydro - 1α,3α-indanediol (3A) and racemic 3aα,4,7,7aα-tetrahydro - 1α,3β - indanediol (3B).—The residue of racemic 3aα,4,7,7aα-tetrahydro-1α-hydroxy-3-indanone (from A, above) was dissolved in 250 ml. of absolute ether and excess lithium aluminum hydride was added with stirring. The resulting mixture was stirred at room temperature for 1.5 hours then the excess hydride was decomposed by adding first ethyl acetate then saturated aqueous sodium sulfate. The mixture was filtered and the ether layer was separated. The ether was removed by evaporation and methylene chloride and Skellysolve B were added, resulting in crystallization of the residue. The solvents were removed by evaporation under diminished pressure to give 16.38 g. of a crystalline residue comprising a mixture of 3aα,4,7,7aα-tetrahydro-1α,3α-indanediol and racemic 3aα,4,7,7aα-tetrahydro-1α,3β-indanediol.

(C) 3aα,4,7,7aα-tetrahydro-1α,3α - indanediol dibenzoate (4A) and racemic 3aα,4,7,7aα-tetrahydro-1α,3β-indanediol dibenzoate (4B).—A mixture of 30.2 g. of crude 3aα,4,7,7aα-tetrahydro-1α,3α-indanediol and racemic 3aα,4,7,7aα-tetrahydro-1α,3β-indanediol (prepared in two runs as in B, above) was dissolved in 225 ml. of pyridine and cooled in an ice bath, then 60 ml. of benzoyl chloride was added slowly with stirring. The reaction mixture was then stirred for about 18 hours at room temperature, then was diluted with methylene chloride and washed with water. The methylene chloride layer was separated and the aqueous layer extracted with methylene chloride. The methylene chloride extracts were combined and washed with saturated aqueous sodium bicarbonate, then with dilute ice cold hydrochloric acid and again with aqueous saturated sodium bicarbonate. The methylene chloride was removed by evaporation and the residual syrup was dissolved in methylene chloride and passed over a 200 g. Florisil column. The column was eluted with 2000 ml. of methylene chloride and the solvent was removed from the eluate by evaporation under diminished pressure to yield 78 g. of a mixture comprising 3aα,4,7,7aα-tetrahydro-1α,3α-indanediol dibenzoate and racemic 3aα,4,7,7aα-tetrahydro-1α,3β-indanediol dibenzoate.

(D) Racemic 3aα,6,7,7aα-tetrahydro-1α,3α-dihydroxy-5(4H)-indanone dibenzoate (5A) and racemic 3aα,6,7,7aα-tetrahydro-1β,3α-dihydroxy - 5(4H) - indanone dibenzoate (5B).—A solution of 78 g. of a mixture of crude 3aα,4,7,7aα-tetrahydro-1α,3α-indanediol dibenzoate and racemic 3aα,4,7,7aα - tetrahydro - 1α,3β - indanediol dibenzoate (from C, above) in 800 ml. of absolute ether was cooled in an ice bath, and 100 ml. of a solution of 1.9 molar diborane in tetrahydrofuran was added. After 1.5 hours no excess hydride was present, and a further 30 ml. of 1.9 molar diborane solution was added. The mixture was then stirred for 4 hours at room temperature after which excess hydride was decomposed by the addition of water and an oxidizing mixture of 86 g. of sodium dichromate, 75 ml. of sulfuric acid and 400 ml. of water was added cautiously. The resulting mixture was stirred for about 18 hours at room temperature and the aqueous layer again extracted with ether. The ether extracts were combined and washed first with water and then with aqueous saturated sodium bicarbonate. The solvents were removed by evaporation and the residue was mixed with 300 ml. of ether and refrigerated to give 28.03 g. of crystalline product comprising a mixture of racemic 3aα,6,7,7aα-tetrahydro-1α,3α-dihydroxy-5(4H) - indanone dibenzoate and racemic 3aα,6,7,7aα-tetrahydro-1β,3α-dihydroxy-5(4H)-indanone dibenzoate having a melting point of 101–102° C. Nuclear magnetic resonance analysis established that this product was 90% cis (1α,3α) isomer.

EXAMPLE 15

Racemic 3aα,6,7,7aα-tetrahydro-1α,3α-dihydroxy-5 (4H)-indanone dibenzoate (5A)

A solution of 112.5 g. of crude 3aα,4,7,7aα-tetrahydro-1α,3α-indanediol dibenzoate (prepared as in Example 10) in 1130 ml. of absolute ether and 110 ml. of tetrahydrofuran was stirred while the reaction system was flushed with nitrogen to remove air. Stirring was continued while diborane was passed in until an excess was present, as shown by bubbling when a drop of the reaction mixture was added to 1 ml. of water. Addition of the diborane required about 5 minutes. The reaction mixture was allowed to stand at room temperature for about 4.5 hours, then excess diborane was decomposed by dropwise addition of water. The mixture was then cooled in an ice bath and stirred while a mixture of 130 g. of sodium dichromate, 650 ml. of water, and 115 ml. of concentrated sulfuric acid was added cautiously, then stirring was continued at room temperature for about 18 hours. The organic layer was then separated and the aqueous layer was twice extracted with ether and once with methylene chloride. The organic layers were combined and washed with water, saturated aqueous sodium bicarbonate, and again with water. The solvent was removed by evaporation under diminished pressure yielding a light yellow syrup which was dissolved in about 400 ml. of absolute ether and refrigerated to allow crystallization. The crystals were separated by filtration to give 46.1 g. of racemic 3aα,6,7,7aα - tetrahydro - 1α,3α - dihydroxy-5(4H)-indanone dibenzoate having a melting point of 100–109° C.

Following the procedure of Example 15 but substituting 3aα,4,7,7aα-tetrahydro-1α,3α-indanediol diacetate for 3aα,4,7,7aα-tetrahydro - 1α,3α - indanediol dibenzoate as starting material is producetive of racemic 3aα,6,7,7aα-tetrahydro-1α,3α-dihydroxy - 5(4H) - indanone diacetate. Following the procedure of Example 15 but substituting other acylates, for example the acylates named following Example 11, is productive of the corresponding racemic 3aα,6,7,7aα-tetrahydro-1α,3α-dihydroxy-5(4H) - indanone diacylate.

EXAMPLE 16

Racemic 3aα,6,7,7aα-tetrahydro-1α,3α-dihydroxy-5(4H)-indanone dibenzoate (5A)

A solution of 2.0 g. of crude 3aα,4,7,7aα-tetrahydro-1α,3α-indanediol dibenzoate (prepared as in Example 10) in 50 ml. of t-butyl alcohol was stirred at room temperature and a mixture of 4 ml. of 70% perchloric acid and 16 ml. of water was added, followed by 1.0 g. of N-bromoacetamide. The mixture was stirred until a clear solution resulted, then was allowed to stand for about 20 hours, after which a solution of 0.5 g. of sodium sulfite in 10 ml. of water was added. The mixture was then concentrated by evaporation under diminished pressure while heating with a bath at 40° C. until the volume was reduced to about half. The concentrated mixture was then extracted 3 times with methylene chloride. The methylene chloride extracts were then washed with aqueous sodium chloride, dried over sodium sulfate, and evaporated giving a gum comprising racemic 6-bromo-3aα,4,5,6,7,7aα-hexahydro-1α,3α,5-indanetriol, 1,3-dibenzoate (4C).

The thus-obtained crude bromohydrin was dissolved in 10 ml. of glacial acetic acid, cooled to 5–10° C., and treated with a solution precooled to 5–10° C., of 1.0 g. of chromium trioxide in 5 ml. of water and 10 ml. of glacial acetic acid. The resulting mixture was stirred for 2.5 hours at 5° C., then was allowed to warm to room temperature during the succeeding half hour, and 3 ml. of methanol was added to the mixture. Five minutes after adding the methanol the mixture was diluted with aqueous sodium chloride and extracted 3 times with methylene chloride. The extracts were combined and washed cautiously with aqueous sodium bicarbonate, then with aqueous sodium chloride, back-extracting each time. The extracts were combined, dried over sodium sulfate, and evaporated under diminished pressure to give a residue comprising racemic 6-bromo-3aα,6,7,7aα-tetrahydro - 1α,3α-dihydroxy-5(4H)-indanone dibenzoate (4D).

The thus-obtained crude bromoketone was dissolved in a mixture of 10 ml. of methanol and 10 ml. of glacial acetic acid, then 2 g. of zinc dust was added and the mixture was stirred vigorously for 2 hours. The mixture was filtered and the zinc residues were washed with methylene chloride. The combined filtrate was concentrated to a small volume by evaporation under reduced pressure, and the residual solution was diluted with aqueous sodium chloride and extracted 3 times with methylene chloride. The extracts were combined, washed with aqueous sodium bicarbonate, and with aqueous sodium chloride back-extracting each time, then dried over sodium sulfate and evaporated under reduced pressure to give a residue which was crystallized from 15 ml. of anhydrous ether to give 1.00 g. of racemic 3aα,6,7,7aα-tetrahydro-1α,3α-dihydroxy-5(4H) - indanone dibenzoate (5A) having a melting point of 102–108° C. Following the procedure of Example 16 but substituting for 3aα,4,7,7aα - tetrahydro - 1α,3α-indanediol dibenzoate as starting material other 1,3-diacylates of 3aα,4,7,7aα-tetrahydro-1α,3α-indanediol, e.g., the acetate, propionate, butyrate, hexanoate, octanoate, laurate, phenylacetate, phenylpropionate, and the like is productive of the corresponding 1,3-diacylates of racemic 6-bromo-3aα,4,5,6,7,7aα-hexahydro-1α,3α,5-indanetriol (4C), racemic 6-bromo-3aα,6,7,7aα-tetrahydro-1α,3α - dihydroxy - 5(4H)-indanone (4D) and racemic 3aα,6,7,7aα-tetrahydro-1α,3α-dihydroxy-5(4H)-indanone (5A).

EXAMPLE 17

Racemic 3aα,4,5,6,7,7aα-hexahydro-5α-pentyl-1α,3α-5β-indanetriol (6B)

An ether solution of n-amyl magnesium bromide was prepared from 30 ml. of 1-bromopentane in 200 ml. of ether and 10 g. of magnesium, then 130 ml. of this Grignard solution was added to a solution of 11.5 g. of racemic 3aα,6,7,7aα-tetrahydro-1α,3α-dihydroxy-5 - (4H)- indanone dibenzoate in 80 ml. of benzene and the mixture was heated for one hour under reflux. Excess Grignard reagent was then decomposed by addition of water. Rochelle salts were added, then ether and tetrahydrofuran and the solid residue was removed by filtration. The solid residue was leached several times with boiling ethyl acetate. The leachings were combined and concentrated by evaporation to give a residue which was crystallized from ethyl acetate to give 3.14 g. of racemic 3aα,4,5,6,7,7aα-hexahydro-5α-pentyl-1α,3α,5β-indanentriol having a melting point of 165–167° C. and infrared absorption maxima (Nujol solution) of 3300 and 1077 cm.$^{-1}$.

*Analysis.*—Calcd. for $C_{14}H_{26}O_3$ (percent): C, 69.38; H, 10.81. Found: (percent) C, 68.77; H, 10.81.

Nuclear magnetic resonance analysis showed the structure to be correct.

EXAMPLE 18

Racemic 3aα,4,5,6,7,7aα-hexahydro-5α-pentyl-1α,3α,5β-indanetriol (6β) and racemic 3aα,4,5,6,7,7aα-hexahydro-5β-pentyl-1α,3α,5α-indanetriol (6β)

A solution of n-amyl magnesium bromide was prepared by adding a solution of 273 ml. of 1-bromopentane in 500 ml. of absolute ether to a suspension of 53.5 g. of magnesium turnings in 400 ml. of absolute ether, and 120 ml. of this amyl magnesium bromide solution (1.88 M) was added dropwise with stirring to a solution of 10.08 g. of 3aα,6,7,7aα-tetrahydro-1α,3α-dihydroxy-5(4H) - indanone dibenzoate (prepared as in Example 15) in 75 ml. of benzene at room temperature. The mixture was then heated under reflux for 2 hours. The excess Grignard reagent was decomposed by addition of water until the inorganic material was a freely stirring white solid. The mixture was then diluted with 250 ml. of Skellysolve B mixed hexanes and the solids were removed by filtration. The solid filter cake was leached with six 250-ml. portions of boiling ethyl acetate and the leachings were combined and evaporated to give 7.23 g. of crystalline residue comprising racemic 3aα,4,5,6,7,7aα-hexahydro-5α-pentyl-1α,3α,5β - indanetriol and racemic 3aα,4,5,6,7,7aα-hexahydro-5β-pentyl - 1α,3α,5α-indanetriol. This residue was leached at room temperature with 250 ml. of Skellysolve B and filtered to give 4.53 g. of a crystalline mixture of racemic 3aα,4,5,6,7,7aα-hexahydro-5α-pentyl-1α,3α,5β - indanetriol and racemic 3aα,4,5,6,7,7aα-hexahydro-5β-pentyl-1α,3α,5α-indanetriol having a melting point of 162–166° C. Further crystallization affords essentially pure racemic 3aα,4,5,6,7,7aα-hexahydro-5α-pentyl-1α,3α,5β-indanetriol. If desired, the combined mother liquors from the crystallizations can be chromatographed, e.g., over Florisil, to give additional quantities of the above racemic 3aα,4,5,6,7,7aα-hexahydro-5α-pentyl-1α,3α,5β-indanetriol as well as essentially purified fractions comprising the racemic 3aα,4,5,6,7,7aα-hexahydro-5β-pentyl-1α,3α,5α-indanetriol.

Following the procedure of Examples 17 and 18, above, but replacing racemic 3aα,6,7,7aα-tetrahydro-1α,3α-dihydroxy-5(4H)-indanone dibenzoate as starting material with other 1,3-diacylates of racemic 3aα,6,7,7aα-tetrahydro-1α,3α-dihydroxy-5[4H]-indanone, e.g., the 1,3-diacetate, dipropionate, dibutyrate, dihexanoate, dilaurate, di(phenylacetate), di(phenylpropionate) and the like is productive of racemic 3aα,4,5,6,7,7aα-hexahydro-5α-pentyl-1α,3α,5β-indanetriol and racemic 3aα,4,5,6,7,7aα - hexahydro - 5β-pentyl-1α,3α,5α-indanetriol.

Following the procedure of Examples 17 and 18, above, but substituting other alkyl metal halides or dialkyl cadmium compounds for n-amyl magnesium bromide is productive of the corresponding racemic 3aα,4,5,6,7,7aα-hexahydro-5α (and 5β)-alkyl-1α,3α,5β (and 5α)-indanetriol. For example, treating racemic 3aα,6,7,7aα-tetrahydro - 1α,3α - dihydroxy - 5(4H) - indanone dibenzoate (or other 1,3-diacylate) with methyl magnesium iodide, methyl lithium, diethyl cadmium, propyl cadmium bromide, isopropyl magnesium bromide, butyl magnesium iodide, butyl lithium, 2-butyl magnesium bromide, t-butyl magnesium bromide, 2-amyl magnesium bromide, 3-amyl magnesium bromide, hexyl magnesium iodide, 2-hexyl magnesium bromide, heptyl magnesium bromide, octyl magnesium bromide, 2-octyl magnesium bromide, 3-octyl magnesium bromide and phenyl magnesium bromide is productive of racemic 3aα,4,5,6,7,7aα-hexahydro-5α (and 5β)-methyl-1α-3α,5β (and 5α)-indanetriol, racemic 3aα,4,5,6,7,7aα-hexahydro-5α (and 5β)-ethyl-1α,3α,5β- (and 5α)-indanetriol, racemic 3aα4,5,6,7,7aα-hexaydro--5α(and 5β)-propyl-1α,3α,5β (and 5α)-indanetriol, racemic 3aα,4,5,6,7,7aα-hexahydro-5α (and 5β)-isopropyl-1α,3α,5β-(and 5α)-indanetriol, racemic 3aα,4,5,6,7,7aα-hexahydro-5α (and 5β)-butyl-1α,3α,5β- (and 5α)-indanetriol, racemic 3aα,4,5,6,7,7aα-hexahydro-5α (and 5β)-(2-butyl)-1α,3α,5β (and 5α)-indanetriol, racemic 3aα,4,5,6,7,7aα-hexahydro-5α (and 5β)-t-butyl-1α,3α,5β- (and 5α)-indanetriol, racemic 3aα,4,5,6,7,7aα-hexahydro-5α (and 5β)-(2-amyl)-1α,3α,5β- (and 5α)-indanetriol, racemic 3aα,4,5,6,7,7aα-hexahydro - 5α (and 5β)-(3-amyl)-1α,3α,5β- (and 5α)-indanetriol, racemic 3aα,4,5,6,7,7aα-hexahydro-5α (and 5β)-hexyl-1α,3α, 5β- (and 5α)-indanetriol, racemic 3aα,4,5,6,7,7aα-hexahydro-5α (and 5β)-(2-hexyl)-1α,3α,5β (and 5α)-indanetriol, racemic 3aα,4,5,6,7,7aα-hexahydro-5α (and 5β)-heptyl-1α,3α,5β (and 5β)-indanetriol, racemic 3aα, 4,5,6,7,7aα-hexahydro-5α (and 5β)-octyl-1α,3α,5β (and 5α)-indanetriol, racemic 3aα,4,5,6,7,7aα-hexahydro-5α (and 5β)-(2-octyl)-1α,3α,5β (and 5α) - indanetriol, racemic 3aα,4,5,6,7,7aα-hexahydro-5α (and 5β)-(3-octyl)-1α,3α, 5β- (and 5α)-indanetriol and racemic 3aα,4,5,6,7,7aα-hexahydro-5α (and 5β)-phenyl-1α,3α,5β (and 5α)-indanetriol.

EXAMPLE 19

1α,3α-p-nitrobenzylidene derivative of racemic 3aα,6,7,7aα-tetrahydro-5-amyl-1α,3α indanediol (7)

A mixture of 0.50 g. of racemic 3aα,4,5,6,7,7aα-hexahydro-5α-n-amyl-1α,3α,5β-indanetriol, 0.50 g. of p-nitrobenzaldehyde, 10 ml. of benzene, 10 ml. of xylene and 0.10 g. of p-toluenesulfonic acid was heated at reflux under a calcium carbide drying trap for 2.5 hours, thus accomplishing both dehydration and acetal formation, then was cooled and shaken first with aqueous saturated sodium bisulfite then with aqueous saturated sodium bicarbonate. The organic solution was separated and the solvent was removed by evaporation leaving a residue which was dissolved in Skellysolve B and chromatographed over Florisil then eluted with Skellysolve B containing acetone. The 3% acetone in Skellysolve B eluates contained 0.498 g. of the 1α,3α-p-nitrobenzylidene derivative of racemic 3aα,6,7,7aα-tetrahydro-5-amyl-1α,3α-indanediol which after crystallization from methanol melted at 49–53° C. and had infrared absorption maxima (Nujol solution) at 3100, 3000, 1609, 1525, 1350, 1087, 1034, 745 and 692 cm.$^{-1}$. The structure was confirmed by nuclear magnetic resonance analysis.

EXAMPLE 20

1α,3α-p-nitrobenzyl derivative of racemic 3aα,6,7,7aα-tetrahydro-5-amyl-1α,3α-indanedio (7)

A mixture of 16.9 g. of mixed racemic 3aα,4,5,6,7,7aα-hexahydro - 5α - amyl-1α,3α,5β-indanetriol and racemic 3aα,4,5,6,7,7aα - hexahydro-5β-amyl-1α,3α,5α-indanetriol (prepared as in Example 18), 250 ml. of benzene, 250 ml. of p-xylene, 16.9 g. of p-nitrobenzaldehyde and 1.0 g. of p-toluenesulfonic acid was heated at reflux under a Dean Stark water trap and in an atmosphere of nitrogen for 3 hours. This accomplished both dehydration and acetal formation. The mixture was cooled and shaken with saturated aqueous sodium bisulfite, then the solids were removed by filtration and the aqueous and organic layers separated. The organic layer was again washed with saturated aqueous sodium bisulfite, then with saturated aqueous sodium bicarbonate and finally with water. The organic layer was evaporated under reduced pressure and the resulting residue was dissolved in methylene chloride and chromatographed over Florisil. Elution was with 1% acetone in Skellysolve B. The eluates were evaporated and the crystalline residues were recrystallized by dissolving in ether and adding methanol. There was thus obtained a first crop of 14.02 g. of crystals comprising the 1α,3α-nitrobenzylidene derivative of racemic 3aα,6,7,7aα-tetrahydro-5-amyl-1α,3α-indanediol having a melting point of 54–56° C. A further 2.41 g. was obtained by removing the solvent from the mother liquors.

Following the procedure of Examples 19 and 20 but replacing 3aα,4,5,6,7,7aα - hexahydro - 5α(and 5β)-amyl-1α,3α,5β(and 5α)-indanetriol with other 3aα,4,5,6,7,7aα-hexahydro - 5α(and 5β)-alkyl-1α,3α,5β-(and 5α)-indanetriols, for example those named following Example 18 is productive of the 1α,3α-p-nitrobenzylidene derivative of the corresponding racemic 3aα,6,7,7aα-tetrahydro-5-alkyl-1α,3α-indanediol.

Following the procedure of Examples 19 and 20 but replacing p-nitrobenzaldehyde with other aldehydes such as formaldehyde acetaldehyde, propionaldehyde, chloral, p-bromobenzaldehyde, p-chlorobenzaldehyde, p-fluorobenzaldehyde, 2,4,6-trichlorobenzaldehyde and p-carbomethoxybenzaldehyde is productive of the corresponding racemic 1α,3α-acetal of 3aα,6,7,7aα-tetrahydro-5-amyl-1α,3α-indanediol. Similarly, following the procedure of Examples 19 and 20 but replacing p-nitrobenzaldehyde with other aldehydes such as those mentioned above and replacing racemic 3aα,4,5,6,7,7aα-hexahydro-5α(and 5β)-amyl-1α,3α,5β(and 5α)-indanetriol with another racemic 3aα,4,5,6,7,7aα - hexahydro - 5α(and 5β)-alkyl-1α,3α,5β (and 5α)-indanetriol, for example, one named following Example 18, is productive of the corresponding racemic 1α,3α-acetal of racemic 3aα,6,7,7aα-tetrahydro-5-alkyl-1α,3α-indanediol.

EXAMPLE 20

1α,3α-p-nitrobenzylidene derivative of racemic 3aα,4,5,6,7,7aα-hexahydro-5β-amyl-1α,3α,4α,5α-indanetetrol (8)

A solution of 0.55 g. of the p-nitrobenzylidene derivative of 3aα,6,7,7aα - tetrahydro-5-amyl-1α,3α-indanediol and 0.44 g. of osmium tetroxide in 25 ml. of absolute ether was stirred at room temperature for about 18 hours, then the mixture was diluted with 25 ml. of tetrahydrofuran and cooled in an ice bath while gaseous hydrogen sulfide was bubbled through for 5 minutes. The solution was then filtered and the solvent was removed from the filtrate by evaporation under diminished pressure giving 0.435 g. of a crystalline residue which was recrystallized from a mixture of ether and Skellysolve B to give 0.106 g. of the 1α,3α-p-nitrobenzylidene derivative of racemic 3aα,4,5,6,7,7aα - hexahydro-5β-amyl-1α,3α,4α,5α-indanetetrol having a melting point of 167–170° C. A further crystallization from acetone gave an analytical sample of the 1α,3α-p-nitrobenzylidene derivative of racemic 3aα,4,5,6,7,7aα - hexahydro-5β-amyl-1α,3α,4α,5α-indanetetrol having a melting point of 170–175° C.

*Analysis.*—Calc'd for $C_{21}H_{29}O_6N$ (percent): C, 64.43; H, 7.47; N, 3.58. Found (percent): C, 64.10; H, 7.94; N, 3.58.

The structure was confirmed by nuclear magnetic resonance analysis.

EXAMPLE 22

1α,3α-p-nitrobenzylidene derivative of racemic 3aα,4,5,6,7,7aα-hexahydro-5β-amyl-1α,3α,4α,5α-indanetetraol (8) and 1α,3α-p-nitrobenzylidene derivative of racemic 3aα,4,5,6,7,7aα - hexahydro - 5α - amyl-1α,3α,4β,5β-indanetetraol (8)

A solution of 14.02 g. of the 1α,3α-p-nitrobenzylidene derivative of racemic 3aα,6,7,7aα - tetrahydro - 5 - amyl-1α,3α-indanediol (prepared as in Example 20) in 400 ml. of absolute ether was cooled in an ice bath and 12.3 g. of osmium tetroxide was added with stirring. The mixture was stirred for about 18 hours while the temperature rose gradually to room temperature. Hydrogen sulfide was then bubbled through the mixture for 10 minutes. The mixture was filtered through Celite (diatomaceous earth filter aid) and the solvent was removed from the filtrate by evaporation under diminished pressure leaving 10.75 g. of residue comprising a mixture of the 1α,3α-p-nitrobenzylidene derivative of racemic 3aα,4,5,6,7,7aα-hexahydro-5β-amyl-1α,3α,4α,5α-indanetetrol and the 1α,3α-p-nitrobenzylidene derivative of racemic 3aα,4,5,6,7,7aα-hexahydro-5α-amyl-1α,3α,4β,5β-indanetetrol. This residue was recrystallized from a mixture of acetone and Skellysolve B to give 1.22 g. of crude 1α,3α-p-nitrobenzylidene derivative of racemic 3aα,4,5,6,7,7aα - hexahydro-5β-amyl-1α,3α,4β,5α-indanetetrol having a melting point of 163–166° C. The mother liquors from this crystallization were chromatographed over Florisil and eluted with Skellytone B containing 10 to 20% acetone to give 4.66 g. of crystalline product comprising the 1α,3α-nitrobenzylidene derivative of racemic 3aα,4,5,6,7,7aα - hexahydro-5α-amyl-1α,3α,4β,5β-indanetetrol having a melting point of 33–40° C. On recrystallization from a mixture of ether and Skellysolve B an analytical sample of the 5α-amyl compound was obtained having a melting point of 41–44° C.

EXAMPLE 23

1α,3α-p-nitrobenzylidene derivative of racemic 3aα,4,5,6,7,7aα-hexahydro-5β-amyl-1α,3α,4α,5α-indanetetrol (8A) and 1α,3α-p-nitrobenzylidene derivative of racemic 3aα,4,5,6,7,7aα-hexahydro-5α-amyl - 1α,3α,4β,5β - indanetetraol (8B)

A solution of 1.00 g. of the 1α,3α-p-nitrobenzylidene derivative of racemic 3aα,6,7,7aα-tetrahydro-5-amyl-1α,3α-indanediol in 50 ml. of tetrahydrofuran was stirred while 25 mg. of osmium tetroxide was added. A solution of 0.60 g. of sodium metaperiodate in 10 ml. of water was then added, followed by 0.60 g. of sodium acetate. The resulting mixture was heated under reflux with constant stirring for 24 hours, then it was concentrated to about a half volume by distillation under reduced pressure. The residual mixture was cooled, diluted with an equal volume of water, and extracted three times with methylene chloride. The methylene chloride extracts were combined, washed with aqueous sodium sulfite, dried over sodium sulfate, and evaporated under reduced pressure to yield a residue which was crystallized from a mixture of acetone and Skellysolve B to give 0.30 g. of the 1α,3α-p-nitrobenzylidene derivative of racemic 3aα,4,5,6,7,7aα-hexahydro-5β-amyl-1α,3α,4α,5α - indanetetrol having a melting point of 155–162° C. The mother liquors from the above crystallization were concentrated to dryness, dissolved in a minimum volume of a mixture of 30% ethyl acetate and 70% cyclohexane, and placed on a 75 g. column of silica gel. The column was eluted with 25 ml. portions of the same solvent mixture. Fractions 2–4 contained 300 mg. of unreacted starting material. Fractions 11–20 contained 336 mg. of a mixture of the 1α,3α-p-nitrobenzylidene derivative of racemic 3aα,4,5,6,7,7aα-hexahydro-5β-amyl-1α,3α,4α,5α-indanetetrol and the 1α,3α-p-nitrobenzylidene derivative of racemic 3aα,4,5,6,7,7aα-hexahydro-5α-amyl-1α,3α,4β,5β-indanetetrol.

Following the procedure of Examples 21, 22 and 23 but substituting for the 1α,3α-nitrobenzylidene derivative of racemic 3aα,6,7,7aα-tetrahydro-5-amyl-1α,3α-indanediol as starting material other 5-alkyl indanediols, e.g. the 1α,3α-p-nitrobenzylidene derivative of racemic 3aα,6,7,7aα-tetrahydro-5-alkyl-1α,3α-indanediol wherein the alkyl group is methyl, ethyl, propyl, isopropyl, butyl, 2-butyl, t-butyl, 2-amyl, 3-amyl, hexyl, 2-hexyl, heptyl, octyl, 2-octyl, 3-octyl, and the like is productive of the corresponding 1α,3α-p-nitrobenzylidene derivative of racemic 3aα,4,5,6,7,7aα-hexahydro-5β-alkyl-1α,3α,4α,5α-indanetetrol and the 1α,3α-p-nitrobenzylidene derivative of racemic 3aα,4,5,6,7,7aα-hexahydro-5α-alkyl-1α,3α,4β,5β-indanetetrol.

Following the procedures of Examples 21, 22, and 23 but substituting for the 1α,3α-p-nitrobenzylidene derivative of racemic 3aα,6,7,7aα-tetrahydro-5-alkyl-1α,3α-indanediol other 1α,3α-acetals of racemic 3aα,6,7,7aα-tetrahydro-5-alkyl-1α,3α-indanediol wherein the acetal group is derived from, for example, formaldehyde, acetaldehyde, propionaldehyde, chloral, p-bromobenzaldehyde, p-chlorobenzaldehyde, p-fluorobenzaldehyde, 2,4,6-trichlorobenzaldehyde, p-carbomethoxybenzaldehyde and the like is productive of the corresponding 1α,3α-acetals of racemic 3aα,4,5,6,7,7aα-hexahydro-5β-alkyl - 1α,3α,4α,5α-indanetetrol and of racemic 3aα,4,5,6,7,7aα-hexahydro-5α-alkyl-1α,3α,4β,5β-indanetetrol.

EXAMPLE 24

3α,5α-p-nitrobenzylidene derivative of racemic 3α,5α-dihydroxy-2β-(3-oxooctyl)cyclopentane-1β - carboxaldehyde (9A)

A mixture of 0.5 g. of lead tetraacetate and 10 ml. of benzene was added to a mixture of 0.15 g. of the p-nitrobenzylidene derivative of racemic 3aα,4,5,6,7,7aα-hexahydro-5β-amyl-1α,3α,4α,5α-indanetetrol in 10 ml. of benzene, then 15 ml. of toluene was added. After stirring at room temperature for one hour, saturated aqueous sodium thiosulfate was added and the organic layer was separated and filtered through Celite (diatomaceous filter aid). The solvent was removed from the filtrate by evaporation under diminished pressure to yield 0.147 g. of a colorless viscous oil comprising the 3α,5α-p-nitrobenzylidene derivative of racemic 3α,5α-dihydroxy-2β-(3-oxooctyl)cyclopentane-1β-carboxaldehyde. The structure was confirmed by nuclear magnetic resonance analysis.

EXAMPLE 25

3α,5α-p-nitrobenzylidene derivative of racemic 3α,5α-dihydroxy-2β-(3-oxooctyl)cyclopentane-1β - carboxaldehyde (9A)

A suspension of 0.5 g. of a mixture comprising the 1α,3α-p-nitrobenzylidene derivative of racemic 3aα,4,5,6,7,7aα-hexahydro-5β-amyl-1α,3α,4α,5α-indanetetrol and the 1α,3α-p-nitrobenzylidene derivative of racemic 3aα,4,5,6,7,7aα-hexahydro-5α-amyl-1α,3α,4β,5β-indanetetrol (prepared as in Example 22) in 50 ml. of benzene was stirred at room temperature and 1.5 g. of lead tetraacetate was added. Stirring was continued for two hours then 10 ml. of ether and about 10 ml. of water was added. The mixture was filtered through Celite and the organic layer was separated, washed twice with water, and evaporated under diminished pressure to give 0.465 g. of the 3α,5α-p-nitrobenzylidene derivative of racemic 3α,5α-dihydroxy-2β-(3-oxooctyl)cyclopentane - 1β - carboxaldehyde. The structure was confirmed by infrared absorption analysis.

Following the procedure of Examples 24 and 25 but substituting for the 1α,3α-p-nitrobenzylidene derivative of racemic 3aα,4,5,6,7,7aα-hexahydro-5β (and 5α)-amyl-1α,3α,4α(and 4β), 5α(and 5β)-indanetetrol as starting material the 1α,3α-p-nitrobenzylidene derivative of racemic 3aα,4,5,6,7,7aα-hexahydro-5β(and 5α)-alkyl-1α,3α,4α(and 4β),5α(and 5β)-indanetetrol in which the alkyl group is, for example, methyl, ethyl, propyl, isopropyl, butyl, 2-butyl, t-butyl, 2-amyl, 3-amyl, hexyl, 2-hexyl, heptyl, octyl, 2-actyl and 3-octyl is productive of the 3α,5α-p-nitrobenzylidene derivative of the corresponding racemic 3α,5α-dihydroxy-2β-(3-oxoalkyl)cyclopentane-1β - carboxaldehyde, e.g., the 3α,5α-p-nitrobenzylidene derivatives of racemic 3α,5α-dihydroxy-2β-(3-oxobutyl)cyclopentane-1β-carboxaldehyde, racemic 3α,5α-dihydroxy-2β-(3-oxopentyl)cyclopentane-1β-carboxaldehyde, racemic 3α,5α-dihydroxy-2β-(3-oxohexyl)cyclopentane - 1β - carboxaldehyde, racemic 3α,5α - dihydroxy-2β-(3-oxo-4-methylpentyl)cyclopentane-1β-carboxaldehyde, racemic 3α,5α-dihydroxy-2β-(3-oxoheptyl)cyclopentane-1β - carboxaldehyde, racemic 3α,5α-dihydroxy-2β-(3-oxo-4-methylhexyl)cyclopentane-1β-carboxaldehyde, racemic 3α,5α-dihydroxy - 2β-(3-oxo-4,4-dimethylpentyl)cyclopentane - 1β-carboxaldehyde, racemic 3α,5α-dihydroxy-2β-(3-oxo-4-methylheptyl)cyclopentane-1β-carboxaldehyde, racemic 3α,5α-dihydroxy - 2β - (3-oxo-4-ethylhexyl)cyclopentane- 1β-carboxaldehyde, racemic 3α,5α-dihydroxy-2β-(3-oxononyl)cyclopentane-1β-carboxaldehyde, racemic 3α,5α-dihydroxy-2β-(3-oxo-4-methyloctyl)cyclopentane - 1β - carboxaldehyde, racemic 3α,5α-dihydroxy-2β-(3-oxodecyl)cyclopentane-1β-carboxaldehyde, racemic 3α,5α-dihydroxy-2β-(3-oxoundecyl)cyclopentane - 1β - carboxaldehyde, racemic 3α,5α-dihydroxy-2β-(3-oxo-4-methyldecyl)cyclopentane-1β-carboxaldehyde, and racemic 3α,5α-dihydroxy-2β-(3-oxo-4-ethylnonyl)cyclopentane - 1β - carboxaldehyde, respectively.

Following the procedure of Examples 24 and 25 but substituting for the 1α,3α-p-nitrobenzylidene derivative of racemic 3α,4,5,6,7,7aα-hexahydro-5β(and 5α)-amyl-1α,3α,4α(and 4β),5α(and 5β)-indanetetrol as starting material other 1α,3α-acetals of racemic 3aα,4,5,6,7,7aα-hexahydro-5β(and 5α)-amyl-1α,3α,4α(and 4β),5α(and 5β)-indanetetrol wherein the acetal group is derived from, e.g., formaldehyde, acetaldehyde, propionaldehyde, chloral, p-bromobenzaldehyde, p-chlorobenzaldehyde, p-fluorobenzaldehyde, 2,4,6 - trichlorobenzaldehyde, p - carbomethoxybenzaldehyde and the like is productive of the corresponding 3α,5α-acetals of racemic 3α,5α-dihydroxy-2β-(3-oxooctyl)cyclopentane-1β-carboxaldehyde.

Following the procedure of Examples 24 and 25 but substituting for the 1α,3α-p-nitrobenzylidene derivative of racemic 3aα,4,5,6,7,7aα-hexahydro-5β(and 5α)-amyl-1α,3α,4α(and 4β), 5α(and 5β)-indanetetrol as starting material other 1α,3α-acetals of racemic 3aα,4,5,6,7,7aα-hexahydro-5β(and 5α)-alkyl-1α,3α,4α(and 4β),5α(and 5β)-indanetetrol is productive of the corresponding 3α,5α-acetals of racemic 3α,5α-dihydroxy-2β-(3-oxoalkyl)cyclopentane-1β-carboxaldehyde.

EXAMPLE 26

3α,5α-p-nitrobenzylidene derivative of racemic 3α,5α-dihydroxy - 2β-(3-oxooctyl)cyclopentane-1β-acetaldehyde (9B)

(A) Triphenylmethoxymethyl phosphorane solution.—A solution of 26.3 g. of triphenyl phosphine in 100 ml. of absolute ether is cooled in an ice bath and 8.05 g. of chloromethoxymethane is added. The mixture is then allowed to stand for about 2 days at room temperature and the precipitated phosphonium salt is separated by filtration and dried under diminished pressure. The phosphonium salt is then finely ground and suspended in 100 ml. of anhydrous ether under nitrogen. One equivalent (8.4 g.) of phenyl lithium is added to the suspension, producing a deep red ethereal solution of triphenylmethoxymethylphosphorane.

(B) 3α,5α-p-nitrobenzylidene derivative of racemic 3α,5α-dihydroxy-2β-(3-oxooctyl)cyclopentane - 1β - carboxaldehyde.—A suspension of 20 g. of a mixture of the 1α,3α-p-nitrobenzylidene derivative of racemic 3aα,4,5,6,7,7aα - hexahydro-5β-amyl-1α,3α,4α,5α-indanetetrol and the 1α,3α-p-nitrobenzylidene derivative of racemic 3aα,4,5,6,7,7aα - hexahydro-5α-ampl-1α,3α,4β,5β-indanetetrol in 180 ml. of acetic acid at room temperature is treated with stirring with 27 g. of dry lead tetraacetate. After about 10 minutes water and benzene were added, then the benzene layer was separated, washed twice with water, and evaporated under diminished pressure to give a residue comprising the 3α,5α-p-nitrobenzylidene derivative of racemic 3α,5α-dihydroxy-2β-(3-oxooctyl)cyclopentane-1β-carboxaldehyde.

(C) 3α,5α-p-nitrobenzylidene derivative of racemic 3α,5α-dihydroxy-2β-(3-oxooctyl)cyclopentane - 1β - acetaldehyde.—The 3α,5α-p-nitrobenzylidene derivative of racemic 3α,5α-dihydroxy - 2β- ( 3-oxooctyl)cyclopentane-1β-carboxaldehyde prepared from 20 g. of a mixture of the 1α,3α-p-nitrobenzylidene derivative of racemic 3aα,4,5,6,7,7aα-hexahydro-5α-amyl-1α,3α,4β,5β-indanetetrol and the p-nitrobenzylidene derivative of racemic 3aα,4,5,6,7,7aα-hexahydro-5β-amyl-1α,3α,4α,5α-indanetetrol is dissolved in from 1 to 2 liters of Skellysolve B (mixed hexanes) and the solution is cooled to about 0° C., then a solution in ether of triphenylmethoxymethylphosphorane prepared from 26.3 g. of triphenylphosphine and 8.05 g. of chloromethoxymethane is added with stirring. The resulting mixture is allowed to warm to room temperature and stirred for 3 days, then the solvent is removed by evaporation under diminished pressure to yield a residue comprising triphenylphosphine oxide and the 3α,5α-p-nitrobenzylidene derivative of racemic 3α,5α-dihydroxy-2β-(3-oxooctyl)cyclopentane - 1 - acetaldehyde methyl enol ether. The residue is dissolved in methylene chloride and chromatographed over Florisil. Elution with cyclohexane containing increasing proportions of ethyl acetate from 5 to 30% and evaporation of the eluates is productive of the 3α,5α-p-nitrobenzylidene derivative of racemic 3α,5α-dihydroxy-2β-(3-oxooctyl)-1-cyclopentane acetaldehyde methyl enol ether. The thus obtained methyl enol ether is dissolved at room temperature in 100 ml. of 50% aqueous acetic acid. After standing several minutes, the acetone solution is diluted with 500 ml. of water containing ½ ml. of pyridine and immediately extracted with 200 ml. of methylene chloride. The methylene chloride extract is washed with saturated aqueous sodium bicarbonate, water, dried over anhydrous sodium sulfate and evaporated to dryness under reduced pressure to give a residue comprising the 3α,5α-p-nitrobenzylidene derivative of racemic 3α,5α-dihydroxy-2β-(3-oxooctyl) cyclopentane-1β-acetaldehyde, sufficiently pure for use directly in the procedure of Examples 54, 55 and 56.

Following the procedure of Example 26C, but substituting for the 3α,5α-p-nitrobenzylidene derivative of racemic 3α,5α-dihydroxy-2β-(3-oxooctyl)cyclopentane-1β-carboxaldehyde as starting material the 3α,5α-p-nitrobenzylidene derivative of a racemic 3α,5α-dihydroxy-2β-(3-oxoalkyl)cyclopentane-1β-carboxaldehyde, e.g., the 3α,5α-p-nitrobenzylidene derivative of racemic 3α,5α-dihydroxy-2β-(3-oxobutyl)cyclopentane-1β-carboxaldehyde or another 3-oxoalkyl analog named following Example 25 is productive of the 3α,5α-p-nitrobenzylidene derivative of the corresponding racemic 3α,5α-dihydroxy-2β-(3-oxoalkyl)-1β-cyclopentane acetaldehyde, e.g., the 3α,5α-p-nitrobenzylidene derivative of racemic 3α,5α-dihydroxy-2β-(3-oxobutyl)cyclopentane-1β-acetaldehyde.

Following the procedure of Example 26C but substituting for the 3α,5α-p-nitrobenzylidene derivative of racemic 3α,5α-dihydroxy-2β-(3-oxooctyl)cyclopentane-1β-carboxaldehyde as starting material other 3α,5α-acetals of racemic 3α,5α-dihydroxy-2β-(3-oxooctyl)cyclopentane-1β-carboxaldehyde, wherein the acetal group is derived from, e.g., formaldehyde, acetaldehyde, propionaldehyde, chloral, p-bromobenzaldehyde, p-chlorobenzaldehyde, p-fluorobenzaldehyde, 2,4,6-trichlorobenzaldehyde, p-carbomethoxybenzaldehyde and the like is productive of the corresponding 3α,5α-acetals of racemic 3α,5α-dihydroxy-2β-(3-oxooctyl)cyclopentane-1β-acetaldehyde.

Following the procedure of Example 26C but substituting for the 3α,5α-p-nitrobenzylidene derivative of racemic 3α,5α-dihydroxy-2β-(3-oxooctyl)cyclopentane-1β-carboxaldehyde as starting material another 3α,5α-acetal of a racemic 3α,5α-dihydroxy-2β-(3-oxalkyl)cyclopentane-1β-carboxaldehyde is productive of the corresponding 3α-5α-acetal of 3α,5α-dihydroxy - 2β - (3-oxoalkyl)cyclopentane-1β-acetaldehyde.

EXAMPLE 27

Racemic 5β-(3-oxooctyl) - 4α - hydroxy-1-cyclopentane-1-carboxaldehyde (9C)

A solution of 0.50 g. of the 1α,3α-p-benzylidene derivative of racemic 3aα,4,5,6,7,7aα-hexahydro-5β-amyl-1α,3α,4α,5α-indanetetrol in a mixture of 60 ml. of benzene and 54 ml. of toluene was treated with 1.5 g. of lead tetraacetate and stirred for 2 hrs. at room temperature, then saturated aqueous sodium thiosulfate was added and stirring was continued until the mixture became white. The organic layer was then separated, washed with water, and evaporated to give 0.418 g. of a residue comprising the p - nitrobenzylidene derivative of racemic 3α,5α - dihydroxy-2β-(3-oxooctyl)cyclopentane - 1β - carboxaldehyde (9A).

The thus obtained 0.418 g. of p-nitrobenzylidene derivative of racemic 3α,5α-dihydroxy - 2β - (3-oxooctyl) cyclopentane-1β-carboxaldehyde was dissolved in 4 ml. of ethyl methyl dioxolane, and 1 ml. of this solution was reserved for a nuclear magnetic resonance analysis study. The remaining ethyl methyl dioxolane solution was evaporated under reduced pressure at room temperature, giving 0.312 g. of residue. The thus-obtained residue was chromatographed over Florisil and eluted with 2, 4 and 10% acetone in Skellysolve B. The 2 and 4% acetone eluates were evaporated to give 0.072 g. of crystalline residue shown by nuclear magnetic resonance analysis to be p-nitrobenzaldehyde. The 10% acetone in Skellysolve B eluate was evaporated to give 0.171 g. residue comprising racemic 5β-(3-oxooctyl) - 4α - hydroxy-1-cyclopentene-1-carboxaldehyde (structure was determined by nuclear magnetic resonance analysis) and having a U.V. absorption peak at 236 mμ.

EXAMPLE 28

3α,5α-p-nitrobenzylidene derivative of racemic ethyl trans-[3α,5α-dihydroxy - 2β - (3-oxooctyl)cyclopent-1β-yl] acrylate (10A)

A mixture of 3.00 g. of a mixture of the 1α,3α - p-nitrobenzylidene derivative of racemic 3aα,4,5,6,7,7aα-hexahydro-5β-amyl - 1α,3α,4α,5α - indanetetrol and the 1α,3α-p-nitrobenzylidene derivative of racemic 3aα,4,5,6, 7,7aα-hexahydro - 5α - amyl-1α,3α,4β,5β-indanetetrol, 250 ml. of benzene and 9.0 g. of lead tetraacetate was stirred for one hour at room temperature. The mixture was then diluted with ether and water and filtered through Celite (diatomaceous earth). The filtrate was washed twice with water, and the solvent removed by evaporation at room temperature under reduced pressure to give 2.46 g. of the 3α,5α-p-nitrobenzylidene derivative of racemic 3α,5α-dihydroxy-2β-(3-oxooctyl)cyclopentane - 1β - carboxaldehyde as an oil.

The thus-obtained aldehyde was dissolved in 150 ml. of methylene chloride and the solution was cooled in an ice bath, then 6.00 g. of carbethoxymethylenetriphenylphosphorane was added the mixture was allowed to warm to room temperature. Stirring was continued for about 70 hours then the solvent was removed by evaporation under diminished pressure and the thus-obtained residue comprising the 3α,5α-p-nitrobenzylidene derivative of racemic ethyl trans-[3α,5α-dihydroxy - 2β - (3-oxooctyl)cyclopent-1β-yl] acrylate was chromatographed over Florisil. The 8% acetone in Skellysolve B eluates were evaporated to give 2.152 g. of crystalline 3α,5α-p-nitrobenzylidene derivative of racemic ethyl trans-[3α,5α-dihydroxy-2β-(3-oxooctyl)cyclopent-1β-yl] acrylate which after recrystallization from a mixture of ether and Skellysolve B had a melting point of 58–60° C., infrared absorption maxima (Nujol solution) at 1710, 1650, 1610, 1520, 1350, 1220, 1180, 1170, 1115, 1080, 1040, 1000, 855, 850 and 755 cm.$^{-1}$ and the following analysis:

*Analysis.*—Calcd. for $C_{25}H_{33}O_7N$ (percent): C, 65.34; H, 7.24; N, 3.05. Found (percent): C, 65.33; H, 7.30; N, 3.34.

EXAMPLE 29

3α,5α-p-nitrobenzylidene derivative of racemic ethyl trans-[3α,5α-dihydroxy - 2β - (3-oxooctyl)cyclopent-1β-yl] acrylate (10A)

A solution of 0.465 g. of the 3α,5α-p-nitrobenzylidene derivative of racemic 3α,5α-dihydroxy - 2β - (3-oxooctyl) cyclopentane-1β-carboxaldehyde (prepared as in Example 22) in 25 ml. of methylene chloride was cooled in an ice bath and 0.80 g. of carbethoxymethylenetriphenylphosphorane was added. The mixture was then allowed to stand for about 70 hours at room temperature and the solvent was removed by evaporation under diminished pressure. The thus-obtained residue was dissolved in 50 ml. of a mixture of 20% ethyl acetate in cyclohexane and filtered through 20 g. of silica gel. The silica gel was washed with an additional 200 ml. of 20% ethyl acetate in cyclohexane and the filtrate and washings together were evaporated under diminished pressure to give 0.433 g. of crystalline 3α,5α - p - nitrobenzylidene derivative of racemic ethyl trans-[3α,5α-dihydroxy - 2β - (3-oxooctyl) cyclopent-1β-yl] acrylate which after recrystallization from a mixture of acetone and Skellysolve B had a melting point of 56–58° C.

Following the procedures of Examples 28 and 29, but substituting for the 3α,5α - p - nitrobenzylidene derivative of racemic 3α,5α - dihydroxy - 2β - (3 - oxooctyl)cyclopentane - 1β - carboxaldehyde as starting material the 3α,5α-p-nitrobenzylidene derivative of a racemic 3α,5α-dihydroxy-2β-(3-oxoalkyl)cyclopentane - 1β - carboxaldehyde, e.g., the 3α,5α - p - nitrobenzylidene derivative of racemic 3α,5α-dihydroxy - 2β - (3-oxobutyl)cyclopentane-1β-carboxaldehyde or another 2β-(3-oxoalkyl) aldehyde named following Example 25 is productive of the 3α,5α-p - nitrobenzylidene derivative of the corresponding racemic ethyl trans-[3α,5α-dihydroxy - 2β - (3-oxoalkyl)cyclopent-1β-yl]acrylate, e.g. the 3α,5α-p-nitrobenzylidene derivative of racemic ethyl trans-[3α,5α-dihydroxy-2β-(3-oxobutyl)cyclopent-1β-yl] acrylate Following the procedures of Examples 28 and 29 but substituting for the 3α5α-p-nitrobenzylidene derivative of racemic 3α,5α - dihydroxy - 2β-(3-oxooctyl)cyclopentane-1β-carboxaldehyde as starting material other 3α,5α-acetals of racemic 3α,5α - dihydroxy - 2β - (3-oxooctyl)cyclopentane-1β-carboxaldehyde wherein the acetal group is derived from, for example, formaldehyde acetaldehyde propionaldehyde chloral p - bromobenzaldehyde, p - fluorobenzaldehyde, p - carbomethoxybenzaldehyde, p - chlorobenzaldehyde, 2,4,6-trichlorobenzaldehyde and the like is productive of the corresponding 3α,5α-acetals of racemic ethyl trans-[3α,5α-dihydroxy - 2β - (3-oxooctyl)cyclopent-1β-yl] acrylate.

Following the procedures of Examples 28 and 29 but substituting for the 3α,5α-p-nitrobenzylidene derivative of racemic 3α,5α-dihydroxy - 2β - (3-oxooctyl)cyclopentane-1β-carboxaldehyde as starting material other 3α, 5α-acetals of racemic 3α,5α-acetals of racemic 3α,5α-dihydroxy-2β-(3-oxoalkyl)cyclopentane - 1β - carboxaldehyde is productive of the corresponding 3α,5α-acetals of racemic ethyl trans-[3α,5α-dihydroxy - 2β - (3-oxoalkyl)cyclopent-1β-yl] acrylate.

Substituting carbomethoxymethylenetriphenylphosphorane for carbethoxymethylenetriphenylphosphorane in Examples 28 and 29 is productive of the corresponding methyl acrylates.

EXAMPLE 30

3α,5α-p-nitrobenzylidene derivatives of racemic methyl 5 - [3α,5α - dihydroxy-2β-(3-oxooctyl)cyclopent-1β-yl]-2,4-pentadienoate (10A)

(A). 3α,5α-p-nitrobenzylidene derivative of racemic 3α, 5α - dihydroxy - 2β-(3-oxooctyl)cyclopentane-1β-carboxaldehyde (9A).—A suspension of 5.00 g. (0.0128 mole) of a mixture of the 1α,3α-p-nitrobenzylidene derivative of racemic 3aα,4,5,6,7,7aα - hexahydro-5β-amyl-1α,3α,4α,5α indanetetrol and the 1α,3α-p-nitrobenzylidene derivative of racemic 3aα,4,5,6,7,7aα - hexahydro-5α-amyl-1α,3α,4β,5β-indanetetrol in 25 ml. of acetic acid was stirred at room temperature and 6.8 g. of lead tetraacetate was added. The mixture was stirred for 5 minutes then 25 ml. of water and 25 ml. of benzene were added and the organic phase separated. The aqueous phase was washed twice more with benzene after which the combined organic layers were washed with water, dried, and evaporated under diminished pressure to give a residue comprising the 3α,5α-p-nitrobenzylidene derivative of racemic 3α,5α-dihydroxy-2β-(3-oxooctyl)cyclopentane-1β-carboxaldehyde.

(B) Methylcrotylphosphorane (carbomethoxyallylidenetriphenylphosphorane).—A mixture of 5.74 g. (0.032 mole) of methyl 4-bromocrotonate, 8.83 g. of triphenylphosphine and 25 ml. of chloroform was stirred at 0° C. until a clear solution formed. The solution was allowed to stand 5 hrs. at room temperature, then 39 ml. of ice-cold aqueous 5% sodium hydroxide was added and the mixture was shaken for 10 minutes. The organic layer was then separated, washed with water, dried and evaporated under diminished pressure to give a dark orange oil consisting of the phosphorane from triphenylphosphine and methyl 4-bromocrotonate which crystallized on standing.

(C) 3α,5α - p - nitrobenzylidene derivative of racemic methyl 5-[3α,5α - dihydroxy-2β-(3-oxooctyl)cyclopent-1β-yl]-2,4-pentadienoate (10A).—The crude 3α,5α-p-nitrobenzylidene derivative of racemic 3α,5α-dihydroxy-2β-(3-oxooctyl)cyclopentane-1β-carboaldehyde obtained as in A, above, and the methyl crotyl phosphorane obtained as in B, above, were each dissolved in 10 to 15 ml. of chloroform, cooled in an ice bath, and then mixed under a nitrogen atmosphere. The resulting mixture was allowed to stand about 18 hrs. at 5° C., then was allowed to warm to room temperature and was poured onto a chromatographic column of 500 g. of Florisil. The column was eluted with 5000 ml. portions of Skellysolve B containing 2, 5, 5 and 7.5% acetone. The 5% acetone in Skellysolve B eluates were evaporated to give 3.6 g. of residue comprising the 3α,5α-p-nitrobenzylidene derivative of racemic methyl 5 - [3α,5α-dihydroxy-2β-(3-oxooctyl)cyclopent-1β-yl]-2,4-pentadienoate which was further purified by chromatography over 180 g. of silica gel. Elution with a mixture of 20% ethyl acetate-80% cyclohexane gave 2.7 g. of product which after several crystallizations from methanol had a melting point of 88–89° C., infrared absorption maxima at 1720, 1695, 1640, 1610, 1605, 1490, 1515, 1355, 1340, 1310, 1225, 1170, 1140, 1085, 1040, 1010, 1000, 855, 850, 750, and 745 cm.$^{-1}$, and the following analysis:

Calcd. for $C_{26}H_{33}O_7N$ (percent): C, 66.22; H, 7.05; N, 2.97. Found (percent): C, 66.18; H, 6.91; N, 3.09. Nuclear magnetic resonance analysis supported the proposed structure.

Following the procedure of Example 30 but substituting for the 3α,5α-p-nitrobenzylidene derivative of racemic 3α, 5α - dihydroxy - 2β-(3-oxooctyl)cyclopentane-1β-carboxaldehyde as starting material the 3α,5α-p-nitrobenzylidene derivative of a racemic 3α,5α-dihydroxy-2β-(3-oxoalkyl)cyclopentane-1β-carboxaldehyde, e.g., the 3α,5α-p-nitrobenzylidene derivative of racemic 3α,5α-dihydroxy-2β-(3-oxobutyl)cyclopentane-1β-carboxaldehyde or another 2β-(3-oxoalkyl) aldehyde named following Example 25 is productive of the 3α,5α-p-nitrobenzylidene derivative of the corresponding racemic methyl 5-[3α,5α-dihydroxy-2β-(3-oxoalkyl)cyclopent-1β-yl]-2,4 - pentadienoate, for example, the 3α,5α-p-nitrobenzylidene derivative of racemic methyl 5 - [3α,5α - dihydroxy-2β-(3-oxobutyl)cyclopent-1β-yl]-2,4-pentadienoate.

Following the procedure of Example 30 but substituting for the 3α,5α-p-nitrobenzylidene derivative of racemic 3α, 5α - dihydroxy - 2β-(3-oxooctyl)cyclopentane-1β-carboxaldehyde as starting material other 3α,5α-acetals of racemic 3α,5α-dihydroy-2β-(3-oxooctyl)cyclopentane-1β-carboxaldehyde wherein the acetal group is derived, for example, from formaldehyde, acetaldehyde, propionaldehyde, chloral, p-bromobenzaldehyde, p-chlorobenzaldehyde, p - fluorobenzaldehyde, p - carbomethoxybenzaldehyde, 2,4,6-trichlorobenzaldehyde and the like is productive of the corresponding 3α,5α-acetals of racemic methyl 5 - [3α,5α - dihydroxy-2β-(3-oxooctyl)cyclopent-1β-yl]-2,4-pentadienoate.

Following the procedure of Example 30 but substituting for the 3α,5α-p-nitrobenzylidene derivative of racemic 3α, 5α - dihydroxy - 2β-(3-oxooctyl)cyclopentane-1β-carboxaldehyde as starting material another 3α,5α-acetal of a racemic 3α,5α - dihydroxy-β-(3-oxoalkyl)cyclopentane-1β-carboxaldehyde is productive of the corresponding 3α,5α-acetal of racemic methyl 5-[3α,5α-dihydroxy-2β-(3-oxoalkyl)cyclopent-1β-yl]-2,4-pentadienoate.

Following the procedure of Example 30 but substituting ethyl 4-bromocrotonate for methyl 4-bromocrotonate is productive of the corresponding ethyl esters.

EXAMPLE 31

3α,5α-p-nitrobenzylidene derivative of racemic ethyl 7-[3α, 5α - dihydroxy - 2β-(3-oxooctyl)cyclopent-1β-yl]-2,4,6-heptatrienoate (10A)

(A) Ethylsorbylphosphorane solution.—A solution of 15.0 g. of triphenylphosphine in 50 ml. of benzene was cooled in an ice bath and a solution of 12.1 g. of ethyl ω-bromosorbate in 25 ml. of benzene was added. The mixture was stirred at room temperature for about 72 hours, then was filtered to obtain a sticky solid which was washed with ether to obtain 12.3 g. of a granular solid comprising the triphenylphosphonium salt of ethyl ω-bromosorbate. A suspension of 4.00 g. of the thus obtained triphenylphosphonium salt of ω-bromosorbate in 200 ml. of methylene chloride was mixed with 100 ml. of water and the mixture was stirred until the solid dissolved. The mixture was then cooled in an ice bath and stirred under a nitrogen atmosphere while a solution of 0.32 g. of sodium hydroxide in 5 ml. of water was added dropwise. The organic phase became a deep red color. When addition was complete the organic phase was separated and washed four times with water until the washes were neutral to a pH test paper, giving a solution comprising ethylsorbylphosphorane in methylene chloride.

(B) 3α,5α-p-nitrobenzylidene derivative of racemic 3α, 5α-dihydroxy - 2β - (3 - oxooctyl)cyclopentane-1β-carboxaldehyde.—A suspension of 1.22 g. of a mixture comprising the 1α,3α-p-nitrobenzylidene derivative of racemic 3aα,4,5,6,7,7aα - hexahydro - 5β - amyl-1α,3α,4α,5α-indanetetrol and the 1α,3α-p-nitrobenzylidene derivative of racemic 3aα,4,5,6,7,7aα-hexahydro - 5α - amyl-1α,3α,4β,5β-indanetetrol in 150 ml. of benzene was cooled with an ice bath and stirred while adding 1.5 g. of lead tetraacetate. After stirring for 1 hour the ice bath was removed and the mixture was stirred for an additional hour at room temperature, then 50 ml. of water and 50 ml. of ether were added. The mixture was filtered through Celite (diatomaceous earth filter aid) and the organic phase was separated, washed twice with water, then evaporated to dryness under diminished pressure at room temperature to give 1.28 g. of a residue comprising the 3α,5α-p-nitrobenzylidene derivative of racemic 3α,5α-dihydroxy-2β - (3-oxooctyl)cyclopentane-1β-carboxaldehyde.

(C) 3α,5α-p-nitrobenzylidene derivative of racemic ethyl 7-[3α,5α-dihydroxy - 2 - (3 - oxooctyl)cyclopent-1β-yl]-2,4,6-heptatrienoate.—The 1.28 g. of the 3α,5α-p-nitrobenzylidene derivative of racemic 3α,5α-dihydroxy-2β-(3-oxooctyl)cyclopentane - 1β - carboxaldehyde prepared as in B, above, was dissolved in 50 ml. of methylene chloride and one half of this solution was added dropwise to the solution of ethylsorbylphosphorane in methylene chloride prepared as in A, above, while cooling in an ice bath. The mixture was stirred at room temperature for 3 days, then the solvent was removed by evaporation under diminished pressure. The residue was dissolved in 50 ml. of methylene chloride and chromatographed over silica gel and eluted with 5%, 10% and 20% ethyl acetate in cyclohexane. Following removal of a small amount of ethyl 7-(p-nitrophenyl)-hepta - 2,4,6 - trienoate with 10% ethyl acetate in cyclohexane, the 20% ethyl acetate in cyclohexane fractions were collected and evaporated to give 0.112 g. of a residue comprising the 3α,5α-p-nitrobenzylidene derivative of racemic ethyl 7 - [3α,5α-dihydroxy - 2 - (3-oxooctyl)cyclopent-1β-yl]-2,4,6-heptatrienoate having an ultraviolet absorption maximum at 295 mμ. The structure was confirmed by infrared and nuclear magnetic resonance analyses.

EXAMPLE 32

3α,5α-p-nitrobenzylidene derivative of racemic ethyl 7-[3α,5α-dihydroxy - 2β - (3 - oxooctyl)cyclopent-1β-yl]-2,4,6-heptatrienoate (10A)

(A) 3α,5α-p-nitrobenzylidene derivative of racemic 3α,5α-dihydroxy - 2β - (3 - oxooctyl)-cyclopentane-1β-carboxaldehyde.—A suspension of 2.0 g. of a mixture of the 1α,3α-p-nitrobenzylidene derivative of racemic 3aα, 4,5,6,7,7aα-hexahydro-5β-amyl - 1α,3α,4α,5α - indanetetrol and the 1α,3α-p-nitrobenzylidene derivative or racemic 3aα-4,5,6,7,7aα-hexahydro- - amyl-1α,3α,4β,5β-indanetetrol in 18 ml. of acetic acid at room temperature was treated with stirring with 2.7 g. of dry lead tetraacetate. After 5 minutes water and benzene were added, then the benzene layer was separated, washed twice with water and evaporated under diminished pressure to give a residue comprising the 3α,5α-p-nitrobenzylidene derivative of racemic 3α,5α-dihydroxy - 2β - (3 - oxooctyl)-cyclopentane-1β-carboxaldehyde.

(B) Ethylsorbylphosphorane (5-carboethoxy-2,4-pentadienylidenetriphenylphosphorane).—A mixture of 4.38 g. of ethyl ω-bromosorbate, 5.97 g. of triphenylphosphine and 25 ml. of chloroform was prepared with ice bath for cooling and was allowed to stand in the melting ice bath for about 24 hours, then the mixture was stirred vigorously under a nitrogen atmosphere and 25 ml. of cold aqueous 5% sodium hydroxide was added. Stirring was continued for 10 minutes. A deep orange-red organic phase separated, which was washed with water, dried, and concentrated by evaporation under diminished pressure to give an oil comprising ethylsorbylphosphorane.

(C) 3α,5α - p-nitrobenzylidene derivative of racemic ethyl 7-[3α,5α-dihydroxy - 2β - (3 - oxooctyl)-cyclopent-1β-yl]-2,4,6-heptatrienoate (10A).—The 3α,5α - p - nitrobenzylidene derivative of racemic 3α,5α-dihydroxy-2β-(3-oxooctyl)cyclopentane - 1β - carboxaldehyde, prepared as in part A, above, was dissolved in 25 ml. of methylene chloride and stirred under nitrogen while cooling in an ice-salt bath, then a solution of the ethylsorbylphosphorane, prepared as in part B, above, in 25 ml. of methylene chloride was added. The resulting mixture was stirred for 30 minutes, then was allowed to stand for about 18 hours at —10° C. The reaction mixture was then allowed to warm to room temperature and was poured onto a 200 g. of Florisil in a chromatograph column. The column was developed with 400-ml. portions of Skellysolve B containing increasing amounts of acetone. The first 3 fractions of 5% acetone in Skellysolve B contained triphenylphosphine. Development was continued with seven 5%-acetone and five 7.5%-acetone in Skellysolve B fractions. These were combined and evaporated to give 2.155 g. of a pale yellow gum comprising the 3α,5α-p-nitrobenzylidene derivative of racemic ethyl 7-[3α,5α-dihydroxy-2β-3-oxooctyl)-cyclopent - 1β - yl] - 2,4,6-heptatrienoate. This was twice crystallized from methanol to give an analytical sample of the 3α,5α-p-nitrobenzylidene derivative of racemic ethyl 7-[3α,5α-dihydroxy-2β-)3-oxooctyl)cyclopent - 1β - yl] - 2,4,6-heptatrienoate having a melting point of 92–93° C., ultraviolet absorption peaks in ethanol of $\lambda_{max.}=213$ m$\mu$, $\epsilon=11,800$ and $\lambda_{max.}=302$ m$\mu$, $$\epsilon=49,350$$

I.R. absorption maxima at 1715, 1700, 1620, 1585, 1515, 1360, 1240, 1210, 1135, 1180, 1035, 1010, 845, 750 and 740 cm.$^{-1}$, and the following analysis:

Calcd. for $C_{29}H_{37}O_7N$(percent): C, 68.08; H, 7.29; N, 2.74. Found (percent): C, 68.30; H, 7.34; N, 2.74.

Following the procedure of Examples 31 and 32, but substituting for the 3α,5α-p-nitrobenzylidene derivative of racemic 3α,5α-dihydroxy - 2β - (3 - oxooctyl)cyclopentane-1β-carboxaldehyde as starting material the 3α,5α-p-nitrobenzylidene derivative of a racemic 3α,5α-hydroxy-2β-(3-oxoalkyl)-cyclopentane - 1β - carboxaldehyde, e.g., the 3α,5α-p-nitrobenzylidene derivative of racemic 3α,5α-dihydroxy - 2β - (3 - oxobutyl)cyclopentane-1β-carboxaldehyde or another 2β-(3-oxoalkyl) analog named following Example 25 is productive of the 3α,5α-p-nitrobenzylidene derivative of the corresponding racemic ethyl 7-[3α,5α-dihydroxy - 2β - (3 - oxoalkyl)cyclopent-1β-yl]-hepta-2,4,6-trienoate, e.g., the 3α,5α-p-nitrobenzylidene derivative of racemic ethyl 7-[3α,5α-dihydroxy-2β-(3-oxobutyl)cyclopent-1β-yl]-hepta-2,4,6-trienoate.

Following the procedure of Examples 31 and 32, but substituting for the 3α,5α-p-nitrobenzylidene derivative of racemic 3α,5α - dihydroxy-2β-(3 - oxooctyl)cyclopentane-1β-carboxaldehyde as starting material other 3α,5α-acetals of racemic 3α,5α-dihydroxy-2β-(3-oxooctyl)cyclopentane-1β-carboxaldehyde wherein the acetal group is derived from, for example, formaldehyde, acetaldehyde, propionaldehyde, chloral, p-bromobenzaldehyde, p-chlorobenzaldehyde, p-fluorobenzaldehyde, p-carbomethoxybenzaldehyde, 2,4,6-trichlorobenzaldehyde and the like is productive of the corresponding 3α,5α-acetals of racemic ethyl 7-[3α,5α-dihydroxy - 2β - (3 - oxooctyl)cyclopent-1β-yl]-hepta-2,4,6-trienoate.

Following the procedure of Examples 31 and 32, but substituting for the 3α,5α-p-nitrobenzylidene derivative of racemic 3α,5α-dihydroxy-2β-(3-oxooctyl)cyclopentane-1β-carboxaldehyde as starting material another 3α,5α-acetal of a racemic 3α,5α - dihydroxy-2β-(3-oxoalkyl)cyclopentane-1β-carboxaldehyde is productive of the corresponding 3α,5α-acetal of racemic ethyl 7-[3α,5α-dihydroxy-2β-(3-oxoalkyl)cyclopent-1β-yl]-hepta-2,4,6-trienoate.

Following the procedure of Examples 31 and 32, but substituting for ethyl ω-bromosorbate other alkyl esters of ω-bromosorbic acid, for example, methyl ω-bromosorbate, is productive of the corresponding alkyl ester of Formula 10A, for example, the 3α,5α-p-nitrobenzylidene derivative of racemic methyl 7-[3α,5α-dihydroxy-2β-(3-oxooctyl)cyclopent-1β-yl]-2,4,6-heptatrienoate.

EXAMPLE 33

3α,5α-p-nitrobenzylidene derivative of racemic methyl 3-methyl-5-[3α,5α - dihydroxy - 2β - (3 - oxooctyl)cyclopent-1β-yl]-2,4-pentadienoate (10A)

Following the procedure of Example 30 but substituting methyl 3-methyl - 4 - bromo-2-butenoate for methyl bromocrotonate as starting material in part B is productive of the 3α,5α-p-nitrobenzylidene derivative of racemic methyl 3-methyl-5-[3α,5α - dihydroxy-2β-(3-oxooctyl)cyclopent-1β-yl]-2,4-pentadienoate.

Following the procedure of Example 30, parts B and C, but substituting methyl 3-methyl-4-bromo-2-butenoate for methyl bromocrotonate in part B and substituting for the 3α,5α-p-nitrobenzylidene derivative of racemic 3α,5α-dihydroxy-2β-(3 - oxooctyl) - cyclopentane-1-carboxaldehyde in part C the 3α,5α-p-nitrobenzylidene derivative of a racemic 3α,5α-dihydroxy-2β-(3-oxoalkyl)-cyclopentane-1β-carboxaldehyde, e.g., the 3α,5α-p-nitrobenzylidene derivative of racemic 3α,5α - dihydroxy-2β-(3-oxobutyl)cyclopentane-1β-carboxaldehyde or another 2β-(3-oxoalkyl) aldehyde named following Example 25 is productive of the 3α,5α-p-nitrobenzylidene derivative of the corresponding racemic methyl 3 - methyl-5-[3α,5α-dihydroxy-2β-(3-oxoalkyl)cyclopent - 1β - yl] - 2,4-pentadienoate, e.g., the 3α,5α-p-nitrobenzylidene derivative of racemic methyl 3-methyl - 5 - [3α,5α-dihydroxy-2β-(3-oxobutyl)cyclopent-1β-yl]-2,4-pentadienoate.

Following the procedure of Example 30, parts B and C, but substituting methyl 3-methyl-4-bromo-2-butenoate for methyl bromocrotonate in part B and substituting for the 3α,5α-p-nitrobenzylidene derivative of racemic 3α,5α-dihydroxy-2β-(3-oxooctyl)cyclopentane - 1β - carboxaldehyde in part C other 3α,5α-acetals of racemic 3α,5α-dihydroxy-2β-(3 - oxooctyl)-cyclopentane-1β-carboxaldehyde, wherein the acetal group is derived from, for example, formaldehyde, acetaldehyde, propionaldehyde, chloral, p-bromobenzaldehyde, p-chlorobenzaldehyde, p-fluorobenzaldehyde, p-carbomethoxybenzaldehyde, 2,4,6 - trichlorobenzaldehyde, and the like is productive of the corresponding 3α,5α-acetals of racemic methyl 3-methyl-5-[3α,5α-dihydroxy-2β - (3 - oxooctyl)cyclopent-1β-yl]-2,4-pentadienoate.

Following the procedure of Example 30, parts B and C, but substituting methyl 3-methyl-4-bromo-2-butenoate for methyl bromocrotonate in part B and substituting for the 3α,5α-p-nitrobenzylidene derivative of racemic 3α,5α-dihydroxy-2β-(3-oxooctyl)cyclopentane - 1β - carboxaldehyde in part C another 3α,5α-acetal of a racemic 3α,5α-dihydroxy-2β-(3-oxoalkyl)cyclopentane - 1β - carboxaldehyde is productive of the corresponding 3α,5α-acetal of racemic methyl 3 - methyl-5-[3α,5α-dihydroxy-2β-(3-oxoalkyl)cyclopent-1β-yl]-2,4-pentadienoate.

Following the procedure of Example 30, parts B and C, but substituting an alkyl 3-methyl-4-bromo-2-butenoate, for example, ethyl 3-methyl-4-bromo-2-butenoate, for methyl bromocrotonate, is productive of the corresponding 3α,5α-p-nitrobenzylidene derivative of racemic alkyl 3-methyl-5-[3α,5α-dihydroxy-2β - (3-oxooctyl)cyclopent-1β-yl]-2,4-pentadienoate, for example, the 3α,5α-p-nitrobenzylidene derivative of racemic ethyl 3-methyl-5-[3α,5α-dihydroxy-2β-(3-oxooctyl)cyclopent - 1β - yl] - 2,4-pentadienoate.

EXAMPLE 34

Racemic ethyl 7-[3α,5α-dihydroxy-2β-(3-oxooctyl)-cyclopent-1β-yl]-hepta-2,4,6-trienoate (10B)

A mixture of 300 mg. of the 3α,5α-p-nitrobenzylidene derivative of ethyl 7-[3α,5α-dihydroxy-2β-(3-oxooctyl)-cyclopent-1β-yl]-hepta-2,4,6-trienoate, 15 ml. of acetone, 5 ml. of water and 0.3 ml. of concentrated sulfuric acid was heated under reflux in a nitrogen atmosphere for 3 hrs., then the mixture was evaporated under reduced pressure until most of the acetone had been removed and the residue was extracted with methylene chloride. The methylene chloride extract was washed with aqueous sodium bicarbonate, dried, and evaporated to a partly crystalline residue, which was dissolved in a mixture of 33% ethyl acetate and 67% cyclohexane and chromatographed over 15 g. of silica gel. The column was eluted first with a mixture of 50% ethyl acetate and 50% cyclohexane and then with ethyl acetate. The ethyl acetate eluates were evaporated to give 161 mg. of an oil comprising ethyl 7 - [3α,5α - dihydroxy-2β-(3-oxooctyl)cyclopent-1β-yl]-hepta-2,4,6-trienoate, homogeneous as shown by thin layer chromatography and showing strong hydroxyl absorption in the infrared and a U.V. absorption peak at 303 mμ.

A crude product prepared and chromatographed over silica gel as above was chromatographed over Florisil and eluted with Skellysolve B (mixed hexanes) containing acetone. The 20% acetone-80% Skellysolve B eluates were evaporated to give a pale yellow syrup which crystallized on standing. The thus obtained crystalline product was recrystallized twice from ether to give racemic ethyl 7 - [3α,5α - dihydroxy-2β-(3-oxooctyl)cyclopent-1β-yl]hepta-2,4,6-trienoate having a melting point of 67–69° C., an ultraviolet absorption maximum at 304 mμ (ε=44,600), infrared absorption maxima at 3340, 3240, 1705, 1695, 1630, 1615, 1585, 1240, 1135 and 1005 cm.$^{-1}$, and the following analysis:

Analysis.—Calcd. for $C_{22}H_{34}O_5$ (percent): C, 69.81; H, 9.05. Found (percent): C, 69.60; H, 8.96.

Following the procedure of Example 34, but substituting for the 3α,5α-p-nitrobenzylidene derivative of racemic ethyl 7-[3α,5α-dihydroxy-2β-(3-oxooctyl)-cyclopent-1β-yl]-2,4,6-heptatrienoate as starting material the following compounds:

(1) The 3α,5α-p-nitrobenzylidene derivative of racemic ethyl trans - [3α,5α-dihydroxy-2β-(3-oxooctyl)cyclopent-1β-yl] acrylate (2) The 3α,5α-p-nitrobenzylidene derivative of racemic methyl 5-[3α,5α-dihydroxy-2β-(3-oxooctyl)cyclopent-1β-yl]-2,4-pentadienoate (3) The 3α,5α-p-nitrobenzylidene derivative of racemic methyl 3 - methyl-5-[3α,5α-dihydroxy-2β-(3-oxooctyl)cyclopent-1β-yl]-2,4-pentadienoate and (4) The 3α,5α-p-nirobenzylidene derivative of racemic ethyl 7 - [3α,5α-dihydroxy-2β-(3-oxobutyl)cyclopent-1β-yl]-2,4,6-heptatrienoate is productive of:

(1) racemic ethyl trans - [3α,5α - dihydroxy-2β-(3-oxooctyl)-cyclopent-1β-yl] acrylate (2) racemic methyl 5-[3α,5α-dihydroxy-2β-(3-oxooctyl)-cyclopent-1β-yl]-2,4-pentadienoate (3) racemic methyl 3-methyl-5-[3α,5α-dihydroxy-2β-(3-oxooctyl)cyclopent-1β-yl]-2,4-pentadienoate and (4) racemic ethyl 7-[3α,5α-dihydroxy-2β-(3-oxobutyl)-cyclopent-1β-yl]-2,4,6-heptatrienoate.

Similarly, substituting other 3α,5α-acetals of racemic ethyl 7 - [3α,5α - dihydroxy-2β-(3-oxooctyl)cyclopent-1β-yl]-2,4,6-heptatrienoate and other 3α,5α-acetals of the 3α,5α-dihydroxy compounds named following Example 34, for example, the 3α,5α-acetals of racemic ethyl 7-[3α,5α-dihydroxy - 2β - (3 - oxooctyl)cyclopent-1β-yl]-2,4,6-heptatrienoate wherein the acetal radical is derived from formaldehyde, acetaldehyde, propionaldehyde, chloral, p-bromobenzaldehyde, p - chlorobenzaldehyde, p - fluorobenzaldehyde, p-carbomethoxybenzaldehyde and 2,4,6-trichlorobenzaldehyde for the 3α,5α-p-nitrobenzylidene derivative of racemic ethyl 7-[3α,5α-dihydroxy-2β-(3-oxooctyl)cyclopent-1β-yl]2-4,6-heptatrienoate as starting materials in the procedure of Example 34 is productive of the corresponding free 3α,5α-diols.

Substituting other alkyl esters of structure 10A in place of the methyl and ethyl esters named following Example 34 as starting materials in the process of Example 34 is productive of the corresponding alkyl esters of structure 10B.

Following the procedure of Example 34, but substituting for the 3α,5α-p-nitrobenzylidene derivative of racemic ethyl 7 - [3α,5α - dihydroxy-2β-(3-oxooctyl)cyclopent-1β-ly]-2,4,6-heptatrienoate as starting material:

(1) The 3α,5α-acetal of a racemic alkyl [3α,5α-dihydroxy-2β-(3-oxoalkyl)cyclopent-1β-yl] acrylate, (2) The 3α,5α-acetal of a racemic alkyl 5-[3α,5α-dihydroxy - 2β - (3 - oxoalkyl)cyclopent - 1β - yl] - 2,4-pentadienoate, (3) The 3α,5α-acetal of a racemic alkyl 3-methyl-5-[3α,5α - dihydroxy-2β-(3-oxoalkyl)cyclopent-1β-yl]-2,4-pentadienoate and (4) The 3α,5α-acetal of a racemic alkyl 7-[3α,5α-dihydroxy - 2β - (3 - oxoalkyl)cyclopent-1β-yl]-2,4,6-heptatrienoate is productive of:

(1) a racemic alkyl [3α,5α-dihydroxy-2β-(3-oxoalkyl)-cyclopent-1β-yl] acrylate, (2) a racemic alkyl 5-[3α,5α-dihydroxy-2β-(3-oxoalkyl)-cyclopent-1β-yl]-2,4-pentadienoate, (3) a racemic alkyl 3-methyl-5-[3α,5α-dihydroxy-2β-(3-oxoalkyl)cyclopent-1β-yl]-2,4-pentadienoate and (4) a racemic alkyl 7-[3α,5α-dihydroxy-2β-(3-oxoalkyl)-cyclopent-1β-yl]-2,4,6-heptatrienoate.

EXAMPLE 35

Racemic ethyl trans-[3α,5α-dihydroxy-2β-(3-oxooctyl) cyclopent-1β-yl] acrylate (10B)

A solution of 0.623 g. of the 3α,5α-p-nitrobenzylidene derivative of racemic ethyl trans-[3α,5α-dihydroxy-2β-(3-oxooctyl)cyclopent-1β-yl] acrylate and 25 drops of concentrated sulfuric acid in a mixture of 50 ml. of acetone and 25 ml. of water was heated for one hour under reflux and then cooled. The acetone was then removed by evaporation under diminished pressure and the aqueous residue was extracted with methylene chloride. The methylene chloride solution was dried and chromatographed over Florisil. Elution with Skellysolve B containing 25–40% acetone and evaporation of the eluates gave 0.342 g. of an oil comprising racemic ethyl trans-[3α,5α-dihydroxy-2β-(3-oxooctyl)cyclopent-1β-yl] acrylate which on crystallization from ethyl acetate-Skellysolve B gave an analytical sample having a melting point of 80–81° C., I.R. absorption maxima at 3260, 1705, 1650, 1175, 1095 and 1030 cm.$^{-1}$, and the following analysis:

*Analysis.*—Calc'd. for $C_{18}H_{30}O_5$ (percent): C, 66.23; H, 9.26. Found (percent): C, 66.53; H, 9.25.

EXAMPLE 36

3α,5α-p-nitrobenzylidene derivative of racemic ethyl 7-[3α,5α - dihydroxy - 2β - (3 - hydroxyoctyl)cyclopent-1β-yl]-2,4,6-heptatrienoate (10C)

To a solution of 1.0 g. of the 3α,5α-p-nitrobenzylidene derivative of racemic ethyl 7-[3α,5α-dihydroxy-2β-(3-oxooctyl)cyclopent-1β-yl]-2,4,6-heptatrienoate (10A) in 10 ml. of tetrahydrofuran in a nitrogen atmosphere was added 1.2 g. of lithium tri-tert.-butoxy aluminum hydride. The mixture was allowed to stand 3 hrs. at room temperature, then was concentrated, carefully acidified with dilute hydrochloric acid and extracted with methylene chloride. The methylene chloride extract was chromatographed over 50 g. of Florisil. Elution with 7.5% and 10% acetone in Skellysolve B followed by evaporation of the eluates gave 289 mg. of an oily product comprising the 3α,5α-p-nitrobenzylidene derivative of racemic ethyl 7-[3α,5α-dihydroxy - 2β - (3 - hydroxyoctyl)cyclopent-1β-yl]-2,4,6-heptatrienoate (10C).

Following the procedure of Example 36 but substituting for the 3α,5α-p-nitrobenzylidene derivative of racemic ethyl 7-[3α,5α-dihydroxy - 2β - (3 - oxooctyl)cyclopent-1β-yl]-2,4,6-heptatrienoate another compound of Formula 10A, for example, the 3α,5α-p-nitrobenzylidene derivative of racemic ethyl trans-[3α,5α - dihydroxy - 2β - (3 - oxooctyl)cyclopent - 1β - yl] acrylate, the 3α,5α-p-nitrobenzylidene derivative of racemic methyl 5 - [3α,5α-dihydroxy-2β-(3-oxooctyl)cyclopent - 1β - yl]-2,4-pentadienoate, the 3α,5α-p-nitrobenzylidene derivative of racemic methyl 3-methyl-5-[3α,5α-dihydroxy - 2β - (3 - oxooctyl)cyclopent-1β-yl]-2,4-pentadienoate and the 3α,5α-p-nitrobenzylidene derivative of racemic ethyl 7-[3α,5α-dihydroxy-2β-(3-oxobutyl)-cyclopent-1β-yl]-2,4,6-heptatrienoate is productive of the corresponding compound of Formula 10C, for example, the 3α,5α-p-nitrobenzylidene derivative of racemic ethyl trans-[3α,5α - dihydroxy - 2β - (3 - hydroxyoctyl)cyclopent-1β-yl] acrylate, the 3α,5α-p-nitrobenzylidene derivative of racemic methyl 5-[3α,5α-dihydroxy-2β-(3-hydroxyoctyl)-cyclopent-1β-yl]-2,4-pentadienoate, the 3α,5α-p-nitrobenzylidene derivative of racemic methyl 3-methyl-5-[3α,5α-dihydroxy - 2β - (3 - hydroxyoctyl)cyclopent - 1β - yl]-2,4-pentadienoate and the 3α,5α-p-nitrobenzylidene derivative of racemic ethyl 7 - [3α,5α-dihydroxy-2β-(3-hydroxybutyl)cyclopent-1β-yl]-2,4,6-heptatrienoate.

Similarly, following the procedure of Example 36 but substituting for the 3α,5α-p-nitrobenzylidene derivative of racemic ethyl 7-[3α,5α-dihydroxy-2β-(3-oxooctyl)cyclopent-1β-yl]-2,4,6-heptatrienoate another compound of Formula 10A, for example, other acetals of racemic ethyl 7 - [3α,5α - dihydroxy - 2β - (3 - oxooctyl)cyclopent - 1β-yl]-2,4,6-heptatrienoate and other acetals of the 3-oxoalkyl compounds named above following Example 36 is productive of the corresponding 3,5-acetals of 3-hydroxyalkyl compounds of Formula 10C.

Following the procedure of Example 36, but substituting other alkyl esters, for example, the methyl esters of Formula 10A as starting materials, is productive of the corresponding alkyl esters of Formula 10C.

EXAMPLE 37

Racemic ethyl 7-[3α,5α-dihydroxy-2β-(3-hydroxyoctyl) cyclopent-1β-yl]-2,4,6-heptatrienoate (10D)

To a stirred solution of 5.00 g. (0.0132 mole) of racemic ethyl 7-[3α,5α-dihydroxy-2β-(3-oxooctyl)cyclopent-1β-yl]-2,4,6-heptatrienoate (10B) in 200 ml. of tetrahydrofuran under a nitrogen atmosphere was added 16.7 g. (0.065 mole) of lithium tri-tert.-butoxy aluminum hydride in portions over a period of 3 to 4 minutes. The solution was then stirred for 3 hours at room temperature, concentrated to about one third volume by evaporation under reduced pressure, carefully acidified with dilute hydrochloric acid with cooling, and extracted 3 times with ethyl acetate. The ethyl acetate extracts were combined, washed with water, dried and evaporated under reduced pressure to give a gum which was dissolved in methylene chloride and chromatographed over Florisil. The 30% acetone in Skellysolve B eluates were evaporated to give 4.17 g. of a colorless viscous gum comprising racemic ethyl 7-[3α,5α-dihydroxy - 2β - (3 - hydroxyoctyl)cyclopent-1β-yl]-2,4,6-heptatrienoate which showed one spot, $R_f$~0.50, on a thin layer chromatographic plate developed with 10% methanol in ethyl acetate and treated with 50% sulfuric acid spray, and an ultraviolet absorption peak $\epsilon$=35,350 at 305 mμ.

Following the procedure of Example 37 but substituting for racemic ethyl 7-[3α,5α-dihydroxy-2β-(3-oxooctyl) cyclopent-1β-yl]-2,4,6-heptatrienoate another compound of Formula 10B, for example, racemic ethyl trans-[3α,5α-dihydroxy-2β-(3-oxooctyl)cyclopent-1β-yl] acrylate, racemic methyl 5-[3α,5α-dihydroxy-2β-(3-oxooctyl)cyclopent-1β-yl]-2,4-pentadienoate, racemic methyl 3-methyl-5-[3α,5α - dihydroxy - 2β - (3 - oxooctyl)cyclopent-1β-yl]-2,4-pentadienoate and ethyl 7-[3α,5α-dihydroxy-2β-(3-oxooctyl)cyclopent-1β-yl]-2,4,6-heptatrienoate is productive of the corresponding compound of Formula 10D, for example, racemic ethyl trans-[3α,5α-dihydroxy-2β-(3-hydroxyoctyl)cyclopent-1β-yl] acrylate, racemic methyl 5-[3α,5α - dihydroxy - 2β - (3 - hydroxyoctyl)cyclopent - 1β-yl]-2,4-pentadienoate, racemic methyl 3-methyl-5-[3α,5α-dihydroxy - 2β - (3 - hydroxyoctyl)cyclopent-1β-yl]-2,4-pentadienoate, and racemic ethyl 7-[3α,5α-dihydroxy-2β-(3-hydroxybutyl)cyclopent - 1β - yl]-2,4,6-heptatrienoate. Similarly, other alkyl esters, for example, the methyl esters, corresponding to the starting materials of Formula 10B named above can be substituted for racemic ethyl 7 - [3α,5α - dihydroxy - 2β - (3 - oxooctyl)cyclopent - 1β-yl]-2,4,6-heptatrienoate in the process of Example 37 to obtain the corresponding alkyl esters of Formula 10D.

EXAMPLE 38

Racemic trans-[3α,5α-dihydroxy-2β-(3-hydroxyoctyl) cyclopent-1β-yl] acrylic acid (10D)

A mixture of 2.20 g. (0.0067 mole) of racemic ethyl trans - [3α,5α - dihydroxy - 2β - (3 - hydroxyoctyl)cyclopent-1β-yl] acrylate and 150 ml. of a 0.5 N solution of potassium hydroxide in 80% methanol-water was heated under reflux under a nitrogen atmosphere for 4 hrs., then the mixture was evaporated under diminished pressure to about ⅓ volume. The residue was diluted with water and washed with methylene chloride, then the aqueous phase was acidified with dilute hydrochloric acid and extracted with ethyl acetate. The ethyl acetate extract was washed with aqueous sodium chloride and evaporated under reduced pressure to give 1.85 g. of a gum which was dissolved in ethyl acetate and chromatographed on 100 g. of acid washed silica gel. Elution with 5% methanol in ethyl acetate and evaporation of the eluate gave 1.23 g. of a gum comprising racemic trans-[3α,5α-dihydroxy-2β-(3-hydroxyoctyl)cyclopent-1β-yl] acrylic acid showing ultraviolet absorption of $\epsilon$=9,400 at 214 mμ.

EXAMPLE 39

Racemic ethyl 7-[3α,5α-dihydroxy-2β-(3-hydroxyoctyl) cyclopent-1β-yl]-2,4,6-heptatrienoate (10D)

A mixture of 0.28 g. of the 3α,5α-p-nitrobenzylidene derivative of racemic ethyl 7-[3α,5α-dihydroxy-2β-(3-hydroxyoctyl)cyclopent-1β-yl]-2,4,6 - heptatrienoate (10C), 25 ml. of acetone, 12 ml. of water and 0.6 ml. of sulfuric acid was refluxed under nitrogen for 3 hours, then was evaporated under diminished pressure to remove most of the acetone. The residue was extracted with methylene chloride, and the methylene chloride extracts were washed with water, dried, and chromatographed over 10 g. of Florisil. Elution with 40% acetone in Skellysolve B and evaporation of the eluates gave 110 mg. of a gummy product comprising racemic ethyl 7-[3α,5α-dihydroxy-2β-(3-hydroxyoctyl)cyclopent - 1β - yl]-2,4,6-heptatrienoate, shown to be identical with the product of Example 37 by thin layer chromatographic analysis and infrared analysis.

Following the procedure of Example 39, but substituting for the 3α,5α-p-nitrobenzylidene derivative of racemic ethyl 7 - [3α,5α-dihydroxy-2β-(3-hydroxyoctyl)cyclopent-1β-yl]-2,4,6-heptatrienoate as starting material, another 3α,5α-p-nitrobenzylidene derivative of Formula 10C, for example, the 3α,5α-p-nitrobenzylidene derivative of racemic ethyl trans-[3α,5α-dihydroxy-2β-(3-hydroxyoctyl)cyclopent-1β-yl] acrylate, the 3α,5α-p-nitrobenzylidene derivative of racemic methyl 5-[3α,5α-dihydroxy-2β-(3-hydroxyoctyl)cyclopent-1β-yl]-2,4-pentadienoate, the 3α,5α-p-nitrobenzylidene derivative of racemic methyl 3-methyl-5 - [3α,5α - dihydroxy - 2β - (3 - hydroxyoctyl)cyclopent-1β-yl]-2,4-pentadienoate and the 3α,5α-p-nitrobenzylidene derivative of racemic ethyl 7-[3α,5α-dihydroxy-2β-(3-hydroxybutyl)cyclopent-1β-yl]-2,4,6-heptatrienoate is productive of the corresponding compound of Formula 10D, for example, racemic ethyl trans-[3α,5α-dihydroxy-2β-(3-hydroxyoctyl)cyclopent-1β-yl] acrylate, racemic methyl 5-[3α,5α - dihydroxy - 2β - (3 - hydroxyoctyl)cyclopent - 1β-yl]-2,4-pentadienoate, racemic methyl 3-methyl-5-[3α,5α-dihydroxy - 2β - (3 - hydroxyoctyl)cyclopent - 1β - yl]-2,4-pentadienoate, and racemic ethyl 7-[3α,5α-dihydroxy-2β-(3-hydroxybutyl)cyclopent-1β-yl]-2,4,6-heptatrienoate.

Following the procedure of Example 39 but substituting for the 3α,5α-p-nitrobenzylidene derivative of racemic ethyl 7 - [3α,5α-dihydroxy-2β-(3-hydroxyoctyl)cyclopent-1β-yl]-2,4,6-heptatrienoate as starting material another compound of Formula 10C, for example, other acetals of racemic ethyl 7-[3α,5α-dihydroxy-2β-(3-hydroxyoctyl)cyclopent-1β-yl]-2,4,6-heptatrienoate and other acetals of the 3-hydroxyalkyl compounds named following Example 39 is productive of the corresponding compounds of Formula 10D.

Following the procedure of Example 39 but substituting other alkyl esters, for example, the methyl esters of Formula 10C as starting material is productive of the corresponding alkyl esters of Formula 10D.

EXAMPLE 40

Racemic 7-[3α,5α-dihydroxy-2β-(3-hydroxyoctyl)cyclopent-1β-yl]-2,4,6-heptatrienoic acid (10D)

A solution of 1.0 g. of racemic ethyl 7-[3α,5α-dihydroxy - 2β-(3-hydroxyoctyl)cyclopent-1β-yl]-2,4,6-heptatrienoate in 100 ml. of 0.5 N potassium hydroxide in 80% methanol-water was heated under reflux in a nitrogen atmosphere for 4 hrs., then was evaporated under reduced pressure to ½ volume, diluted with water, and washed with methylene chloride. The aqueous phase was then acidified with dilute hydrochloric acid and extracted 3 times with ethyl acetate. The ethyl acetate extracts were combined, washed with water, dried, and evaporated under reduced pressure to give 0.90 g. of an amber gum comprising racemic 7-[3α,5α-dihydroxy-2β-(3-hydroxyoctyl)cyclopent-1β-yl]-2,4,6-heptatrienoic acid.

EXAMPLE 41

Racemic ethyl trans-[3α,5α-dihydroxy-2β-(3-hydroxyoctyl)cyclopent-1β-yl] acrylate (10D)

A solution of 5.00 g. (0.0153 mole) of racemic ethyl trans - [3α,5α-dihydroxy-2β-(3-oxooctyl)cyclopent-1β-yl] acrylate (10B) in 200 ml. of tetrahydrofuran under a nitrogen atmosphere was stirred and 18 g. of lithium tri-tert.-butoxy aluminum hydride was added in portions over a period of 5 to 10 minutes. The reaction mixture was then stirred 3 hrs. at room temperature, concentrated by distillation under reduced pressure to about ⅓ volume, cooled, and made acid with dilute aqueous hydrochloric acid, then extracted three times with ethyl acetate. The ethyl acetate extracts were combined, washed with aqueous sodium chloride, dried, and evaporated to give a residue. The thus-obtained residue was dissolved in methylene chloride and chromatographed over 125 g. of Florisil. The column was eluted with Skellysolve B containing increasing proportions of acetone. The 30% acetone-70% Skellysolve B eluates were evaporated to give 4.87 g. of a colorless gum comprising racemic ethyl trans - [3α,5α - dihydroxy-2β-(3-hydroxyoctyl)cyclopent-1β-yl] acrylate having an ultraviolet absorption maximum at 215 mμ.

EXAMPLE 42

Racemic ethyl 7-[3α,5α-dihydroxy-2β-(3-oxooctyl)-cyclopent-1β-yl]-heptanoate (11B)

A mixture of 10.0 g. (0.0264 mole) of racemic ethyl 7 - [3α,5α - dihydroxy-2β-(3-oxooctyl)cyclopent-1β-yl]-2,4,6-heptatrienoate (10B), 1.0 g. of 5% rhodium on alumina and 200 ml. of 95% ethanol was hydrogenated on the Parr apparatus at room temperature. After 2.5 hours 91% of the theoretical 3 moles of hydrogen had been absorbed and hydrogen uptake had ceased. The catalyst was removed by filtration and the filtrate was evaporated to give a syrup which was dissolved in 50% ethyl acetate/cyclohexane and chromatographed over 500 g. of silica gel. Elution with ethyl acetate and evaporation of the eluate gave a colorless oil comprising racemic ethyl 7 - [3α,5α-dihydroxy-2β-(3-oxooctyl)cyclopent-1β-yl]-heptanoate showing a single spot, $R_f\sim 0.23$ when chromatographed on a silica gel thin-layer chromatography plate using 2 parts of ethyl acetate to 1 part of cyclohexane for development. Sulfuric acid charring gave an initial orange color of the spot. Nuclear magnetic resonance analysis supported the structure.

Following the procedure of Example 42 but substituting for racemic ethyl 7-[3α,5α-dihydroxy-2β-(3-oxooctyl)cyclopent - 1β-yl]-2,4,6-heptatrienoate as starting material the following compounds of Formula 10B:

(1) Racemic ethyl trans-[3α,5α-dihydroxy-2β-(3-oxooctyl)-cyclopent-1β-yl] acrylate, (2) Racemic methyl 5-[3α,5α-dihydroxy-2β-(3-oxooctyl)cyclopent-1β-yl]-2,4-pentadienoate, (3) Racemic methyl 3-methyl-5-[3α,5α-dihydroxy-2β-(3-oxooctyl)cyclopent-1β-yl]-2,4-pentadienoate and (4) Racemic ethyl 7-[3α,5α - dihydroxy - 2β-(3-oxobutyl)cyclopent-1β-yl]-2,4,6-heptatrienoate is productive of:

(1) racemic ethyl 3-[3α,5α-dihydroxy-2β-(3-oxooctyl) cyclopent-1β-yl] propionate, (2) racemic methyl 5-[3α,5α-dihydroxy-2β-(3-oxooctyl) cyclopent-1β-yl] pentanoate, (3) racemic methyl 3-methyl-5-[3α,5α-dihydroxy-2β-(3-oxooctyl)cyclopent-1β-yl] pentanoate and (4) racemic ethyl 7-[3α,5α-dihydroxy-2β-(3-oxobutyl) cyclopent-1β-yl] heptanoate.

Substituting other alkyl esters of Formula 10B as starting materials in the process of Example 42 in place of the methyl and ethyl esters of Formula 10B named following Example 42 is productive of the corresponding alkyl esters of Formula 11B.

EXAMPLE 43

Racemic ethyl 7-[3α,5α-dihydroxy-2β-(3-hydroxyoctyl)cyclopent-1β-yl] heptanoate (14A)

A mixture of 0.52 g. of racemic ethyl 7-[3α,5α-dihydroxy - 2β-(3-hydroxyoctyl)cyclopent-1β-yl]-2,4,6-heptatrienoate (10D), 100 mg. of 5% rhodium on alumina, and 25 ml. of 95% ethanol was hydrogenated at room temperature. After 4 hours 96% of the theoretical 3 moles of hydrogen had been absorbed and hydrogen uptake had ceased. The mixture was filtered to remove the catalyst and the filtrate was evaporated under reduced pressure to give an amber colored gum. This was dissolved in methylene chloride and chromatographed over 25 g. of Florisil. Elution with 20 to 50% acetone in methylene chloride and evaporation of the eluate gave 357 mg. of a colorless syrup comprising racemic ethyl 7-[3α,5α - dihydroxy-2β-(3-hydroxyoctyl)cyclopent-1β-yl] heptanoate having no U.V. absorption and producing a single yellow-tan spot on a silica gel thin layer chromatographic plate developed with 5% methanol in ethyl acetate and sprayed with sulfuric acid. The spot turned red on standing.

Following the procedure of Example 43 but substituting for racemic ethyl 7-[3α,5α-dihydroxy-2β-(3-hydroxyoctyl)cyclopent - 1β-yl]-2,4,6-heptatrienoate as starting material, the following compounds of Formula 10D:

(1) Racemic ethyl trans-[3α,5α-dihydroxy-2β-(3-hydroxyoctyl)cyclopent-1β-yl] acrylate, (2) Racemic methyl 5 - [3α,5α - dihydroxy-2β-(3-hydroxyoctyl)cyclopent-1β-yl]-2,4-pentadienoate, (3) Racemic methyl 3-methyl-[3α,5α-dihydroxy-2β-(3-hydroxyoctyl)cyclopent-1β-yl]-2,4-pentadienoate and (4) Racemic ethyl 7-[3α,5α-dihydroxy-2β-(3-hydroxybutyl)cyclopent-1β-yl]-2,4,6-heptatrienoate is productive of:

(1) racemic ethyl 3-[3α,5α-dihydroxy-2β-(3-hydroxyoctyl)cyclopent-1β-yl] propionate, (2) racemic methyl 5-[3α,5α-dihydroxy-2β-(3-hydroxyoctyl)cyclopent-1β-yl] pentanoate, (3) racemic methyl 3-methyl-5-[3α,5α-dihydroxy-2β-(3-hydroxyoctyl)cyclopent-1β-yl] pentanoate and (4) racemic ethyl 7-[3α,5α-dihydroxy-2β-(3-hydroxybutyl)cyclopent-1β-yl] heptanoate.

Substituting other alkyl esters of Formula 10D as starting material in the process of Example 43 in place of racemic ethyl 7-[3α,5α-dihydroxy-2β-(3-hydroxyoctyl)cyclopent-1β-yl]-2,4,6-heptatrienoate is productive of the corresponding alkyl esters of Formula 14A.

EXAMPLE 44

Racemic 7-[3α,5α-dihydroxy-2β-(3-hydroxyoctyl)cyclopent-1β-yl] heptanoic acid (14A)

A mixture of 0.23 g. of racemic ethyl 7-[3α,5α-dihydroxy-2β-(3-hydroxyoctyl)cyclopent-1β-yl] heptanoate and 25 ml. of 0.5 N potassium hydroxide in 80% methanol-water was heated under reflux in a nitrogen atmosphere for 2.5 hours, then was concentrated to ½ volume by evaporation under reduced pressure and washed with methylene chloride. The aqueous phase was acidified with dilute hydrochloric acid and extracted with ethyl acetate. The ethyl acetate extracts were washed with water, dried, and evaporated under reduced pressure to give an amber colored gum which was dissolved in 50% benzene-ethyl acetate and chromatographed on 20 g. of acid washed silica gel. Elution with ethyl acetate containing 5% methanol and evaporation of the eluate gave a nearly colorless gum comprising racemic 7-[3α,5α-dihydroxy-2β-(3-hydroxyoctyl)cyclopent-1β-yl] heptanoic acid which gave a single spot on a silica gel thin layer chromatographic plate developed with benzene-dioxane-acetic acid (20:20:1).

EXAMPLE 45

Racemic 7-[3α,5α-dihydroxy-2β-(3-hydroxyoctyl)cyclopent-1β-yl] heptanoic acid (14A)

A solution of 0.90 g. of racemic 7-[3α,5α-dihydroxy-2β-(3-hydroxyoctyl)cyclopent-1β-yl]-2,4,6-heptatrienoic acid (10D) in 50 ml. of ethanol was hydrogenated in the presence of 250 mg. of 5% rhodium on alumina catalyst. After 1.25 hours 94% of the theoretical 3 moles of hydrogen had been absorbed and hydrogen uptake had ceased. The mixture was filtered to remove the catalyst and the filtrate was evaporated under reduced pressure to give a brown gum which was dissolved in 50% benzene-ethyl acetate and chromatographed over 50 g. of acid washed silica gel. Elution with ethyl acetate containing 5% methanol and evaporation of the eluates gave 0.71 g. of racemic 7-[3α,5α-dihydroxy-2β-(3-hydroxyoctyl)cyclopent-1β-yl] heptanoic acid having an NMR spectrum identical with that of the product of Example 44.

EXAMPLE 46

Racemic ethyl 7-[3α,5α-dihydroxy-2β-(3-hydroxyoctyl)cyclopent-1β-yl] heptanoate (14A)

A mixture of 1.0 g. of the 3α,5α-p-nitrobenzylidene derivative of racemic ethyl 7-[3α5α-dihydroxy-2β-(3-oxooctyl)cyclopent-1β-yl]-2,4,6-heptatrienoate (10A) in 50 ml. of ethanol and 250 mg. of pre-reduced 30% palladium on carbon catalyst is hydrogenated at room temperature until the uptake of hydrogen ceases. The mixture is filtered to remove the catalyst and the filtrate is evaporated under reduced pressure leaving a residue. The residue is dissolved in ether, washed with dilute hydrochloric acid then with aqueous saturated sodium bicarbonate, and again with water, and the solvent is removed under reduced pressure to give an oily residue comprising racemic ethyl 7-[3α,5α-dihydroxy-2β-(3-hydroxyoctyl) cyclopent-1β-yl] heptanoate.

Following the procedure of Example 46 but replacing the 250 mg. of pre-reduced palladium on carbon catalyst with rhodium on alumina, Raney nickel, platinum, or cobalt hydrocarbonyl is also productive of racemic ethyl 7 - [3α,5α - dihydroxy - 2β - (3 - hydroxyoctyl)cyclopent-1β-yl] heptanoate. If the acetal is not removed by the hydrochloric acid wash, then hydrolysis with hydrochloric acid or sulfuric acid in aqueous acetone as described above in Examples 34, 35 and 39 results in the formation of the free hydroxy compounds.

EXAMPLE 47

Racemic ethyl 7-[3α,5α-dihydroxy-2β-(3-hydroxyoctyl)cyclopent-1β-yl] heptanoate (14A)

To a solution of 1.0 g. of racemic ethyl 7-[3α,5α-dihydroxy-2β - (3 - oxooctyl)cyclopent - 1β - yl] heptanoate (11B) in 40 ml. of tetrahydrofuran under a nitrogen atmosphere is added 3.5 g. of lithium tri-tert.-butoxy aluminum hydride in portions over a period of 3–4 minutes. The solution is stirred for 3 hrs. at room temperature, concentrated to about one third volume by evaporation under reduced pressure, carefully acidified with dilute hydrochloric acid, and extracted with ethyl acetate. The ethyl acetate extract is washed with water, dried and evaporated under reduced pressure to give a gum comprising racemic ethyl 7-[3α,5α-dihydroxy-2β-(3-hydroxyoctyl)cyclopent-1β-yl] heptanoate which can be further purified by chromatographing over silica gel, eluting with ethyl acetate to obtain the desired product.

Following the procedure of Example 47 but substituting for racemic ethyl 7-[3α,5α-dihydroxy-2β-(3-oxooctyl cyclopent-1β-yl] heptanoate as starting material the following compounds of Formula 11B:

(1) Racemic ethyl 3-[3α,5α-dihydroxy-2β-(3-oxooctyl) cyclopent-1β-yl] propionate, (2) Racemic methyl 5-[3α,5α-dihydroxyl-2β-(3 - oxooctyl)cyclopent-1β-yl] pentanoate, (3) Racemic methyl 3-methyl-5-[3α,5α-dihydroxy-2β-(3-oxooctyl)cyclopent-1β-yl] pentanoate and (4) Racemic ethyl 7-[3α,5α-dihydroxy-2β-(3-oxobutyl cyclopent-1β-yl] heptanoate is productive of:

(1) racemic ethyl 3-[3α,5α-dihydroxy-2β - (3 - hydroxyoctyl)cyclopent-1β-yl] propionate, (2) racemic methyl 5-[3α,5α-dihydroxy-2β-(3-hydroxyoctyl)-cyclopent-1β-yl] pentanoate, (3) racemic methyl 3-methyl-5-[3α,5α-dihydroxy-2β-(3-hydroxyoctyl)cyclopent-1β-yl] pentanoate and (4) racemic ethyl 7-[3α,5α-dihydroxy-2β-(3 - hydroxy butyl)cyclopent-1β-yl] heptanoate.

EXAMPLE 48

Racemic ethyl 7-[3α,5α-dihydroxy-2β-(3-hydroxyoctyl)-cyclopent-1β-yl] heptanoate (14A)

A mixture of 1.0 g. of racemic ethyl 7-[3α,5α-dihydroxy - 2β - (3 - oxooctyl)cyclopent - 1β - yl] - 2,4,6-heptatrienoate (10B) in 50 ml. of ethanol and 250 mg. of pre-reduced 30% palladium-on-carbon catalyst is hydrogenated at room temperature until the uptake of hydrogen ceases, then the catalyst is separated by filtration and the filtrate is evaporated under reduced pressure leaving a residue comprising racemic ethyl 7-[3α,5α-dihydroxy-2β-(3-hydroxy-octyl)cyclopent-1β-yl] heptanoate.

Following the procedure of Example 48 but replacing the 250 mg. of pre-reduced palladium on carbon catalyst with rhodium on alumina, Raney nickel, platinum or cobalt hydrocarbonyl is also productive of racemic ethyl 7 - [3α,5α - dihydroxy - 2β - (3 - hydroxyoctyl)cyclopent-1β-yl] heptanoate. If the acetal is not removed by the hydrochloric acid wash, then hydrolysis with hydrochloric acid or sulfuric acid in aqueous acetone as described above in Examples 34, 35 and 39 results in the formation of the free hydroxy compound.

EXAMPLE 49

Racemic ethyl 7-[3α,5α-dihydroxy-2β-(3-hydroxyoctyl)-cyclopent-1β-yl] heptanoate (14A)

A mixture of 1.0 g. of the 3α,5α-p-nitrobenzylidene derivative of racemic ethyl 7-[3α,5α-dihydroxy-2β-(3-hydroxyoctyl)-cyclopent-1β-yl]-2,4,6-heptatrienoate (10C) in 50 ml. of ethanol and 250 mg. of pre-reduced 30% palladium on carbon catalyst is hydrogenated at room temperature until the uptake of hydrogen ceases. The mixture is filtered to remove the catalyst and the filtrate is evaporated under reduced pressure leaving a residue. The residue is dissolved in ether, washed with dilute hydrochloric acid then with aqueous saturated sodium bicarbonate and again with water, and the solvent is removed under reduced pressure to give an oily residue comprising racemic ethyl 7-[3α,5α-dihydroxy-2β-(3-hydroxyoctyl)cyclopent-1β-yl] heptanoate.

The 3,5-acetal, if not removed by the hydrochloric acid wash, is removed by hydrolysis with hydrochloric acid or sulfuric acid in aqueous acetone as described in Examples 34, 35 and 39.

Following the procedure of Example 49 but substituting for the 3α,5α-p-nitrobenzylidene derivative of racemic ethyl 7-[3α,5α-dihydroxy - 2β - (3 - hydroxyoctyl)cyclopent-1β-yl] - 2,4,6-heptatrienoate other compounds of Formula 10C, for example:

(1) The 3α,5α-p-nitrobenzylidene derivative of racemic ethyl trans-[3α,5α - dihydroxy - 2β - (3 - hydroxyoctyl)cyclopent-1β-yl] acrylate, (2) The 3α,5α-p-nitrobenzylidene derivative of racemic methyl 5 - [3α,5α - dihydroxy-2β-(3-hydroxyoctyl)cyclopent-1β-yl]-2,4-pentadienoate, (4) The 3α,5α-p-nitrobenzylidene derivative of racemic ethyl 7-[3α,5α - dihydroxy - 2β - (3 - hydroxybutyl)cyclooctyl)cyclopent-1β-yl]-2,4-pentadienoate and (4) The 3α,5α-p-nitrobenzylidene derixative of racemic ethyl 7-[3α,5α - dihydrovy - 2β - (3 - hydroxybutyl)cyclopent-1β-yl]-2,4,6-heptatrienoate is productive of:

(1) racemic ethyl 3-[3α,5α - dihydroxy-2β-(3-hydroxyoctyl)-cyclopent-1β-yl] propionate, (2) racemic methyl 5-[3α,5α-dihydroxy - 2β - (3-hydroxyoctyl)cyclopent-1β-yl] pentanoate, (3) racemic methyl 3-methyl-5-[3α,5α-dihydroxy-2β-(3-hydroxyoctyl)cyclopent-1β-yl] pentanoate and (4) racemic ethyl 7-[3α,5α-dihydroxy-2β-(3-hydroxybutyl)-cyclopent-1β-yl] heptanoate.

EXAMPLE 50

Racemic ethyl 7-[3α,5α - dihydroxy-2β-(3-hydroxyoctyl)-cyclopent - 1α - yl] heptanoate (racemic dihydroprostaglandin F$_{α1}$) (15)

A mixture of 1.0 g. of the 3α,5α-p-nitrobenzylidene derivative of racemic ethyl 7-[3α,5α-dihydroxy-2β-(3-oxo-octyl)-cyclopent-1β-yl]-2,4,6 - heptatrienoate (10A) in 50 ml. of ethanol and 250 mg. of pre-reduced 30% palladium on carbon catalyst is heated at reflux for 2 hrs. under an atmosphere of nitrogen. The mixture is then hydrogenated at room temperature until hydrogen uptake ceases, the catalyst is removed by filtration, and the filtrate is evaporated under reduced pressure leaving a residue. The residue is dissolved in ether, washed with dilute hydrochloric acid, then with aqueous saturated sodium bicarbonate, and water, then the ether is removed by evaporation under reduced pressure to give an oily residue comprising racemic ethyl 7-[3α,5α-dihydroxy-2β-(3-hydroxyoctyl)cyclopent-1α-yl]-heptanoate which is further purified by chromatography over silica gel.

Following the procedure of Example 50 but substituting as catalyst Raney nickel, platinum or cobalt hydrocarbonyl for palladium on carbon is likewise productive of racemic ethyl 7-[3α,5α - dihydroxy-2β-(3-hydroxyoctyl) cyclopent-1α-yl] heptanoate.

The 3,5-acetal, if not removed by the hydrochloric acid wash, is removed by hydrolysis with hydrochloric acid or sulfuric acid in aqueous acetone as described in Examples 34, 35 and 39.

EXAMPLE 51

Racemic ethyl 7-[3α,5α-dihydroxy-2β-(3-hydroxyoctyl)-cyclopent-1α-yl] heptanoate (15)

A mixture of 1.0 g. of racemic ethyl 7-[3α,5α-dihydroxy-2β-(3-oxooctyl)cyclopent - 1β - yl]-2,4,6-heptatrienoate (10B) in 50 ml. of ethanol and 250 mg. of pre-reduced 30% palladium on carbon catalyst is heated at reflux for 2 hrs. under an atmosphere of nitrogen. The mixture is then hydrogenated at room temperature until hydrogen uptake ceases, the catalyst is removed by filtration and the solvent is removed by evaporation under reduced pressure leaving a residue. The residue is dissolved in ether, washed with dilute hydrochloric acid, then with aqueous saturated sodium bicarbonate, and water, then the ether is removed by evaporation under reduced pressure to give an oily residue comprising racemic ethyl 7-[3α,5α-dihydroxy - 2β - (3 - hydroxyoctyl)cyclopent-1α-yl] heptanoate which is further purified by chromatography over silica gel.

Following the procedure of Example 51, but substituting as catalyst Raney nickel, platinum, or cobalt hydrocarbonyl for palladium on carbon is likewise productive of racemic ethyl 7-[3α,5α-dihydroxy-2β-(3-hydroxyoctyl) cyclopent-1α-yl] heptanoate.

EXAMPLE 52

Racemic ethyl 7-[3α,5α-dihydroxy-2β-(3-hydroxyoctyl)-cyclopent-1α-yl] heptanoate (15)

A mixture of 1.0 g. of the 3α,5α-p-nitrobenzylidene derivative of racemic ethyl 7-[3α,5α-dihydroxy-2β-(3-hydroxyoctyl)-cyclopent-1β-yl]-2,4,6 - heptatrienoate (10C) in 50 ml. of ethanol and 250 mg. of pre-reduced 30% palladium on carbon catalyst is heated at reflux for 2 hrs. under a nitrogen atmosphere. The mixture is then hydrogenated at room temperature until hydrogen uptake ceases, the catalyst is removed by filtration and the solvent is removed by evaporation under reduced pressure leaving a residue. The residue is dissolved in ether, washed with dilute hydrochloric acid, then with aqueous saturated sodium bicarbonate, and water, then ether is removed by evaporation under reduced pressure to give an oily residue comprising racemic ethyl 7-[3α,5α-dihydroxy-2β-(3-hydroxyoctyl)-cyclopent-1α-yl] heptanoate which is further purified by chromatography over silica gel.

Following the procedure of Example 52, but substituting as catalyst Raney nickel, platinum, or cobalt hydrocarbonyl for palladium on carbon is likewise productive of racemic 7-[3α,5α-dihydroxy-2β-(3-hydroxyoctyl)cyclopent-1α-yl] heptanoate.

The 3,5-acetal, if not removed by the hydrochloric acid wash, is removed by hydrolysis with hydrochloric acid or sulfuric acid in aqueous acetone as described in Examples 34, 35 and 39.

Following the procedure of Example 52, but substituting for the 3α,5α-p-nitrobenzylidene derivative of racemic ethyl 7-[3α,5α-dihydroxy-2β-(3-hydroxyoctyl)cyclopent-1β-yl]-2,4,6-heptatrienoate as starting material other compounds of Formula 10C, for example:

(1) The 3α,5α-p-nitrobenzylidene derivative of racemic ethyl trans - [3α,5α-dihydroxy-2β-(3-hydroxyoctyl)cyclopent-1β-yl] acrylate, (2) The 3α,5α-p-nitrobenzylidene derivative of racemic methyl 5 - [3α,5α - dihydroxy-2β-(3-hydroxyoctyl)cyclopent-1β-yl]-2,4-pentadienoate, (3) The 3α,5α-p-nitrobenzylidene derivative of racemic methyl 3-methyl-5-[3α,5α-dihydroxy - 2β - (3-hydroxyoctyl)cyclopent-1β-yl]-2,4-pentadienoate and (4) The 3α,5α-p-nitrobenzylidene derivative of racemic ethyl 7 - [3α,5α-dihydroxy-2β-(3-hydroxybutyl)cyclopent-1β-yl]-2,4,6-heptatrienoate is productive of:

(1) racemic ethyl 3 - [3α,5α - dihydroxy-2β-(2-hydroxy octyl)-cyclopent-1α-yl] propionate, (2) racemic methyl 5 - [3α,5α-dihydroxy-2β-(3-hydroxyoctyl)cyclopent-1α-yl] pentanoate, (3) racemic methyl 3-methyl-5-[3α,5α-dihydroxy-2β-(3-hydroxyoctyl)cyclopent-1α-yl] pentanoate and (4) racemic ethyl 7 - [3α,5α - dihydroxy-2β-(3-hydroxybutyl)cyclopent-1α-yl] heptanoate.

EXAMPLE 53

Racemic ethyl 7-[3α,5α-dihydroxy-2β-(3-hydroxyoctyl) cyclopent-1α-yl] heptanoate (15)

A mixture of 1.0 g. of racemic ethyl 7-[3α,5α-dihydroxy-2β-(2-hydroxyoctyl) cyclopent-1β-yl]-2,4,6 - heptatrienoate in 50 ml. of ethanol and 250 mg. of pre-reduced 30% palladium on carbon catalyst is heated at reflux for 2 hrs. under a nitrogen atmosphere. The mixture is then hydrogenated at room temperature until hydrogen uptake ceases, then the catalyst is removed by filtration and the filtrate is evaporated under reduced pressure leaving a residue comprising racemic ethyl 7-[3α,5α-dihydroxy-2β(3-hydroxyoctyl)cyclopent-1α-yl] heptanoate.

Following the procedure of Example 53, but substituting as catalyst Raney nickel, platinum, or cobalt hydrocarbonyl for palladium on carbon is likewise productive of racemic ethyl 7 - [3α,5α - dihydroxy-2β-(3-hydroxyoctyl)cyclopent-1α-yl] heptanoate.

Following the procedure of Example 53 but substituting for racemic ethyl 7-[3α,5α-dihydroxy-2β-(hydroxyoctyl)cyclopent-1β-yl]-2,4,6-heptatrienoate as starting material other compounds of Formula 10D, for example:

(1) Racemic ethyl trans-[3α,5α - dihydroxy-2β-(3-hydroxyoctyl)cyclopent-1β-yl] acrylate, (2) Racemic methyl 5 - [3α,5α-dihydroxy-2β-(3 - hydroxyoctyl)-cyclopent-1β-yl]-2,4-pentadienoate, (3) Racemic methyl 3-methyl-5-[3α,5α-dihydroxy-2β-(3-hydroxyoctyl)cyclopent-1β-yl]-2,4-pentadienoate and (4) Racemic ethyl 7-[3α,5α-dihydroxy-2β-(3-hydroxybutyl)cyclopent-1β-yl]-2,4,6-heptatrienoate is productive of:

(1) racemic ethyl 3-[3α,5α-dihydroxy-2β-(3-hydroxyoctyl)cyclopent-1α-yl] propionate, (2) racemic methyl 5-[3α,5α-dihydroxy-2β-(3-hydroxyoctyl)cyclopent-1α-yl] pentanoate, (3) racemic methyl 3-methyl-5-[3α,5α-dihydroxy-2β-(3-hydroxyoctyl)cyclopent-1α-yl] pentanoate and (4) racemic ethyl 7-[3α,5α-dihydroxy-2β-(3-hydroxybutyl)cyclopent-1α-yl] heptanoate.

EXAMPLE 54

3α,5α-p-nitrobenzylidene derivative of racemic ethyl 8-[3α,5α-dihydroxy-2β-(3-oxooctyl)cyclopent - 1β - yl]-2,4,6-octatrienoate (12A)

A mixture of 12.1 g. of ethyl ω-bromosorbate, 15.0 g. of triphenylphosphine and 50 ml. of chloroform is stirred at 0° C. until a clear solution forms. The solution is allowed to stand 5 hrs. at room temperature, then 66 ml. of ice-cold aqueous 5% sodium hydroxide is added and the mixture is shaken for 10 minutes. The organic layer is then separated, washed with water, dried and evaporated under reduced pressure to give a dark orange residue comprising ethyl sorbyl phosphorane. The thus-obtained ethyl sorbyl phosphorane is dissolved in about 25 ml. of chloroform, cooled to 0° C., and added under a nitrogen atmosphere to a solution of 10.0 g. of the 3α,5α-p-nitrobenzylidene derivative of racemic 3α,5α-dihydroxy-2β - (3-oxooctyl)-1β-cyclopentaneacetaldehyde (9B, Example 26) in about 25 ml. of chloroform cooled in an ice bath. The mixture is allowed to stand about 18 hrs. at 5° C., then is allowed to warm to room temperature and poured onto a column of 1000 g. of Florisil. The column is eluted with Skellysolve B containing increasing proportions of acetone and the eluates evaporated to give a residue comprising the 3α,5α-p-nitrobenzylidene derivative of racemic ethyl 8-[3α,5α-dihydroxy-2β-(3-oxooctyl) cyclopent-1β-yl]-2,4,6-octatrienoate.

EXAMPLE 55

3α,5α-p-nitrobenzylidene derivative of racemic ethyl 4-[3α,5α-dihydroxy-2β-(3-oxooctyl)cyclopent - 1β - yl]-2-butenoate (12A)

A solution of 0.47 g. of the 3α,5α-p-nitrobenzylidene derivative of racemic 3α,5α-dihydroxy - 2β - (3-oxooctyl)-1β-cyclopentaneacetaldehyde (prepared as in Example 26) in 25 ml. of methylene chloride is cooled in an ice bath and 0.80 g. of carbethoxymethylenetriphenylphosphorane is added. The mixture is then allowed to stand for about 3 days at room temperature and the solvent is removed by evaporation under reduced pressure. The thus-obtained residue is dissolved in 50 ml. of a mixture of 20% ethyl acetate and 80% cyclohexane and filtered through 20 g. of silica gel. The silica gel is washed with an additional 200 ml. of 20% ethyl acetate in cyclohexane and the filtrate and washings are combined and evaporated under reduced pressure to give a residue comprising the 3α,5α-p-nitrobenzylidene derivative of racemic ethyl 4-[3α,5α-dihydroxy - 2β - (3-oxooctyl)cyclopent-1β-yl]-2-butenoate.

EXAMPLE 56

3α,5α-p-nitrobenzylidene derivative of racemic methyl 6-[3α,5α - dihydroxy-2β-(3-oxooctyl)cyclopent - 1β - yl]-2,4,-hexadienoate (12A)

A mixture of 5.74 g. of methyl bromocrotonate, 8.83 g. of triphenylphosphine and 25 ml. of chloroform is stirred at 0° C. until a clear solution forms. The solution is allowed to stand 5 hrs. at room temperature, then 39 ml. of ice cold aqueous 5% sodium hydroxide is added and the mixture is shaken for 10 minutes. The organic layer is then separated, washed with water, dried and evaporated under reduced pressure to give a dark orange residue. This residue is dissolved in 15 ml. of chloroform and cooled to 0° C., then is mixed, under a nitrogen atmosphere, with 5.0 g. of the 3α,5α-p-nitrobenzylidene derivative of racemic 3α,5α-dihydroxy-2β-(3-oxooctyl)-1β-cyclopentaneacetaldehyde in 15 ml. of chloroform while cooling in an ice both. The resulting mixture is allowed to stand about 20 hrs. at 5° C., then is allowed to warm to room temperature and poured over a chromatographic column of 500 g. of Florisil. The column is eluted with Skellysolve B containing increasing amounts of acetone and the eluates are evaporated to give a residue comprising the 3α,5α-p-nitrobenzylidene derivative of racemic methyl 6-[3α,5α-dihydroxy - 2β - (3-oxooctyl)cyclopent-1β-yl]-2,4-hexadienoate.

EXAMPLE 57

3α,5α-p-nitrobenzylidene derivative of racemic methyl 3-methyl-6-[3α,5α-dihydroxy-2β-(3-oxooctyl)-cyclopent--β-yl]-2,4-hexadienoate (12A)

Following the procedure of Example 56, but substituting methyl 3-methyl-4-bromo-2-butenoate for methyl bromocrotonate as starting material is productive of the 3α,5α-p-nitrobenzylidene derivative of racemic methyl 3-methyl-6-[3α,5α-dihydroxy-2β-(3-oxooctyl)cyclopent-1β-yl]-2,4-hexadienoate.

EXAMPLE 58

Racemic ethyl 8-[3α,5α-dihydroxy-2β-(3-oxooctyl) cyclopent-1β-yl]-2,4,6-octatrienoate (12B)

A mixture of 300 mg. of the 3α,5α-p-nitrobenzylidene derivative of ethyl 8-[3α,5α-dihydroxy-2β-(3-oxooctyl) cyclopent-1β-yl]-2,4,6-octatrienoate, 15 ml. of acetone, 5 ml. of water, and 0.3 ml. of concentrated sulfuric acid is heated under reflux in a nitrogen atmosphere for 3 hrs. then the mixture is evaporated under reduced pressure until most of the acetone is removed, and is extracted with methylene chloride. The methylene chloride extract is washed with aqueous sodium bicarbonate, dried, and evaporated under reduced pressure leaving a residue. The thus obtained residue is dissolved in a mixture of 50% ethyl acetate and 50% cyclohexane and chromatographed over silica gel. The column is eluted first with 50% ethyl acetate in cyclohexane, then with ethyl acetate. The ethyl acetate eluates are evaporated to give a residue comprising racemic ethyl 8-[3α,5α-dihydroxy-2β-(3-oxooctyl) cyclopent-1β-yl]2,4,6-octatrienoate.

Following the procedure of Example 58, but substituting for the 3α,5α-p-nitrobenzylidene derivative of racemic ethyl 8-[3α,5α-dihydroxy-2β-(3-oxooctyl)-cyclopent-1β-yl]-2,4,6-octatrienoate as starting material other compounds of Formula 12A, for example:

(1) The 3α,5α-p-nitrobenzylidene derivative of racemic ethyl 4-[3α,5α-dihydroxy-2β-(3-oxooctyl)cyclopent-1β-yl]-2-butenoate, (2) The 3α,5α-p-nitrobenzylidene derivative of racemic methyl 6-[3α,5α-dihydroxy - 2β - (3-oxooctyl)cyclopent-1β-yl]-2,4-hexadienoate and (3) The 3α,5α-p-nitrobenzylidene derivatives of racemic methyl 3-methyl-6-[3α,5α-dihydroxy - 2β - (3-oxooctyl) cyclopent-1β-yl]-2,4-hexadienoate is productive of:

(1) racemic ethyl 4-[3α-5α-dihydroxy-2β-(3-oxooctyl) cyclopent-1β-yl]-2-butenoate,
(2) racemic methyl 6-[3α,5α-dihydroxy-2β-(3-oxooctyl) cyclopent-1β-yl]-2,4-hexadienoate and
(3) racemic methyl 3-methyl-6-[3α,5α-dihydroxy-2β-(3-oxooctyl)cyclopent-1β-yl]-2,4-hexadienoate.

EXAMPLE 59

3α,5α-p-nitrobenzylidene derivative of racemic ethyl 8-[3α,5α-dihydroxy - 2β - (3-hydroxyoctyl)cyclopent-1β-yl]-2,4,6-octatrienoate (12C)

To a solution of 1.0 g. of the 3α,5α-p-nitrobenzylidene derivative of racemic ethyl 8-[3α,5α-dihydroxy-2β-(3-oxooctyl)cyclopent-1β-yl]-2,4,6-octatrienoate (12A) in 10 ml. of tetrahydrofuran in a nitrogen atmosphere is added 1.2 g. of lithium tri-tert.-butoxy aluminum hydride. The mixture is allowed to stand 3 hrs. at room temperature, then is concentrated under reduced pressure, carefully acidified with dilute hydrochloric acid and extracted with methylene chloride. The methylene chloride extract is chromatographed over 50 g. of Florisil and eluted with Skellysolve B containing increasing proportions of acetone. The eluates are evaporated to give a residue comprising the 3α,5α-p-nitrobenzylidene derivative of racemic ethyl 8-[3α,5α-dihydroxy-2β-(3-hydroxyoctyl)cyclopent-1β-yl]-2,4,6-octatrienoate.

Following the procedure of Example 59 but substituting for the 3α,5α-p-nitrobenzylidene derivative of racemic ethyl 8-[3α,5α-dihydroxy-2β-3-oxooctyl)cyclopent-1β-yl]-2,4,6-octatrienoate as starting material other compounds of Formula 12A, for example:

(1) The 3α,5α-p-nitrobenzylidene derivative of racemic ethyl 4-[3α,5α-dihydroxy-2β-(3-oxooctyl)cyclopent-1β-yl]-2-butenoate, (2) The 3α,5α-p-nitrobenzylidene derivative of racemic methyl 6-[3α,5α-dihydroxy - 2β - (3-oxooctyl)cyclopent-1β-yl]-2,4-hexadienoate and (3) The 3α,5α-p-nitrobenzylidene derivative of racemic methyl 3-methyl-6-[3α,5α-dihydroxy-2β-(3-oxooctyl) cyclopent-1β-yl]-2,4-hexadienoate, is productive of:

(1) the 3α,5α-p-nitrobenzylidene derivative of racemic ethyl 4-[3α,5α - dihydroxy-2β-(3-hydroxyoctyl)cyclopent-1β-yl]-2-butenoate, (2) the 3α,5α-p-nitrobenzylidene derivative of racemic methyl 6-[3α,5α-dihydroxy-2β-(3-hydroxyoctyl)cyclopent-1β-yl]-2,4-hexadienoate and (3) the 3α,5α-p-nitrobenzylidene derivative of racemic methyl 3-methyl-6-[3α,5α-dihydroxy - 2β - (3-hydroxyoctyl)cyclopent-1β-yl]-2,4-hexadienoate.

EXAMPLE 60

Racemic ethyl 8-[3α,5α-dihydroxy-2β-(3-hydroxyoctyl) cyclopent-1β-yl]-2,4,6-octatrienoate (12D)

To a stirred solution of 5.00 g. of racemic ethyl 8-[3α,5α - dihydroxy-2β-(3-oxooctyl)cyclopent-1β-yl]-2,4, 6-octatrienoate (12B) in 200 ml. of tetrahydrofuran under a nitrogen atmosphere is added 16.5 g. of lithium tri-tert.-butoxy aluminum hydride in portions over a period of 3 to 4 minutes. The solution is then stirred for 3 hours at room temperature, concentrated to about one-third volume by evaporation under reduced pressure, carefully acidified with dilute hydrochloric acid while cooling, and extracted with ethyl acetate. The ethyl acetate extract is washed with water, dried, and evaporated under diminished pressure to give a colorless residue comprising racemic ethyl 8-[3α,5α-dihydroxy-2β-(3-hydroxyoctyl)cyclopent-1β-yl]-2,4,6-octatrienoate.

Following the procedure of Example 60 but substituting for racemic ethyl 8-[3α,5α-dihydroxy-2β-(3-oxooctyl)-cyclopent-1β-yl]-2,4,6-octatrienoate as starting material other compounds of Formula 12B, for example:

(1) Racemic ethyl 4-[3α,5α-dihydroxy - 2β - (3-oxooctyl)cyclopent-1β-yl]-2-butenoate, (2) Racemic methyl 6-[3α,5α-dihydroxy - 2β - (3-oxooctyl)cyclopent-1β-yl]-2,4-hexadienoate and (3) Racemic methyl 3-methyl-6-[3α,5α-dihydroxy-2β-(3-oxooctyl)cyclopent-1β-yl] - 2,4 - hexadienoate is productive of:

(1) racemic ethyl 4-[3α,5α-dihydroxy - 2β - (3-hydroxyoctyl)cyclopent-1β-yl]-2-butenoate, (2) racemic methyl 6-[3α,5α-dihydroxy-2β-(3-hydroxyoctyl)cyclopent-1β-yl]-2,4-hexadienoate and (3) racemic methyl 3-methyl-6-[3α,5α-dihydroxy-2β-(3-hydroxyoctyl)cyclopent-1β-yl]-2,4-hexadienoate.

EXAMPLE 61

Racemic ethyl 8-[3α, 5α-dihydroxy-2β-(3-hydroxyoctyl) cyclopent-1β-yl]-2,4,6-octatrienoate (12D)

A mixture of 0.3 g. of the 3α,5α-p-nitrobenzylidene derivative of racemic ethyl 8-[3α,5α-dihydroxy-2β-(3-hydroxyoctyl)cyclopent-1β-yl]-2,4,6-octatrienoate (12C), 25 ml. of acetone, 12 ml. of water and 0.6 ml. of concentrated sulfuric acid is refluxed under nitrogen for 3 hours, then is concentrated by evaporation under reduced pressure to remove most of the acetone. The residue is extracted with methylene chloride and the methylene chloride extracts are washed with water, dried, and chromatographed over 10 g. of Florisil, Elution with 40% acetone in Skellysolve B and evaporation of the eluates gives a residue comprising racemic ethyl 8-[3α,5α-dihydroxy - 2β - (3-hydroxyoctyl)cyclopent-1β-yl]-2,4,6-octatrienoate.

Following the procedure of Example 61 but substituting for the 3α,5α-p-nitrobenzylidene derivative of racemic ethyl 8-[3α,5α-dihydroxy-2β-(3-hydroxyoctyl)cyclopent-1β-yl]-2,4,6-octatrienoate as starting material other compounds of formula 12C, for example:

(1) The 3α,5α-p-nitrobenzylidene derivative of racemic ethyl 4-[3α,5α-dihydroxy-2β-(3-hydroxyoctyl) cyclopent-1β-yl]-2-butenoate, (2) The 3α,5α-p-nitrobenzylidene derivative of racemic methyl 6 - [3α,5α - dihydroxy-2β-(3-hydroxyoctyl)cyclopent-1β-yl]-2,4-hexadienoate, and (3) The 3α,5α-p-nitrobenzylidene derivative of racemic methyl 3-methyl-6-[3α,5α-dihydroxy-2β-(3-hydroxyoctyl cyclopent-1β-yl]-2,4-hexadienoate is productive of:

(1) racemic ethyl 4-[3α,5α-dihydroxy-2β-(3-hydroxyoctyl)cyclopent-1β-yl]-2-butenoate, (2) racemic methyl 6-[3α,5α-dihydroxy-2β-(3-hydroxyethyl)cyclopent-1β-yl]-2,4-hexadienoate and (3) racemic methyl 3-methyl-6-[3α,5α-dihydroxy-2β-(3-hydroxyethyl)cyclopent-1β-yl]-2,4-hexadienoate.

EXAMPLE 62

Racemic ethyl 8-[3α,5α-dihydroxy-2β-(3-oxooctyl)-cyclopent-1β-yl]octanoate (13B)

A mixture of 10.0 g. of racemic ethyl 8-[3α,5α-dihydroxy - 2β-(3 - oxooctyl)cyclopent - 1β-yl]-2,4,6-octatrienoate (12B), 1.0 g. of 5% rhodium on alumina and 200 ml. of ethanol is hydrogenated on the Parr apparatus at room temperature for about 3 hours, or until hydrogen uptake ceases. The catalyst is removed by filtration and the filtrate is evaporated under reduced pressure to give a residue which is dissolved in a small amount of ethyl acetate and chromatographed over silica gel. Elution with ethyl acetate and evaporation of the eluate gives a colorless residue comprising racemic ethyl 8-[3α, 5α-dihydroxy-2β-(3-oxooctyl)cyclopent-1β-yl]octanoate.

Following the procedure of Example 62, but substituting for racemic ethyl 8-[3α,5α-dihydroxy-2β(3-oxooctyl)cyclopent-1β-yl]-2,4,6-octatrienoate as starting material other compounds of Formula 12B, for example:

(1) Racemic ethyl 4-[3α,5α-dihydroxy-2β-(3-oxooctyl)cyclopent-1β-yl]butanoate, (2) Racemic methyl 6-[3α,5α-dihydroxy-2β-(3-oxooctyl)cyclopent-1β-yl]-2,4-hexadienoate and (3) Racemic methyl 3-methyl-6-[3α,5α-dihydroxy-2β-(3-oxooctyl)-cyclopent-1β-yl]-2,4-hexadienoate is productive of:

(1) racemic ethyl 4-[3α,5α-dihydroxy-2β-(3-oxooctyl)cyclopent-1β-yl]-butanoate, (2) racemic methyl 6-[3α,5α-dihydroxy-2β-(3-oxooctyl)cyclopent-1β-yl]hexanoate and (3) racemic methyl 3-methyl-6-[3α,5α-disydroxy-2β(3-oxooctyl)cyclopent-1β-yl]hexanoate.

EXAMPLE 63

Racemic ethyl 8-[3α,5α-dihydroxy-2β-(3-hydroxyoctyl) cyclopent-1β-yl]octanoate (14B)

A mixture of 1.0 g. of the 3α,5α-p-nitrobenzylidene derivative of racemic ethyl 8-[3α,5α-dihydroxy-2β-(3-oxooctyl)-cyclopent-1β-yl]-2,4,6-octatrienoate (12A) in 50 ml. of ethanol and 250 mg. of pre-reduced 30% palladium on carbon catalyst is hydrogenated at room temperature until the uptake of hydrogen ceases. The mixture is filtered to remove the catalyst and the filtrate is evaporated under reduced pressure leaving a residue. The residue is dissolved in ether, washed with dilute hydrochloric acid then with aqueous satuated sodium bicarbonate, and again with water, and the solvent is evaporated under reduced pressure to give a residue comprising racemic ethyl 8-[3α,5α-dihydroxy - 2β - (3-hydroxyoctyl)cyclopent-1β-yl]octanoate.

Following the procedure of Example 63, but substituting as catalyst Raney nickel, platinum or cobalt hydrocarbonyl for palladium on carbon is likewise productive of racemic ethyl 8-[3α,5α-dihydroxy-2β-(3-hydroxyoctyl) cyclopent-1β-yl]octanoate.

The 3,5-acetal, if not removed by the hydrochloric acid wash, is removed by hydrolysis with hydrochloric acid or sulfuric acid in aqueous acetone as described in Examples 34, 35 and 39.

EXAMPLE 64

Racemic ethyl 8-[3α,5α-dihydroxy-2β-(3-hydroxyoctyl) cyclopent-1β-yl]octanoate (14B)

A mixture of 1.0 g. of racemic ethyl 8-[3α,5α-dihydroxy - 2β-(3-oxooctyl)cyclopent-1β-yl]-2,4,6-octatrienoate (12B) in 50 ml. of ethanol and 250 mg. of pre-reduced 30% palladium on carbon catalyst is hydrogenated at room temperature until the uptake of hydrogen ceases, then the catalyst is separated by filtration and the filtrate is evaporated under reduced pressure leaving a residue comprising racemic ethyl 8-[3α,5α-dihydroxy-2β-(3-hydroxyoctyl)cyclopent-1β-yl]octanoate.

Following the procedure of Example 64, but substituting as catalyst Raney nickel, platinum or cobalt hydrocarbonyl for palladium on carbon is likewise productive of racemic ethyl 8-[3α,5α-dihydroxy-2β-(3-hydroxyoctyl) cyclopent-1β-yl]octanoate.

EXAMPLE 65

Racemic ethyl 8-[3α,5α-dihydroxy-2β-(3-hydroxyoctyl) cyclopent-1β-yl]octanoate (14B)

A mixture of 1.0 g. of the 3α,5α-p-nitrobenzylidene derivative of racemic ethyl 8-[3α,5α-dihydroxy-2β-(3-hydroxyoctyl)-cyclopent-1β-yl]-2,4,6-octatrienoate (12C) in 50 ml. of ethanol and 250 mg. of pre-reduced 30% palladium on carbon catalyst is hydrogenated until hydrogen uptake ceases. The mixture is filtered to remove the catalyst and the filtrate is evaporated under reduced pressure leaving a residue. The residue is dissolved in ether, washed with dilute hydrochloric acid then with aqueous saturated sodium bicarbonate and again with water, and the solvent is removed under reduced pressure to give a residue comprising racemic ethyl 8-[3α,5α-dihydroxy-2β-(3-hydroxyoctyl)cyclopent-1β-yl]octanoate.

The 3,5-acetal, if not removed by the hydrochloric acid wash, is removed by hydrolysis with hydrochloric acid or sulfuric acid in aqueous acetone as described in Examples 34, 35 and 39.

EXAMPLE 66

Racemic ethyl 8-[3α,5α-dihydroxy-2β-(3-hydroxyoctyl) cyclopent-1β-yl]octanoate (14B)

A mixture of 0.5 g. of racemic ethyl 8-[3α,5α-dihydroxy - 2β - (3-hydroxyoctyl)cyclopent-1β-yl]-2,4,6-octatrienoate (12D), 100 mg. of 5% rhodium on alumina, and 25 ml. of ethanol is hydrogenated at room temperature until hydrogen uptake ceases. The mixture is filtered to remove the catalyst and the filtrate is evaporated under reduced pressure to give a residue comprising racemic ethyl 8 - [3α,5α-dihydroxy-2β-(3-hydroxyoctyl)cyclopent-1β-yl]octanoate which can be further purified by chromatography over about 25 g. of Florisil and elution with methylene chloride containing increasing proportions of acetone from 20% to 50%.

Following the procedure of Example 66, but substituting for racemic ethyl 8-[3α,5α-dihydroxy-2β-(3-hydroxyoctyl)cyclopent-1β-yl]-2,4,6-octatrienoate as starting material, other compounds of formula 12D, for example:

(1) Racemic ethyl 4-[3α,5α-dihydroxy-2β-(3-hydroxyoctyl)cyclopent-1β-yl]-2-butenoate, (2) Racemic methyl 6 - [3α,5α - dihydroxy - 2β-(3-hydroxyoctyl)cyclopent-1-β-yl]-2,4-hexadienoate and (3) Racemic methyl 3-methyl-6-[3α,5α-dihydroxy-2β-(3 - hydroxyoctyl)cyclopent - 1β - yl]-2,4-hexadienoate is productive of:

(1) racemic ethyl 4-[3α,5α-dihydroxy-2β-(3-hydroxyoctyl)cyclopent-1β-yl]butanoate,
(2) racemic methyl 6-[3α,5α-dihydroxy-2β-(3-hydroxyoctyl)cyclopent-1β-yl]hexanoate and
(3) racemic methyl 3-methyl-6-[3α,5α-dihydroxy-2β-(3-hydroxyoctyl)cyclopent-1β-yl]hexanoate.

EXAMPLE 67

Racemic ethyl 8-[3α,5α-dihydroxy-2β-(3-hydroxyoctyl) cyclopent-1β-yl]octanoate (14B)

To a solution of 1.0 g. of racemic ethyl 8-[3α,5α-dihydroxy-2β-(3-oxooctyl)cyclopent-1β-yl]octanoate (13B) in 40 ml. of tetrahydrofuran under a nitrogen atmosphere is added 3.5 g. of lithium tri-tert.-butoxy aluminum hydroxide in portions over a period of 3–4 minutes. The solution is stirred at room temperature for 3 hours, then concentrated to about one-third volume by evaporation under reduced pressure, carefully acidified with dilute hydrochloric acid, and extracted with ethyl acetate. The ethyl acetate extract is washed with water, dried, and evaporated under reduced pressure to give a gum comprising racemic ethyl 8-[3α,5α-dihydroxy-2β-(3-hydroxyoctyl)cyclopent-1β-yl]octanoate which can be further purified by chromatography over silica gel.

Following the procedure of Example 67, but substituting for racemic ethyl 8-[3α,5α-dihydroxy-2β-(3-oxooctyl)cyclopent-1β-yl]octanoate as starting material other compounds of formula 13B, for example:

(1) Racemic ethyl 4-[3α,5α-dihydroxy-2β-(3-oxooctyl)cyclopent-1β-yl]butanoate,
(2) Racemic methyl 6-[3α,5α-dihydroxy-2β-(3-oxooctyl)cyclopent-1β-yl]hexanoate and
(3) Racemic methyl 3-methyl-6-[3α,5α-dihydroxy-2-β-(3-oxooctyl)-cyclopent-1β-yl]hexanoate is productive of:

(1) racemic ethyl 4-[3α,5α-dihydroxy-2β-(3-hydroxyoctyl)cyclopent-1β-yl]butanoate,
(2) racemic methyl 6-[3α,5α-dihydroxy-2β-(3-hydroxyoctyl)cyclopent-1β-yl]hexanoate and
(3) racemic methyl 3-methyl-6-[3α,5α-dihydroxy-2β-(3-hydroxyoctyl)cyclopent-1β-yl]hexanoate.

EXAMPLE 68

3α,5α-p-nitrobenzylidene derivative of racemic ethyl 7-[3α,5α-dihydroxy-2β-(3-acetoxyoctyl)cyclopent-1β-yl]-2,4,6-heptatrienoate (10C)

A mixture of 0.2 g. of the 3α,5α-p-nitrobenzylidene derivative of racemic ethyl 7-[3α,5α-dihydroxy-2β-(3-hydroxyoctyl)-cyclopent-1β-yl]-2,4,6-heptatrienoate (10C), 1.0 ml. of acetic anhydride and 1.0 ml. of pyridine is allowed to stand at room temperature for 2 hours, then the mixture is concentrated to dryness under reduced pressure giving a residue comprising the 3α,5α-p-nitrobenzylidene derivative of racemic ethyl 7-[3α,5α-dihydroxy-2β-(3-acetoxyoctyl)cyclopent-1β-yl]-2,4,6-heptatrienoate, which is purified by chromatography over Florisil using Skellysolve B containing increasing proportions of acetone as eluant.

EXAMPLE 69

3α,5α-p-nitrobenzylidene derivative of racemic ethyl 7-[3α,5α-dihydroxy-2β-(3-acetoxyoctyl)cyclopent-1β-yl]-2,4,6-heptatrienoate (10C)

A mixture of 0.2 g. of the 3α,5α-p-nitrobenzylidene derivative of racemic ethyl 7-[3α,5α-dihydroxy-2β-(3-hydroxyoctyl)-cyclopent-1β-yl]-2,4,6-heptatrienoate, 1.0 ml. of acetic anhydride and 1.0 ml. of pyridine was allowed to stand at room temperature for about 18 hours, then was diluted with 50 ml. of ether. The ether solution was washed several times with water, then several times with dilute aqueous sodium bicarbonate, dried over sodium sulfate, and evaporated to give a residue comprising the p-nitrobenzylidene derivative of racemic ethyl 7-[3α,5α-dihydroxy-2β-(3-acetoxyoctyl)cyclopent-1β-yl]-2,4,6-heptatrienoate. The thus-obtained ester can be further purified by chromatography of Florisil, using Skellysolve B containing increasing amounts of acetone (from 1 to 10% acetone by volume) as eluant.

Following the procedure of Example 69, but substituting for the 3α,5α-p-nitrobenzylidene derivative of racemic ethyl 7-[3α,5α-dihydroxy-2β-(3-hydroxoctyl)cyclopent-1β-yl]-2,4,6-heptatrienoate as starting material, other compounds of Formulas 10C and 12C, for example:

(1) The 3α,5α-p-nitrobenzylidene derivative of racemic ethyl trans - [3α,5α-dihydroxy-2β-(3-hydroxyoctyl)cyclopent-1β-yl]-acrylate (10C),
(2) The 3α,5α-p-nitrobenzylidene derivative of racemic methyl 5 - [3α,5α - dihydroxy - 2β-(3-hydroxyoctyl)cyclopent-1β-yl]-2,4-pentadienoate (10C),
(3) The 3α,5α-p-nitrobenzylidene derivative of racemic methyl 3-methyl-5-[3α,5α-dihydroxy-2β-(3-hydroxyoctyl)cyclopent-1β-yl]-2,4-pentadienoate (10C),
(4) The 3α,5α-p-nitrobenzylidene derivative of racemic ethyl 7 - [3α,5α-dihydroxy-2β-(3-hydroxybutyl)cyclopent-1β-yl]-2,4,6-heptatrienoate (10C),
(5) The 3α,5α-p-nitrobenzylidene derivative of racemic ethyl 8 - [3α,5α-dihydroxy-2β-(3-hydroxyoctyl)cyclopent-1β-yl]-2,4,6-octatrienoate (12C),
(6) The 3α,5α-p-nitrobenzylidene derivative of racemic ethyl 4 - [3α,5α-dihydroxy-2β-(3-hydroxyoctyl)cyclopent-1β-yl]-2-butenoate (12C),
(7) The 3α,5α-p-nitrobenzylidene derivative of racemic methyl 6-[3α,5α-dihydroxy-2β-(3 - hydroxyoctyl)cyclopent-1β-yl]-2,4-hexadienoate (12C), and
(8) The 3α,5α-p-nitrobenzylidene derivative of racemic methyl 3-methyl-6-[3α,5α-dihydroxy - 2β - (3 - hydroxyoctyl)cyclopent-1β-yl]-2,4-hexadienoate (12C) is productive of:

(1) The 3α,5α-p-nitrobenzylidene derivative of racemic ethyl trans - [3α,5α - dihydroxy-2β-(3 - acetoxyoctyl) cyclopent-1β-yl]-acrylate (10C),
(2) The 3α,5α-p-nitrobenzylidene derivative of racemic methyl - 5-[3α,5α-dihydroxy-2β-(3-acetoxyoctyl)cyclopent-1β-yl]-2,4-pentadienoate (10C),
(3) The 3α,5α-p-nitrobenzylidene derivative of racemic methyl 3-methyl-5-[3α,5α-dihydroxy-2β - (3 - acetoxyoctyl)cyclopent-1β-yl]-2,4-pentadienoate (10C),
(4) The 3α,5α-p-nitrobenzylidene derivative of racemic ethyl 7 - [3α,5α-dihydroxy-2β-(3 - acetoxybutyl)cyclopent-1β-yl]-2,4,6-heptatrienoate (10C),
(5) The 3α,5α-p-nitrobenzylidene derivative of racemic ethyl 8-[3α,5α - dihydroxy-2β-(3 - acetoxyoctyl)cyclopent-1β-yl]-2,4,6-octatrienoate (12C),
(6) The 3α,5α-p-nitrobenzylidene derivative of racemic ethyl 4-[3α,5α - dihydroxy-2β-(3 - acetoxyoctyl)cyclopent-1β-yl]-2-butenoate (12C),
(7) The 3α,5α-p-nitrobenzylidene derivative of racemic methyl 6-[3α,5α-dihydroxy-2β-(3-acetoxyocyl) cyclopent-1β-yl]-2,4-hexadienoate (12C) and
(8) The 3α,5α-p-nitrobenzylidene derivative of racemic methyl 3-methyl-6-[3α,5α - dihydroxy-2β-(3 - acetoxyoctyl)cyclopent-1β-yl]-2,4-hexadienoate (12C).

Following the procedure of Example 69, but substituting for the 3α,5α-p-nitrobenzylidene derivative of racemic ethyl 7-[3α,5α-dihydroxy-2β-(3-hydroxyoctyl) cyclopent-1β-yl]-2,4,6-heptatrienoate as starting material, other 3α,5α-acetals of racemic ethyl 7-[3α,5α-dihydroxy-2β-(3-hydroxyoctyl)cyclopent - 1β-yl]-2,4,6-heptatrienoate wherein the acetal group is derived from, e.g., formaldehyde, acetaldehyde, propionaldehyde, chloral, p-bromobenzaldehyde, p-chlorobenzaldehyde, p-fluorobenzaldehyde, 2,4,6-trichlorobenzaldehyde, p-carbomethoxybenzaldehyde and the like is productive of the corresponding 3,5-acetals of racemic ethyl 7-[3α,5α-dihydroxy-2β-(3-acetoxyoctyl)cyclopent-1β-yl] - 2,4,6 - heptatrienoate.

Similarly, other 3'-hydroxy-3α,5α-acetals of the compounds of Formulas 10C and 12C, for example those corresponding to the p-nitrobenzylidene derivatives named as starting materials following Example 69, can be acylated following the procedure of Example 69.

Following the procedure of Example 69, but substituting for the acetic anhydride, propionic anhydride, butyric anhydride, acrylic anhydride, crotonic anhydride, cyclohexanecarboxylic anhydride, benzoic anhydride, naphthoic anhydride, p-chlorophenoxyacetic anhydride, furoic anhydride, and lauric anhydride, and the like, there is obtained the corresponding 3α,5α-p-nitrobenzylidene derivative of racemic ethyl 7-[3α,5α-dihydroxy-2β-(3-acyloxyoctyl)cyclopent-1β-yl]-2,4,6-heptatrienoate.

EXAMPLE 70

Racemic ethyl 7-[3α,5α-diacetoxy-2β-(3 - oxooctyl)-cyclopent-1β-yl]heptanoate (11B)

A solution of 0.21 g. of racemic ethyl 7-[3α,5α-dihydroxy-2β-(3-oxooctyl)cyclopent-1β-yl]heptanoate (11B) in 1 ml. of acetic anhydride and 1 ml. of pyridine was allowed to stand at room temperature for 2 hrs., then the mixture was concentrated to dryness by evaporation under reduced pressure and the residue was chromatographed on 25 g. of Florisil. Elution with 5% acetone in Skellysolve B and evaporation of the eluate gave an oil comprising racemic ethyl 7-[3α,5α-diacetoxy-2β-(3-oxooctyl) cyclopent-1β-yl] heptanoate and showing a spot having $R_f$ 0.57 when chromatographed on a thin layer silica gel plate and developed with 50% ethyl acetate-50% cyclohexane. The nuclear magnetic resonance spectrum showed a distinct symmetrical 5 line pattern centered at 285 cps.

EXAMPLE 71

Racemic ethyl 7-[3α,5α-diacetoxy-2β-(3-oxooctyl)cyclopent-1β-yl]heptanoate (11B)

A mixture of 0.2 g. of racemic ethyl 7-[3α,5α-dihydroxy-2β-(3-oxooctyl)cyclopent-1β-yl]heptanoate (11B), 1 ml. of acetic anhydride and 1 ml. of pyridine is allowed to stand at room temperature for about 18 hrs., then is poured into 50 ml. of diethyl ether and washed several times with dilute hydrochloric acid, then with aqueous sodium bicarbonate. The ether solution is then dried over sodium sulfate and evaporated under reduced pressure to give a residue comprising racemic ethyl 7-[3α,5α-diacetoxy-2β-(3-oxooctyl)cyclopent-1β-yl]heptanoate. The thus obtained residue is purified by chromatography over 25 g. of Florisil using 5% acetone in Skellysolve B as eluant, to obtain substantially pure racemic ethyl 7-[3α,5α-diacetoxy-2β-(3-oxooctyl)cyclopent-1β-yl]heptanoate.

Following the procedure of Example 71, but substituting for racemic ethyl 7-[3α,5α-dihydroxy-2β-(3 - oxooctyl) cyclopent-1β-yl]heptanoate (11B) as starting material other 3,5-diols of formulas 10B, 11B, 12B and 13B, for example:

(1) Racemic ethyl 7-[3α,5α-dihydroxy - 2β - (3-oxooctyl)cyclopent-1β-yl]2,4,6-heptatrienoate (10B), (2) Racemic ethyl trans-[3α,5α-dihydroxy - 2β - (3-oxooctyl)-cyclopent-1β-yl] acrylate (10B), (3) Racemic methyl 5-[3α,5α-dihydroxy-2β-(3 - oxooctyl)cyclopent-1β-yl]-2,4-pentadienoate (10B), (4) Racemic methyl 3-methyl - 5 - [3α,5α-dihydroxy-2β-(3-oxooctyl)cyclopent-1β-yl]-2,4-pentadienoate (10B), (5) Racemic ethyl 7-[3α,5α - dihydroxy-2β-(3 - oxobutyl)cyclopent-1β-yl]-2,4,6-heptatrienoate (10B), (6) Racemic ethyl 3-[3α,5α-dihydroxy - 2β - (3-oxooctyl)cyclopent-1β-yl] propionate (11B), (7) Racemic methyl 5-[3α,5α-dihydroxy - 2β - (3-oxooctyl)cyclopent-1β-yl] pentanoate (11B), (8) Racemic methyl 3-methyl - 5 - [3α,5α-dihydroxy-2β-(3-oxooctyl)cyclopent-1β-yl] pentanoate (11B), (9) Racemic ethyl 7-[3α,5α-dihydroxy - 2β - (3-oxobutyl)cyclopent-1β-yl]heptanoate (11B),

(10) Racemic ethyl 8-[3α,5α-dihydroxy - 2β - (3-oxooctyl)cyclopent-1β-yl]-2,4,6-octatrienoate (12B),

(11) Racemic ethyl 4-[3α,5α-dihydroxy - 2β - (3-oxooctyl)cyclopent-1β-yl]-2-butenoate (12B),

(12) Racemic methyl 6-[3α,5α-dihydroxy - 2β - (3-oxooctyl)-cyclopent-1β-yl]-2,4-hexadienoate (12B),

(13) Racemic methyl 3-methyl - 6 - [3α,5α-dihydroxy-2β-(3-oxooctyl)cyclopent-1β-yl]-2,4-hexadienoate (12B),

(14) Racemic ethyl 8-[3α,5α-dihydroxy - 2β - (3 - oxooctyl)cyclopent-1β-yl] octanoate (13B),

(15) Racemic ethyl 4-[3α,5α-dihydroxy - 2β - (3-oxooctyl)cyclopent-1β-yl] butanoate (13B),

(16) Racemic methyl 6-[3α,5α - dihydroxy-2β-(3-oxooctyl)cyclopent-1β-yl] hexanoate (13B) and

(17) Racemic methyl 3-methyl-6-[3α,5α-dihydroxy-2β-(3-oxooctyl)cyclopent-1β-yl] hexanoate (13B), is productive of:

(1) Racemic ethyl 7-[3α,5α-diacetoxy-2β-(3-oxooctyl)-cyclopent-1β-yl]-2,4,6-heptatrienoate (10B), (2) Racemic ethyl trans-[3α,5α-diacetoxy-2β-(3-oxooctyl)cyclopent-1β-yl] acrylate (10B), (3) Racemic methyl 5-[3α,5α-diacetoxy-2β-(3-oxooctyl)cyclopent-1β-yl]-2,4-pentadienoate (10B), (4) Racemic methyl 3-methyl-5-[3α,5α-diacetoxy-2β-(3-oxooctyl)cyclopent-1β-yl]-2,4-pentadienoate (10B), (5) Racemic ethyl 7-[3α,5α-diacetoxy-2β-(3-oxobutyl)-cyclopent-1β-yl]-2,4,6-heptatrienoate (10B), (6) Racemic ethyl 3-[3α,5α-diacetoxy-2β-(3-oxooctyl)-cyclopent-1β-yl] propionate (11B), (7) Racemic methyl 5-[3α,5α-diacetoxy-2β-(3-oxooctyl)cyclopent-1β-yl] pentanoate (11B), (8) Racemic methyl 3-methyl-5-[3α,5α-diacetoxy-2β-(3-oxooctyl)cyclopent-1β-yl] pentanoate (11B), (9) Racemic ethyl 7-[3α,5α-diacetoxy-2β-(3-oxobutyl)-cyclopent-1β-yl] heptanoate (11B),

(10) Racemic ethyl 8-[3α,5α-diacetoxy-2β-(3-oxooctyl)cyclopent-1β-yl]-2,4,6-octatrienoate (12B),

(11) Racemic ethyl 4-[3α,5α-diacetoxy-2β-(3-oxooctyl)-cyclopent-1β-yl]-2-butenoate (12B),

(12) Racemic methyl 6[3α,5α-diacetoxy-2β-(3-oxooctyl)cyclopent-1β-yl]-2,4-hexadienoate (12B),

(13) Racemic methyl 3-methyl-6-[3α,5α-diacetoxy-2β-(3-oxooctyl)cyclopent-1β-yl]-2,4-hexadienoate (12B),

(14) Racemic ethyl 8-[3α,5α-diacetoxy-2β-(3-oxooctyl)cyclopent-1β-yl] octanoate (13B),

(15) Racemic ethyl 4-[3α,5α-diacetoxy-2β-(3-oxooctyl)cyclopent-1β-yl] butanoate (13B),

(16) Racemic methyl 6-[3α,5α-diacetoxy-2β-(3-oxooctyl)cyclopent-1β-yl] hexanoate (13B), and

(17) Racemic methyl 3-methyl-6-[3α,5α-diacetoxy-2β-(3-oxooctyl)cyclopent-1β-yl] hexanoate (13B).

Following the procedure of Example 71, but substituting for acetic anhydride the anhydrides of other hydrocarbon carboxylic acid, for example, those named following Example 69, is productive of the corresponding 3,5-diacylates.

EXAMPLE 72

Racemic ethyl 7-[3α,5α-diacetoxy-2β-(3-acetoxyoctyl)-cyclopent-1β-yl] heptanoate (14A)

A mixture of 0.2 g. of racemic ethyl 7-[3α,5α-dihydroxy - 2β - (3 - hydroxyoctyl)cyclopent - 1β - yl] heptanoate (14A), 1 ml. of acetic anhydride and 1 ml. of pyridine is allowed to stand at room temperature for about 16 hrs., then is poured into 50 ml. of ether and washed several times with dilute hydrochloric acid, then with aqueous sodium bicarbonate. The ether solution is dried over sodium sulfate and evaporated under reduced pressure to give a residue comprising racemic ethyl 7-[3α,5α - diacetoxy - 2β - (3 - acetoxyoctyl)cyclopent - 1β-yl] heptanoate. The thus obtained residue is chromatographed over Florisil, and eluted with Skellysolve B containing about 5% of acetone. Evaporation of the eluates gives fractions comprising substantially pure racemic ethyl 7 - [3α,5α - diacetoxy - 2β - (3 - acetoxyoctyl)cyclopent- 1β-yl] heptanoate. The eluate fractions are chosen by thin-layer chromatographic analysis using 33% ethyl acetate-67% cyclohexane.

Following the procedure of Example 72, but substituting for racemic ethyl 7-[3α,5α-dihydroxy-2β-(3-hydroxyoctyl)cyclopent-1β-yl] heptanoate (14A) as starting material other compounds of Formulas 10D, 14A, 15, 12D and 14B, for example:

(1) Racemic ethyl 7-[3α,5α-dihydroxy-2β-(3-hydroxyoctyl)cyclopent-1β-yl]-2,4,6-heptadienoate (10D),
(2) Racemic ethyl trans-[3α,5α-dihydroxy-2β-(3-hydroxyoctyl)cyclopent-1β-yl] acrylate (10D),
(3) Racemic methyl 5-[3α,5α-dihydroxy-2β-(3-hydroxyoctyl)cyclopent-1β-yl]-2,4-pentadienoate (10D),
(4) Racemic methyl 3-methyl-5-[3α,5α-dihydroxy-2β-(3-hydroxyoctyl)cyclopent-1β-yl]-2,4-pentadienoate (10D),
(5) Racemic ethyl 7-[3α,5α-dihydroxy-2β-(3-hydroxybutyl)cyclopent-1β-yl]-2,4,6-heptatrienoate (10D),
(6) Racemic ethyl 3-[3α,5α-dihydroxy-2β-(3-hydroxyoctyl)cyclopent-1β-yl] propionate (14A),
(7) Racemic methyl 5-[3α,5α-dihydroxy-2β-(3-hydroxyoctyl)cyclopent-1β-yl] pentanoate (14A),
(8) Racemic methyl 3-methyl-5-[3α,5α-dihydroxy-2β-(3-hydroxyoctyl)cyclopent-1β-yl] pentanoate (14A),
(9) Racemic ethyl 7-[3α,5α-dihydroxy-2β-(3-hydroxybutyl)-cyclopent-1β-yl] heptanoate (14A),
(10) Racemic ethyl 7-[3α,5α-dihydroxy-2β-(3-hydroxyoctyl)cyclopent-1α-yl] heptanoate (15),
(11) Racemic ethyl 3-[3α,5α-dihydroxy-2β-(3-hydroxyoctyl)cyclopent-1α-yl] propionate (15),
(12) Racemic methyl 5-[3α,5α-dihydroxy-2β-(3-hydroxyoctyl)cyclopent-1α-yl] pentanoate (15),
(13) Racemic methyl 3-methyl-5-[3α,5α-dihydroxy-2β-(3-hydroxyoctyl)cyclopent-1α-yl] pentanoate (15),
(14) Racemic ethyl 7-[3α,5α-dihydroxy-2β-(3-hydroxybutyl)cyclopent-1α-yl] heptanoate (15),
(15) Racemic ethyl 8-[3α,5α-dihydroxy-2β-(3-hydroxyoctyl)cyclopent-1β-yl]-2,4,6-octatrienoate (12D),
(16) Racemic ethyl 4-[3α,5α-dihydroxy-2β-(3-hydroxyoctyl)cyclopent-1β-yl]-2-butenoate (12D),
(17) Racemic methyl 6-[3α,5α-dihydroxy-2β-(3-hydroxyoctyl)cyclopent-1β-yl]-2,4-hexadienoate (12D),
(18) Racemic methyl 3-methyl-6-[3α,5α-dihydroxy-2β-(3-hydroxyoctyl)cyclopent-1β-yl]-2,4-hexadienoate (12D),
(19) Racemic ethyl 8-[3α,5α-dihydroxy-2β-(3-hydroxyoctyl)cyclopent-1β-yl] octanoate (14B),
(20) Racemic ethyl 4-[3α,5α-dihydroxy-2β-(3-hydroxyoctyl)cyclopent-1β-yl] butanoate (14B),
(21) Racemic methyl 6-[3α,5α-dihydroxy-2β-(3-hydroxyoctyl)cyclopent-1β-yl] hexanoate (14B) and
(22) Racemic methyl 3-methyl-6-[3α,5α-dihydroxy-2β-(3-hydroxyoctyl)cyclopent-1β-yl] hexanoate (14B) is productive of:

(1) Racemic ethyl 7-[3α,5α-diacetoxy-2β-(3-acetoxyoctyl)cyclopent-1β-yl]-2,4,6-heptadienoate (10D),
(2) Racemic ethyl trans-[3α,5α-diacetoxy-2β-(3-acetoxyoctyl)cyclopent-1β-yl] acrylate (10D),
(3) Racemic methyl 5-[3α,5α-diacetoxy-2β-(3-acetoxyoctyl)cyclopent-1β-yl]-2,4-pentadienoate (10D),
(4) Racemic methyl 3-methyl-5-[3α,5α-diacetoxy-2β-(3-acetoxyoctyl)cyclopent-1β-yl]-2,4-pentadienoate (10D),
(5) Racemic ethyl 7-[3α,5α-diacetoxy-2β-(3-acetoxybutyl)cyclopent-1β-yl]-2,4,6-heptatrienoate (10D),
(6) Racemic ethyl 3-[3α,5α-diacetoxy-2β-(3-acetoxyoctyl)cyclopent-1β-yl] propionate (14A),
(7) Racemic methyl 5-[3α,5α-diacetoxy-2β-(3-acetoxyoctyl)cyclopent-1β-yl] pentanoate (14A),
(8) racemic methyl 3-methyl-5-[3α,5α-diacetoxy-2β-(3-acetoxyoctyl)cyclopent-1β-yl] pentanoate (14A),
(9) racemic ethyl 7-[3α,5α-diacetoxy-2β-(3-acetoxybutyl)cyclopent-1β-yl] heptanoate (14A).
(10) racemic ethyl 7-[3α,5α-diacetoxy-2β-(3-acetoxyoctyl)cyclopent-1α-yl] heptanoate (15),
(11) racemic ethyl 3-[3α,5α-diacetoxy-2β-(acetoxyoctyl)-cyclopent-1α-yl] propionate (15),
(12) racemic methyl 5-[3α,5α-diacetoxy-2β-(3-acetoxyoctyl)cyclopent-1α-yl] pentanoate (15),
(13) racemic methyl 3-methyl-5-[3α,5α-diacetoxy-2β-(3-acetoxyoctyl)cyclopent-1α-yl] pentanoate (15),
(14) racemic ethyl 7-[3α,5α-diacetoxy-2β-(3-acetoxybutyl)cyclopent-1α-yl] heptanoate (15),
(15) racemic ethyl 8-[3α,5α-diacetoxy-2β-(3-acetoxyoctyl)cyclopent-1β-yl]-2,4,6-octatrienoate (12D),
(16) racemic ethyl 4-[3α,5α-diacetoxy-2β-(3-acetoxyoctyl)cyclopent-1β-yl]-2-butenoate (12D),
(17) racemic methyl 6-[3α,5α-diacetoxy-2β-(3-acetoxyoctyl)cyclopent-1β-yl]-2,4-hexadienoate (12D),
(18) racemic methyl 3-methyl-6-[3α,5α-diacetoxy-2β-(3-acetoxyoctyl)cyclopent-1β-yl]-2,4-hexadienoate (12D),
(19) racemic ethyl 8-[3α,5α-diacetoxy-2β-(3-acetoxyoctyl)cyclopent-1β-yl] octanoate (14B),
(20) racemic ethyl 4-[3α,5α-diacetoxy-2β-(3-acetoxyoctyl)cyclopent-1β-yl] butanoate (14B),
(21) racemic methyl 6-[3α,5α-diacetoxy-2β-(3-acetoxyoctyl)cyclopent-1β-yl] hexanoate (14B) and
(22) racemic methyl 3-methyl-6-[3α,5α-diacetoxy-2β-(3-acetoxyoctyl)cyclopent-1β-yl] hexanoate (14B).

Following the procedure of Example 72, but substituting for acetic anhydride the anhydrides of other hydrocarbon carboxylic acids, for example, those named following Example 69, is productive of the corresponding triacylates.

The acetates and other acylates of the free acids of Formulas 10B, 10C, 10D, 11B, 14A, 15, 12B, 12C, 12D, 13B and 14B can be prepared following the procedure of Examples 69, 71 or 72, but omitting the bicarbonate wash. These acylated acids can be purified by chromatography over acid washed silica gel and development with benzene-ethyl acetate-methane mixtures containing increasing amounts of ethyl acetate and methanol.

The formates of the esters and free acids of Formulas 10A, 10B, 10C, 10D, 11B, 14A, 15, 12A, 12B, 12C, 12D, 13B, and 14B are prepared by heating the hydroxy compounds in 87% formic acid at about 80–90° C. for about 1 hr., and isolating the product as described in Example 72, being careful to avoid hydrolysis of the formate.

EXAMPLE 73

Racemic 7-[3α,5α-dihydroxy-2β-(3-oxooctyl)cyclopent-1β-yl] heptanoic acid (11B)

A mixture of 1.00 g. (0.0026 mole) of racemic ethyl 7-[3α,5α-dihydroxy-2β-(oxooctyl)cyclopent-1β-yl] heptanoate (11B) and 100 ml. of 0.5 N potassium hydroxide in 80% methanol was heated under reflux under a nitrogen atmosphere for 4 hrs. The mixture was concentrated to about 1/3 volume by evaporation under reduced pressure, then diluted in water and washed with methylene chloride. The aqueous phase was acidified with dilute hydrochloric acid and extracted several times with ethyl acetate. The ethyl acetate extracts were combined, washed with aqueous sodium chloride, dried and evaporated under reduced pressure to give a residue. The thus obtained reside was chromatographed on 50 g. of acid washed silica gel. The column was eluted with 250 ml. of 60% ethyl acetate-40% benzene and 500 ml. of ethyl acetate. The ethyl acetate fractions were evaporated to give 528 mg. of product which crystallized slowly on standing at about 10° C. Recrystallization of this material from anhydrous ether gave racemic 7-[3α,5α-dihydroxy-2β-(3-oxooctyl)cyclopent-1β-yl] heptanoic acid as fine prisms having a melting point of 66–67° C., I.R. absorption maxima at 3460, 3400, 2900, 1710, 1700, 1235, 1225, 1205, 1185, 1115 and 1075 cm.$^{-1}$ and the following analysis:

Calcd. for $C_{20}H_{36}O_5$ (percent): C, 67.38; H, 10.18. Found (percent): C, 67.10; H, 10.25.

Following the procedure of Example 73 but substituting for racemic ethyl 7-[3α,5α-dihydroxy-2β-(3-oxooctyl)cyclopent-1β-yl] heptanoate (11B) as starting material other esters of Formulas 10A, 10B, 10C, 10D, 11B, 14A, 15, 12A, 12B, 12C, 12D, 13B and 14B, for example:

(1) The 3α,5α-p-nitrobenzylidene derivative of racemic ethyl 7 - [3α,5α - dihydroxy-2β-(3-oxooctyl)cyclopent-1β-yl]-2,4,6-heptatrienoate (10A), (2) The 3α,5α-p-nitrobenzylidene derivative of racemic ethyl trans - [3α,5α - dihydroxy-2β-(3-oxooctyl)cyclopent-1β-yl]acrylate (10A), (3) The 3α,5α-p-nitrobenzylidene derivative of racemic methyl 5-[3α,5α - dihydroxy-2β-(3-oxooctyl)cyclopent-1β-yl]-2,4-pentadienoate (10A), (4) The 3α,5α-p-nitrobenzylidene derivative of racemic methyl 3 - methyl-5-[3α,5α-dihydroxy-2β-(3-oxooctyl)cyclopent-1β-yl]-2,4-pentadienoate (10A), (5) The 3α,5α-p-nitrobenzylidene derivative of racemic ethyl 7 - [3α,5α-dihydroxy-2β-(3-oxobutyl)cyclopent-1β-yl]-2,4,6-heptatrienoate (10A), (6) Racemic ethyl 7-[3α,5α-dihydroxy-2β-(3-oxooctyl)-cyclopent-1β-yl]-2,4,6-heptatrieneoate (10B), (7) Racemic ethyl trans-[3α,5α-dihydroxy-2β-(3-oxooctyl)cyclopent-1β-yl] acrylate (10B), (8) Racemic methyl 5-[3α,5α-dihydroxy-2β-(3-oxooctyl)cyclopent-1β-yl]-2,4-pentadienoate (10B), (9) Racemic methyl 3-methyl-5-[3α,5α-dihydroxy-2β-(3-oxooctyl)cyclopent-1β-yl]-2,4-pentadienoate (10B),

(10) Racemic ethyl 7-[3α,5α-dihydroxy-2β-(3-oxobutyl)cyclopent-1β-yl]-2,4,6-heptatrienoate (10B),

(11) The 3α,5α-p-nitrobenzylidene derivative of racemic ethyl 7 - [3α,5α-dihydroxy-2β-(3-hydroxyoctyl)cyclopent-1β-yl]-2,4,6-heptatrienoate (10C),

(12) The 3α,5α-p-nitrobenzylidene derivative of racemic ethyl trans-[3α,5α-dihydroxy-2β-(3-hydroxyoctyl)cyclopent-1β-yl] acrylate (10C),

(13) The 3α,5α-p-nitrobenzylidene derivative of racemic methyl 5 - [3α,5α - dihydroxy-2β-(3-hydroxyoctyl)cyclopent-1β-yl]-2,4-pentadienoate (10C),

(14) The 3α,5α-p-nitrobenzylidene derivative of racemic methyl 3-methyl-5-[3α,5α-dihydroxy-2β-(3-hydroxyoctyl)cyclopent-1β-yl]-2,4-pentadienoate (10C),

(15) The 3α,5α-p-nitrobenzylidene derivative of racemic ethyl 7-[3α,5α-dihydroxy-2β-(3-hydroxyoctyl)cyclopent-1β-yl]-2,4,6-heptatrienoate (10C),

(16) Racemic ethyl 7-[3α,5α-dihydroxy-2β-(3-hydroxyoctyl)-cyclopent-1β-yl]-2,4,6-heptatrienoate (10D),

(17) Racemic ethyl trans-[3α,5α-dihydroxy-2β-(3-hydroxyoctyl)cyclopent-1β-yl] acrylate (10D),

(18) Racemic methyl 5 - [3α,5α-dihydroxy-2β-(3-hydroxyoctyl)-cyclopent-1β-yl]-2,4-pentadienoate (10D),

(19) Racemic methyl 3-methyl-5-[3α,5α-dihydroxy-2β-(3-hydroxyoctyl)cyclopent-1β - yl] - 2,4 - pentadienoate (10D),

(20) Racemic ethyl 7-[3α,5α-dihydroxy-2β-(3-hydroxybutyl)-cyclopent-1β-yl]-2,4,6-heptatrienoate (10D),

(21) Racemic ethyl 3-[3α,5α-dihydroxy-2β-(3 - oxooctyl)-cyclopent-1β-yl] propionate (11B),

(22) Racemic methyl 5-[3α,5α-dihydroxy-2β-(3-oxooctyl)-cyclopent-1β-yl] pentanoate (11B),

(23) Racemic methyl 3 - methyl-5-[3α,5α-dihydroxy-2β-(3-oxooctyl)cyclopent-1β-yl] pentanoate (11B),

(24) Racemic ethyl 7-[3α,5α-dihydroxy-2β-(3-oxobutyl)-cyclopent-1β-yl] heptanoate (11B),

(25) Racemic ethyl 7 - [3α,5α - dihydroxy-2β-(3-hydroxyoctyl)-cyclopent-1β-yl] heptanoate (14A),

(26) Racemic ethyl 3-[3α,5α-dihydroxy-2β - (3 - hydroxyoctyl)-cyclopent-1β-yl] propionate (14A),

(27) Racemic methyl 5 - [3α,5α-dihydroxy-2β-(3-hydroxyoctyl)cyclopent-1β-yl] pentanoate (14A),

(28) Racemic methyl 3-methyl-5[3α,5α-dihydroxy-2β-(3-hydroxyoctyl)cyclopent-1β-yl] pentanoate (14A),

(29) Racemic ethyl 7-[3α,5α-dihydroxy-2β-(3-hydroxybutyl)-cyclopent-1β-yl] heptanoate (14A),

(30) Racemic ethyl 7-[3α,5α-dihydroxy-2β-(3-hydroxyoctyl)-cyclopent-1α-yl] propionate (15),

(31) Racemic ethyl 3-[3α,5α-dihydroxy-2β-(3-hydroxyoctyl)-cyclopent-1α-yl] propionate (15),

(32) Racemic methyl 5 - [3α,5α-dihydroxy-2β-(3-hydroxyoctyl)cyclopent-1α-yl] pentanoate (15),

(33) Racemic methyl 3 - methyl-5-[3α,5α-dihydroxy-2β-(3-hydroxyoctyl)cyclopent-1α-yl] pentanoate (15),

(34) Racemic ethyl 7-[3α,5α-dihydroxy - 2β - (3 - hydroxybutyl)-cyclopent-1α-yl] heptanoate (15),

(35) The 3α,5α-p-nitrobenzylidene derivative of racemic ethyl 8-[3α,5α-dihydroxy-2β-(3-oxooctyl)cyclopent-1β-yl]-2,4,6-octatrienoate (12A),

(36) The 3α,5α-p-nitrobenzylidene derivative of racemic ethyl 4-[3α,5α-dihydroxy-2β-(3-oxooctyl)cyclopent-1β-yl]-2-butenoate (12A),

(37) The 3α,5α-p-nitrobenzylidene derivative of racemic methyl 6-[3α,5α-dihydroxy-2β-(3-oxooctyl)cyclopent-1β-yl]-2,4-hexadienoate (12A),

(38) The 3α,5α-p-nitrobenzylidene derivative of racemic methyl 3-methyl-6-[3α,5α-dihydroxy-2β-(3-oxooctyl) cyclopent-1β-yl]-2,4-hexadienoate (12A),

(39) Racemic ethyl 8 - [3α,5α-dihydroxy-2β-(3-oxooctyl)-cyclopent-1β-yl] octanoate (12B),

(40) Racemic ethyl 4 - [3α,5α - dihydroxy 2β-(3-oxooctyl)-cyclopent-1β-yl]-2-butenoate (12B),

(41) Racemic methyl 6-[3α,5α-dihydroxy-2β-(3-oxooctyl)-cyclopent-1β-yl]-2,4-hexadienoate (12B),

(42) Racemic methyl 3-methyl-6-[3α,5α-dihydroxy-2β-(3-oxooctyl)cyclopent-1β-yl]-2,4-hexadienoate (12B),

(43) The 3α,5α-p-nitrobenzylidene derivative of racemic ethyl 8-[3α,5α-dihydroxy-2β-(3-hydroxyoctyl)cyclopent-1β-yl]-2,4,6-octatrienoate (12C),

(44) The 3α,5α-p-nitrobenzylidene derivative of racemic ethyl 4-[3α,5α-dihydroxy-2β-(3-hydroxyoctyl)cyclopent-1β-yl]-2-butenoate (12C),

(45) The 3α,5α-p-nitrobenzylidene derivative of racemic methyl 6 - [3α,5α-dihydroxy-2β-(3-hydroxyoctyl)cyclopent-1β-yl]-2,4-hexadienoate (12C),

(46) The 3α,5α-p-nitrobenzylidene derivative of racemic methyl 3-methyl-6-[3α,5α-dihydroxy-2β-(3-hydroxyoctyl)cyclopent-1β-yl]-2,4-hexadienoate (12C),

(47) Racemic ethyl 8-]3α,5α-dihydroxy-2β-(3-hydroxyoctyl)cyclopent-1β-yl]2,4,6-octatrienoate (12D),

(48) Racemic ethyl 4-[3α,5α-dihydroxy-2β-(3-hydroxyoctyl)-cyclopent-1β-yl]-2-butenoate (12D),

(49) Racemic methyl 6-[3α,5α-dihydroxy-2β-(3-hydroxyoctyl)-cyclopent-1β-yl]-2,4-hexadienoate (12D),

(50) Racemic methyl 3-methyl-6-[3α,5α-dihydroxy-2β-(3 - hydroxyoctyl)cyclopent - 1β - yl]-2,4-hexadienoate (12D),

(51) Racemic ethyl 8-[3α,5α-dihydroxy-2β-(3-oxooctyl)-cyclopent-1β-yl] octanoate (13B),

(52) Racemic ethyl 4-[3α,5α-dihydroxy-2β-(3-oxooctyl)-cyclopent-1β-yl] butanoate (13B),

(53) Racemic methyl 6-[3α,5α-dihydroxy-2β-(3-oxooctyl)-cyclopent-1β-yl] hexanoate (13B),

(54) Racemic methyl 3-methyl-6-[3α,5α-dihydroxy-2β-(3-oxooctyl)cyclopent-1β-yl] hexanoate (13B),

(55) Racemic ethyl 8-[3α,5α-dihydroxy-2β-(3-hydroxyoctyl)-cyclopent-1β-yl] octanoate (14B),

(56) Racemic ethyl 4-[3α,5α-dihydroxy-2β-(3-hydroxyoctyl)-cyclopent-1β-yl] butanoate (14B),

(57) Racemic methyl 6-[3α,5α-dihydroxy-2β-(3-hydroxyoctyl)cyclopent-1β-yl] hexanoate (14B) and

(58) Racemic methyl 3-methyl-6-[3α,5α-dihydroxy-2β-(3-hydroxyoctyl)cyclopent-1β-yl] hexanoate (14B) is productive of the corresponding free acids.

EXAMPLE 74

Racemic methyl 7-[3α,5α-dihydroxy-2β-(3-oxooctyl) cyclopent-1β-yl] heptanoate (11B)

A solution of 0.2 g. of racemic 7-[3α,5α-dihydroxy-2β-(3-oxooctyl)cyclopent-1β-yl] heptanoic acid (11B) in a mixture of 1 ml. of methanol and 9 ml. of diethyl ether is mixed at room temperature with excess diazomethane in ether and allowed to stand for about 15 minutes. The mixture is then evaporated to dryness under diminished pressure to obtain a residue comprising racemic methyl 7-[3α,5α-dihydroxy-2β-(3-oxooctyl)cyclopent-1β-yl] heptanoate (11B).

Following the procedure of Example 74 but substituting for diazomethane other diazoalkanes, for example, diazoethane, diazobutane, 1-diazo-2-ethylhexane, cyclohexyldiazomethane, 1-diazo-2-propene, diazododecane, and the like, gives ethyl, butyl, 2-ethylhexyl, cyclohexylmethyl, allyl, lauryl, and the like esters of racemic 7-[3α, 5α-dihydroxy-2β-(3-oxooctyl)cyclopent-1β-yl] heptanoic acid.

Following the procedure of Example 74 but subsituting for 7-[3α,5α-dihydroxy-2β-(3 - oxooctyl)cyclopent-1β-yl] heptanoate as starting material other free acids of Formulas 10A, 10B, 10C, 10D, 11B, 14A, 15, 12A, 12B, 12C, 12D, 13B and 14B, for example, the free acids corresponding to the esters named following Example 73, is productive of the methyl esters of these acids. Similarly, substituting other diazoalkanes, for example, those named above, is productive of the corresponding alkyl esters of the acids of Formulas 10A, 10B, 10C, 10D, 11B, 14A, 15, 12A, 12B, 12C, 12D, 13B and 14B.

EXAMPLE 75

Racemic sodium 7-[3α,5α-dihydroxy-2β-(3-hydroxyoctyl)cyclopent-1β-yl] heptanoate (14A)

A mixture of 10 mg. of essentially pure racemic 7-[3α,5α-dihydroxy-2β-(3 - hydroxyoctyl)cyclopent - 1β-yl] heptanoate (14A) and 10 ml. of 1:1 water-ethanol was cooled to about 10° C. and was neutralized with an equivalent amount of 0.1 N aqueous sodium hydroxide solution. Evaporation to dryness gave essentially pure racemic sodium 7-[3α,5α-dihydroxy-2β-(3-hydroxyoctyl)cyclopent-1β-yl] heptanoate.

Following the procedure of Example 75 but using potassium hydroxide, calcium hydroxide, tetramethylammonium hydroxide, and benzyltrimethylammonium hydroxide, there are obtained the corresponding salts of essentially pure racemic 7-[3α,5α-dihydroxy-2β-(3-hydroxyoctyl)cyclopent-1β-yl] heptanoate.

Following the procedure of Example 75 but using in place of racemic 7-[3α,5α-dihydroxy-2β - (3 - hydroxyoctyl)cyclopent-1β-yl] heptanoate (14A) other free acids of Formulas 10A, 10B, 10C, 10D, 11B, 14A, 15, 12A, 12B, 12C, 12D, 13B and 14D there are obtained the corresponding sodium salts. Similarly, these acids can be neutralized with other bases, for example, those named above, to obtain the corresponding salts.

In the examples (above) NMR data cited is that obtained at 60 megacycles.

In the formulae illustrating this specification and in the following claims, dotted lines denote the α-configuration and wavy lines denote both the α- and β-configuration. A solid line attached to the cyclopentane ring indicates a β-configuration.

We claim:
1. A racemic compound of the formula:

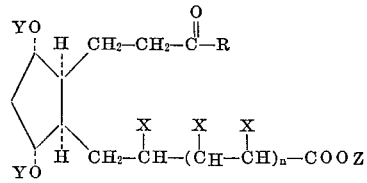

wherein R is an alkyl group containing from 1 to 8 carbon atoms, inclusive, X is hydrogen or methyl with the proviso that not more than one methyl group can be present in a given side chain, Y is hydrogen or the acyl radical of a hydrocarbon carboxylic acid containing from 1 to 12 carbon atoms, inclusive, Z is hydrogen or a hydrocarbyl group containing from 1 to 12 carbon atoms, inclusive, and n is an integer selected from the group consisting of 0, 1 and 2.

2. A compound according to claim 1 wherein R is amyl, X is hydrogen, Y is hydrogen or the acyl radical of a hydrocarbon carboxylic acid containing from 1 to 12 carbon atoms, inclusive, Z is hydrogen or a hydrocarbyl group containing from 1 to 12 carbon atoms, inclusive, and n is 2.

3. A compound according to claim 1 wherein R is amyl, X is hydrogen, Y is acetyl, Z is ethyl and n is 2.

4. A compound according to claim 1 herein R is amyl, X is hydrogen, Y is hydrogen, Z is ethyl and n is 2.

5. A compound according to claim 1 wherein R is amyl, X is hydrogen, Y is hydrogen, Z is hydrogen and n is 2.

6. A compound according to claim 1 wherein R is amyl, X is hydrogen, Y is hydrogen or the acyl radical of a hydrocarbon carboxylic acid containing from 1 to 12 carbon atoms, inclusive, Z is hydrogen or a hydrocarbyl group containing from 1 to 12 carbon atoms, inclusive, and n is 0.

7. A compound according to claim 1 wherein R is amyl, X is hydrogen, Y is hydrogen or the acyl radical of a hydrocarbon carboxylic acid containing from 1 to 12 carbon atoms, inclusive, Z is hydrogen or a hydrocarbyl group containing from 1 to 12 carbon atoms, inclusive, and n is 1.

8. A racemic compound according to claim 1 of the formula:

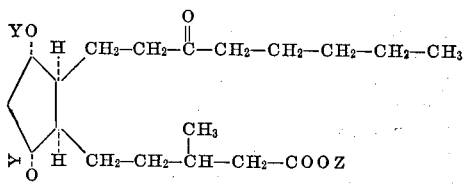

wherein Y is hydrogen or the acyl radical of a hydrocarbon carboxylic acid containing from 1 to 12 carbon atoms, inclusive, and Z is hydrogen or a hydrocarbyl group containing from 1 to 12 carbon atoms, inclusive.

9. A racemic compound according to claim 1 wherein R is methyl, X is hydrogen, Y is hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and n is 2.

10. A racemic compound of the formula:

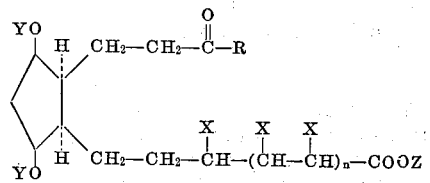

wherein R is an alkyl group containing from 1 to 8 carbon atoms, inclusive, X is hydrogen or methyl with the proviso that not more than one methyl group can be present in a given side chain, Y is hydrogen or the acyl radical of a hydrocarbon carboxylic acid containing from 1 to 12 carbon atoms, inclusive, Z is hydrogen or a hydrocarbyl group containing from 1 to 12 carbon atoms, inclusive, and $n$ is an integer selected from the group consisting of 0, 1 and 2.

11. A racemic compound of the formula:

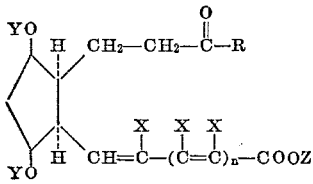

wherein R is an alkyl radical containing from 1 to 8 carbon atoms, inclusive, X is hydrogen or methyl with the proviso that not more than one methyl group can be present in a given side chain, Y is hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and $n$ is an integer selected from the group consisting of 0, 1 or 2.

12. A compound according to claim 11 wherein R is amyl, X is hydrogen, Y is hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and $n$ is 2.

13. A compound according to claim 11 wherein R is amyl, X is hydrogen, Y is acetyl, Z is ethyl and $n$ is 2.

14. A compound according to claim 11 wherein R is ampyl, X is hydrogen, Y is hydrogen, Z is ethyl and $n$ is 2.

15. A compound according to claim 11 wherein R is amyl, X is hydrogen, Y is hydrogen, Z is hydrogen and $n$ is 2.

16. A compound according to claim 11 wherein R is amyl, X is hydrogen, Y is hydrogen or the acyl radical of a hydrocarbon carboxylic acid containing from 1 to 12 carbon atoms, inclusive, Z is hydrogen or a hydrocarbyl group containing from 1 to 12 carbon atoms, inclusive, and $n$ is 0.

17. A compound according to claim 11 wherein R is amyl, X is hydrogen, Y is hydrogen, Z is ethyl and $n$ is 0.

18. A compound according to claim 11 wherein R is amyl, X is hydrogen, Y is hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive and $n$ is 1.

19. A racemic compound according to claim 11 of the formula:

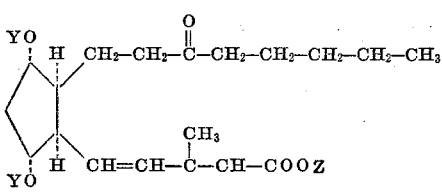

wherein Y is hydrogen or the acyl radical of a hydrocarbon carboxylic acid containing from 1 to 12 carbon atoms, inclusive, and Z is hydrogen or a hydrocarbyl radical containing from 1 to 12 carbon atoms, inclusive.

20. A compound according to claim 11 wherein R is methyl, X is hydrogen, Y is hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and $n$ is 2.

21. A racemic compound of the formula:

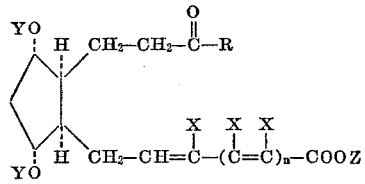

wherein R is an alkyl group containing from 1 to 8 carbon atoms, inclusive, X is hydrogen or methyl with the proviso that not more than one methyl group can be present in a given side chain, Y is hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and $n$ is an integer selected from the group consisting of 0, 1 or 2.

22. A racemic compound of the formula:

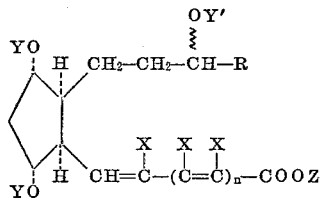

wherein R is an alkyl radical containing from 1 to 8 carbon atoms, inclusive, X is hydrogen or methyl with the proviso that not more than one methyl group can be present in a given side chain, Y and Y' are hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and $n$ is an integer selected from the group consisting of 0, 1 and 2.

23. A compound according to claim 22 wherein R is amyl, X is hydrogen, Y and Y' are hydrogen or the acyl r dical of a hydrocarbon carboxylic acid containing from 1 to 12 carbon atoms, inclusive, Z is hydrogen or a hydrocarbyl group containing from 1 to 12 carbon atoms, inclusive, and $n$ is 2.

24. A compound according to claim 22 wherein R is amyl, X is hydrogen, Y is acetyl, Y' is acetyl, Z is ethyl, and $n$ is 2.

25. A compound according to claim 22 wherein R is amyl, X is hydrogen, Y is hydrogen, Y' is hydrogen, Z is ethyl, and $n$ is 2.

26. A compound according to claim 22 wherein R is amyl, X is hydrogen, Y is hydrogen, Y' is hydrogen, Z is hydrogen, and $n$ is 2.

27. A compound according to claim 22 wherein R is amyl, X is hydrogen, Y and Y' are hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and $n$ is 0.

28. A compound according to claim 22 wherein R is amyl, X is hydrogen, Y is hydrogen, Y' is hydrogen, Z is ethyl, and $n$ is 0.

29. A compound according to claim 22 wherein R is amyl, X is hydrogen, Y and Y' are hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and $n$ is 1.

30. A racemic compound according to claim 22 of the formula:

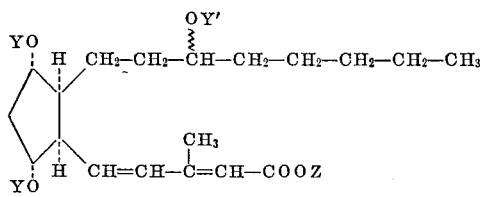

wherein Y and Y' are hydrogen or the acyl radical of a hydrocarbon carboxylic acid containing from 1 to 12 carbon atoms, inclusive, and Z is hydrogen or a hydrocarbyl radical containing from 1 to 12 carbon atoms, inclusive.

31. A compound according to claim 22 wherein R is methyl, X is hydrogen, Y and Y' are hydrogen or the acyl radical or a hydrocarbon carboxylic acid containing from 1 to 12 carbon atoms, inclusive, Z is hydrogen or a hydrocarbyl radical containing from 1 to 12 carbon atoms, inclusive, and $n$ is 2.

32. A racemic compound of the formula:

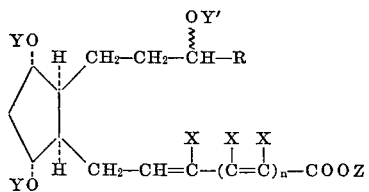

wherein R is an alkyl group containing from 1 to 8 carbon atoms, inclusive, X is hydrogen or methyl with the proviso that not more than one methyl group can be present in a given side chain, Y and Y' are hydrogen or the acyl radical of a hydrocarbon carboxylic acid containing from 1 to 12 carbon atoms, inclusive, Z is hydrogen or a hydrocarbyl radical containing from 1 to 12 carbon atoms, inclusive, and $n$ is an integer selected from the group consisting of 0, 1 and 2.

References Cited

Samuelsson: JACS 85 1878–79 (1963).
Bergstrom et al.: Acta. Physiol. Scand. 60 170–180 (1964).
Horton: Experientia 21 113–4 Mar. 15, 1965.
Samuelsson: Angewandte Chemie (International Edition vol. 4 (410–416) May 1965.

LORRAINE A. WEINBERGER, Primary Examiner

P. J. KILLOS, Assistant Examiner

U.S. Cl. X.R.

260—340.7, 410, 410.9, 476, 488, 514, 586, 617

UNITED STATES PATENT OFFICE
CERTIFICATE OF CORRECTION

Patent No. 3,505,386                    Dated   April 7, 1970

Inventor(s)   John C. Babcock and Philip F. Beal III

It is certified that error appears in the above-identified patent and that said Letters Patent are hereby corrected as shown below:

Column 3, Formula 4D, should appear as shown below instead of as in the patent:

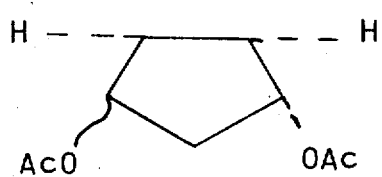

Column 3, Formula 9C, should appear as shown below instead of as in the patent:

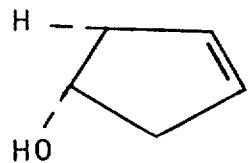

Columns 7 and 8, below Formulas 12B and 12D should appear as shown below instead of as in the patent:

FORM PO-1050 (10-69)

Page 2

UNITED STATES PATENT OFFICE
CERTIFICATE OF CORRECTION

Patent No. 3,505,386    Dated April 7, 1970

Inventor(s) John C. Babcock and Philip F. Beal III

It is certified that error appears in the above-identified patent and that said Letters Patent are hereby corrected as shown below:

12B                                           12D

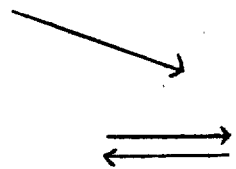

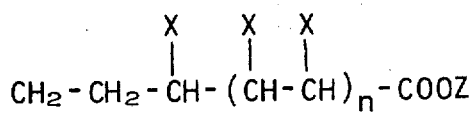

$$CH_2-CH_2-\overset{X}{\underset{|}{CH}}-(\overset{X}{\underset{|}{CH}}-\overset{X}{\underset{|}{CH}})_n-COOZ$$

13A                                           13B 12A, 12C, 13A ⟶ 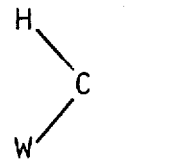

↑ 14D 12A, 12B, 12C, 12D, 13A, 13B, → 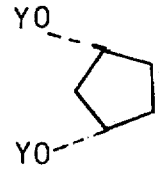

14B

FORM PO-1050 (10-69)

Page 3

UNITED STATES PATENT OFFICE
CERTIFICATE OF CORRECTION

Patent No. 3,505,386                    Dated   April 7, 1970

Inventor(s)  John C. Babcock and Philip F. Beal III

It is certified that error appears in the above-identified patent and that said Letters Patent are hereby corrected as shown below:

Column 9, line 36, for "3aα,4,7,7α-" read -- 3aα,4,7,7aα- --. Column 10, line 28, for "-(5H)-" read -- -5(4H)- --. Column 12, line 32, for "-indanetriol" read -- -indanetetrol --; line 62, for "-1α,3α-indane-" read -- -1α,3α,4α,5α-indane- --. Column 13, line 38, for "The Whittig read -- These Wittig --. Column 14, line 66, for "nitro bromo," read -- nitro and bromo, --; line 72, for "uptake hydrogen" read -- uptake of hydrogen --. Column 16, line 40, for "-(3-oxalkyl)-" read -- -(3-oxoalkyl)- --; lines 46-47, for "triphenylmethoxyphosphorane." read -- triphenylmethoxymethylphosphorane --. Column 18, line 19, should appear as shown below instead of as in the patent:

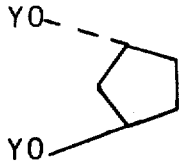

Column 18, line 68, for "containing hydroxyl" read -- containing free hydroxyl --. Column 19, line 43, for "H, 17.51." read -- H, 7.51. --. Column 21, line 34, for "3α,4,7,7aα-" read -- 3aα,4,7,7aα- --. Column 22, line 15, for "cauticus" read -- cautious --. Column 25, line 25, for "tearahydro-" read -- tetrahydro- --. Column 29, line 10, for "-indanetroil," read -- -indanetriol, --; line 24, for "(and 5β-" read -- (and Page 4

UNITED STATES PATENT OFFICE
CERTIFICATE OF CORRECTION

Patent No. 3,505,386　　　　Dated April 7, 1970

Inventor(s) John C. Babcock and Philip F. Beal III

It is certified that error appears in the above-identified patent and that said Letters Patent are hereby corrected as shown below:

5α- --; line 49, for "7a -" read -- 7aα- --; line 57, for "-nitrobenzyl derivative" read ---nitrobenzylidene derivative --; line 58, for "-indanedio" read -- -indanediol --, Column 30, line 35, for "Example 20" read -- Example 21 --. Column 31, line 15, for "Skellytone" read -- Skellysolve --. Column 33, line 56, for "ampl" read -- amyl --. Column 34, line 59, for "oxalkyl" read -- oxoalkyl --. Column 36, line 33, for "formaldehyde acetaldehyde propionaldehyde chloral p-" read -- formaldehyde, acetaldehyde, propionaldehyde, chloral, p- --; line 44, for "racemic 3α,5α-acetals of racemic 3α,5α-dihydroxy-" read -- racemic 3α,5α-dihydroxy- --. Column 37, line 4, for "as" read -- was --; line 16, for "carboaldehyde" read -- carboxaldehyde --; line 48, for "dihydroy" read -- dihydroxy --; line 61, for "dihydroy" read -- dihydroxy --; line 74, for "β" read -- 1β --. Column 38, line 1, for "3a,5α" read -- 3α,5α --. Column 39, line 11, for "or" read -- of --; line 12, for "- -amyl" read -5α-amyl --. Column 40, line 54, for "3α,5d" read --3α,5α-- Column 42, line 6, for "nirobenzylidene" read -- nitrobenzylidene --; line 30, for "2-4,6" read -- 2,4,6 --; line 41, for "ly" read -- yl --. Column 48, line 61, for "dihydroxyl-" read -- dihydroxy- --. Column 49, lines 56-58, for "(4) The 3α,5α-p-nitrobenzylidene derivative of racemic ethyl 7-[3α,5α-dihydroxy-2β-(3-hydroxybutyl)cyclopent-1β-yl]-2,4,6-pentadienoate and" read -- 3. the 3α,5α-p-nitrobenzylidene derivative of racemic methyl 3-methyl-5-[3α,5α-dihydroxy-2β-(3-hydroxyoctyl)cyclopent-1β-yl]-2,4-pentadienoate and --; line 60, for "dihydrovy" read -- dihydroxy --; line 74, for "Fα₁" read -- F₁α --. Column 50, line 74, for "racemic 7-" read -- racemic ethyl 7- --. Column 51, line 22, for "(2-hydroxyoctyl" read -- (3-hydroxyoctyl --; line 35, for "-(2-" read -- -(3- --; line 50, for "(hydroxyoctyl" read -- (3-hydroxyoctyl --. Column 52, line 66, for "both" read -- bath --. Column 53, line 3, for "-β-" read -- -1β- --. Column 55, line 45, for "]butanoate," read -- ]-2-butenoate, --;

UNITED STATES PATENT OFFICE
CERTIFICATE OF CORRECTION

Patent No. 3,505,386      Dated April 7, 1970

Inventor(s) John C. Babcock and Philip F. Beal III

It is certified that error appears in the above-identified patent and that said Letters Patent are hereby corrected as shown below:

line 55, for "disydroxy" read -- dihydroxy --. Column 62, line 14, for "(acetoxyoctyl" read -- (3-acetoxyoctyl --; line 64, for "(oxooctyl" read -- (3-oxooctyl --. Column 64, line 55, for "8-]" read -- 8-[ --. Column 66, line 53, should appear as shown below instead of as in the patent:

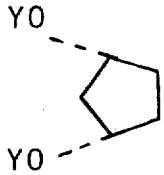

Column 66, lines 68 and 73, should appears as shown below instead of as in the Patent:

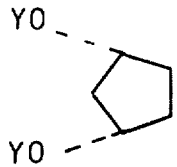

Column 67, lines 11 and 17, should appear as shown below instead of as in the patent:

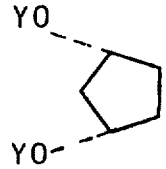

Page 6

UNITED STATES PATENT OFFICE
CERTIFICATE OF CORRECTION

Patent No. 3,505,386            Dated    April 7, 1970

Inventor(s) John C. Babcock and Philip F. Beal III

It is certified that error appears in the above-identified patent and that said Letters Patent are hereby corrected as shown below:

Column 67, line 38, for "ampyl" read -- amyl --. Column 68, line 48, for "r dical" read -- radical --.

Signed and sealed this 17th day of August 1971.

(SEAL)
Attest:

EDWARD M. FLETCHER, JR.           WILLIAM E. SCHUYLER, JR.
Attesting Officer                 Commissioner of Patents